(12) United States Patent
Zhang et al.

(10) Patent No.: US 12,015,774 B2
(45) Date of Patent: Jun. 18, 2024

(54) SLICE LEVEL SIGNALING IN VIDEO BITSTREAMS THAT INCLUDE SUBPICTURES

(71) Applicants: Beijing Bytedance Network Technology Co., Ltd., Beijing (CN); Bytedance Inc., Los Angeles, CA (US)

(72) Inventors: Kai Zhang, San Diego, CA (US); Zhipin Deng, Beijing (CN); Hongbin Liu, Beijing (CN); Li Zhang, San Diego, CA (US); Jizheng Xu, San Diego, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/994,085

(22) Filed: Nov. 25, 2022

(65) Prior Publication Data
US 2023/0116187 A1    Apr. 13, 2023

Related U.S. Application Data

(63) Continuation of application No. 17/711,319, filed on Apr. 1, 2022, now Pat. No. 11,539,950, which is a
(Continued)

(30) Foreign Application Priority Data

Oct. 2, 2019 (WO) ................ PCT/CN2019/109809

(51) Int. Cl.
*H04N 19/119*    (2014.01)
*H04N 19/169*    (2014.01)
(Continued)

(52) U.S. Cl.
CPC ......... *H04N 19/119* (2014.11); *H04N 19/174* (2014.11); *H04N 19/176* (2014.11);
(Continued)

(58) Field of Classification Search
CPC .......................... H04N 19/119; H04N 19/174
See application file for complete search history.

(56) References Cited

U.S. PATENT DOCUMENTS 6,047,112 A    4/2000 Wise
8,988,531 B2   3/2015 Zhou
(Continued)

FOREIGN PATENT DOCUMENTS

AU    2016273973 A1    7/2018
CN       1593065 A     3/2005
(Continued)

OTHER PUBLICATIONS

Document: JVET-L0278, Huawng, H., et al., "CE4.2.5: Simplification of affine merge list construction and move ATMVP to affine merge list," Joint Video Experts Team (JVET) of ITU-T SG 16 WP 3 and ISO/IEC JTC 1/SC 29/WG 11 12th Meeting: Macao, CN, Oct. 3-12, 2018, 3 pages.
(Continued)

*Primary Examiner* — Jerry T Jean Baptiste
(74) *Attorney, Agent, or Firm* — Astute IP Law Group

(57) ABSTRACT

An example method of video processing includes partitioning, for a conversion between a current video block of a picture of a video and a bitstream of the video, the picture into one or more slices according to a requirement of bitstream conformance. The requirement of bitstream conformance specifies that a union of the one or more slices covers the whole picture, and a first syntax element is included in the bitstream to indicate whether the one or more
(Continued)

slices have a rectangular shape. The method also includes performing the conversion at least based on the partitioning.

20 Claims, 19 Drawing Sheets

Related U.S. Application Data continuation of application No. PCT/CN2020/119931, filed on Oct. 9, 2020.

(51) Int. Cl.
*H04N 19/174* (2014.01)
*H04N 19/176* (2014.01)
*H04N 19/46* (2014.01)
*H04N 19/70* (2014.01)

(52) U.S. Cl.
CPC ......... *H04N 19/1883* (2014.11); *H04N 19/46* (2014.11); *H04N 19/70* (2014.11)

(56) References Cited

U.S. PATENT DOCUMENTS

| | | |
|---|---|---|
| 9,525,861 B2 | 12/2016 | Zhang |
| 9,743,066 B2 | 8/2017 | Zhang |
| 9,912,966 B2 | 3/2018 | Hannuksela |
| 9,924,168 B2 | 3/2018 | Zhang |
| 10,057,594 B2 | 8/2018 | Xiu |
| 10,097,846 B2 | 10/2018 | Deshpande |
| 10,165,252 B2 | 12/2018 | An |
| 10,200,709 B2 | 2/2019 | Chen |
| 10,205,968 B2 | 2/2019 | Liu et al. |
| 10,455,231 B2 | 10/2019 | Xu |
| 10,483,493 B2 | 11/2019 | Sargent |
| 10,523,964 B2 | 12/2019 | Chuang |
| 10,523,967 B2 | 12/2019 | Lee |
| 10,587,859 B2 | 3/2020 | An |
| 10,757,417 B2 | 8/2020 | Zhang |
| 10,798,385 B2 | 10/2020 | Lee |
| 10,805,639 B2 | 10/2020 | Lee |
| 10,819,891 B2 | 10/2020 | Wang |
| 10,841,609 B1 | 11/2020 | Liu |
| 10,880,547 B2 | 12/2020 | Xu |
| 10,904,565 B2 | 1/2021 | Chuang |
| 11,095,898 B2 | 8/2021 | Lim |
| 11,095,917 B2 | 8/2021 | Zhang |
| 11,109,061 B2 | 8/2021 | Chen |
| 11,128,884 B2 | 9/2021 | Liu |
| 11,146,810 B2 | 10/2021 | Chen |
| 11,212,523 B2 | 12/2021 | Chiu |
| 11,343,529 B2 | 5/2022 | Zhang |
| 11,470,309 B2 | 10/2022 | Zhang |
| 11,496,733 B2 | 11/2022 | Zhang |
| 11,523,108 B2 | 12/2022 | Zhang |
| 11,523,109 B2 | 12/2022 | Li |
| 2004/0008766 A1 | 1/2004 | Wang |
| 2004/0177383 A1 | 9/2004 | Martinolich |
| 2005/0019006 A1 | 1/2005 | Suh et al. |
| 2008/0204472 A1 | 8/2008 | Maertens |
| 2008/0267297 A1 | 10/2008 | Sampedro |
| 2008/0273597 A1 | 11/2008 | Kovalenko |
| 2010/0086052 A1 | 4/2010 | Park et al. |
| 2012/0294353 A1 | 11/2012 | Fu et al. |
| 2013/0089145 A1 | 4/2013 | Guo |
| 2013/0101018 A1 | 4/2013 | Chong |
| 2013/0101035 A1 | 4/2013 | Wang |
| 2013/0182755 A1 | 7/2013 | Chen et al. |
| 2013/0182774 A1 | 7/2013 | Wang et al. |
| 2013/0202051 A1 | 8/2013 | Zhou |
| 2013/0266075 A1 | 10/2013 | Wang et al. |
| 2013/0294524 A1 | 11/2013 | Van der Auwera |
| 2013/0322531 A1 | 12/2013 | Chen et al. |
| 2013/0336406 A1 | 12/2013 | Zhang |
| 2014/0003504 A1 | 1/2014 | Ugur et al. |
| 2014/0003535 A1 | 1/2014 | Haque et al. |
| 2014/0185682 A1 | 7/2014 | Chen et al. |
| 2014/0192892 A1 | 7/2014 | Van der Auwera |
| 2014/0198844 A1 | 7/2014 | Hsu |
| 2014/0218473 A1 | 8/2014 | Hannuksela et al. |
| 2014/0301441 A1 | 10/2014 | Wang et al. |
| 2014/0301476 A1 | 10/2014 | Deshpande |
| 2015/0010050 A1 | 1/2015 | Chen et al. |
| 2015/0010091 A1 | 1/2015 | Hsu |
| 2015/0103924 A1 | 4/2015 | Misra |
| 2015/0195577 A1 | 7/2015 | Hannuksela |
| 2015/0215631 A1 | 7/2015 | Zhou |
| 2015/0271515 A1 | 9/2015 | Pang et al. |
| 2015/0341655 A1 | 11/2015 | Joshi |
| 2015/0341664 A1 | 11/2015 | Zhang |
| 2016/0100189 A1 | 4/2016 | Pang |
| 2016/0100196 A1 | 4/2016 | Wu |
| 2016/0105690 A1 | 4/2016 | Denoual et al. |
| 2016/0165248 A1 | 6/2016 | Lainema et al. |
| 2016/0173887 A1 | 6/2016 | Deshpande |
| 2016/0219278 A1 | 7/2016 | Chen et al. |
| 2016/0234522 A1 | 8/2016 | Lu |
| 2016/0316215 A1 | 10/2016 | Minoo et al. |
| 2016/0337661 A1 | 11/2016 | Pang et al. |
| 2016/0381385 A1 | 12/2016 | Ugur |
| 2017/0006302 A1 | 1/2017 | Lee |
| 2017/0006304 A1 | 1/2017 | Miyoshi |
| 2017/0064339 A1 | 3/2017 | Van der Auwera |
| 2017/0237999 A1 | 8/2017 | Hendry et al. |
| 2017/0272758 A1 | 9/2017 | Lin |
| 2017/0289566 A1 | 10/2017 | He |
| 2017/0295369 A1 | 10/2017 | Nakagami |
| 2017/0302951 A1 | 10/2017 | Joshi et al. |
| 2017/0332095 A1 | 11/2017 | Zou et al. |
| 2018/0048909 A1 | 2/2018 | Liu et al. |
| 2018/0091829 A1 | 3/2018 | Liu |
| 2018/0098063 A1 | 4/2018 | Chen et al. |
| 2018/0098090 A1 | 4/2018 | Lin |
| 2018/0184083 A1 | 6/2018 | Panusopone et al. |
| 2018/0192072 A1 | 7/2018 | Chen |
| 2018/0199057 A1 | 7/2018 | Chuang |
| 2018/0270500 A1 | 9/2018 | Li et al. |
| 2018/0310017 A1 | 10/2018 | Chen |
| 2018/0343463 A1 | 11/2018 | Xiu |
| 2018/0376126 A1 | 12/2018 | Hannuksela |
| 2019/0058884 A1 | 2/2019 | Zhou |
| 2019/0058896 A1 | 2/2019 | Huang |
| 2019/0082191 A1 | 3/2019 | Chuang |
| 2019/0104319 A1 | 4/2019 | Zhang |
| 2019/0110064 A1 | 4/2019 | Zhang et al. |
| 2019/0116376 A1 | 4/2019 | Chen |
| 2019/0138889 A1 | 5/2019 | Jiang |
| 2019/0149838 A1 | 5/2019 | Zhang et al. |
| 2019/0158865 A1 | 5/2019 | Park |
| 2019/0208234 A1 | 7/2019 | Van Brandenburg et al. |
| 2019/0246143 A1 | 8/2019 | Zhang |
| 2019/0273937 A1 | 9/2019 | Yu |
| 2020/0112733 A1 | 4/2020 | Li et al. |
| 2020/0221117 A1 | 7/2020 | Liu |
| 2020/0221122 A1 | 7/2020 | Ye |
| 2020/0228827 A1 | 7/2020 | Hannuksela |
| 2020/0252619 A1 | 8/2020 | Zhang |
| 2020/0296405 A1 | 9/2020 | Huang |
| 2020/0329246 A1 | 10/2020 | Yu |
| 2020/0382795 A1 | 12/2020 | Zhang |
| 2020/0396453 A1 | 12/2020 | Zhang |
| 2021/0029351 A1 | 1/2021 | Zhang |
| 2021/0029362 A1 | 1/2021 | Liu |
| 2021/0029378 A1 | 1/2021 | He |
| 2021/0044818 A1 | 2/2021 | Furht |
| 2021/0044838 A1 | 2/2021 | Chen |
| 2021/0058637 A1 | 2/2021 | Zhang |
| 2021/0076029 A1 | 3/2021 | Han |
| 2021/0076050 A1 | 3/2021 | Zhang |
| 2021/0084295 A1 | 3/2021 | Chen |
| 2021/0084340 A1 | 3/2021 | Li |
| 2021/0092393 A1 | 3/2021 | Chao et al. |
| 2021/0136363 A1 | 5/2021 | Jang |

(56) References Cited

U.S. PATENT DOCUMENTS

| | | | |
|---|---|---|---|
| 2021/0136407 A1* | 5/2021 | Aono | H04N 19/55 |
| 2021/0136422 A1 | 5/2021 | Huang | |
| 2021/0185347 A1 | 6/2021 | Liu | |
| 2021/0195177 A1 | 6/2021 | Zhang | |
| 2021/0211707 A1 | 7/2021 | Liu | |
| 2021/0211713 A1 | 7/2021 | Zhang | |
| 2021/0211714 A1 | 7/2021 | Zhang | |
| 2021/0219001 A1 | 7/2021 | Jang | |
| 2021/0227250 A1 | 7/2021 | Liu | |
| 2021/0235109 A1 | 7/2021 | Liu | |
| 2021/0243467 A1 | 8/2021 | Zhang | |
| 2021/0243468 A1 | 8/2021 | Zhang | |
| 2021/0266530 A1 | 8/2021 | Liu | |
| 2021/0266560 A1 | 8/2021 | Jang | |
| 2021/0266577 A1 | 8/2021 | Zhang | |
| 2021/0266584 A1 | 8/2021 | Zhang | |
| 2021/0266585 A1 | 8/2021 | Liu | |
| 2021/0266591 A1 | 8/2021 | Zhang | |
| 2021/0274208 A1 | 9/2021 | Zhang | |
| 2021/0274209 A1 | 9/2021 | He | |
| 2021/0274213 A1 | 9/2021 | Xiu | |
| 2021/0281865 A1 | 9/2021 | Liu | |
| 2021/0281875 A1 | 9/2021 | Liu | |
| 2021/0289209 A1 | 9/2021 | Lee | |
| 2021/0337184 A1 | 10/2021 | Meng | |
| 2021/0337228 A1* | 10/2021 | Wang | H04N 19/29 |
| 2021/0352302 A1 | 11/2021 | Zhang | |
| 2021/0352315 A1 | 11/2021 | Zhang | |
| 2021/0368198 A1 | 11/2021 | Zhang | |
| 2021/0368199 A1 | 11/2021 | Zhang | |
| 2021/0368203 A1 | 11/2021 | Zhang | |
| 2021/0385481 A1 | 12/2021 | Liu | |
| 2021/0385482 A1 | 12/2021 | Liu | |
| 2021/0392367 A1 | 12/2021 | Zhang | |
| 2021/0409730 A1 | 12/2021 | Wang | |
| 2022/0007048 A1 | 1/2022 | He | |
| 2022/0014735 A1 | 1/2022 | Chen | |
| 2022/0053207 A1 | 2/2022 | Deshpande | |
| 2022/0060695 A1 | 2/2022 | Zhang | |
| 2022/0060696 A1 | 2/2022 | Zhang | |
| 2022/0060718 A1 | 2/2022 | Zhang | |
| 2022/0070442 A1 | 3/2022 | Jang | |
| 2022/0094909 A1 | 3/2022 | Hannuksela | |
| 2022/0132148 A1 | 4/2022 | Wang | |
| 2022/0159246 A1 | 5/2022 | Zhang | |
| 2022/0166971 A1 | 5/2022 | Zhang | |
| 2022/0166985 A1 | 5/2022 | Zhang | |
| 2022/0174322 A1 | 6/2022 | Zhang | |
| 2022/0217342 A1 | 7/2022 | Hannuksela | |
| 2022/0239926 A1 | 7/2022 | Jhu | |
| 2022/0248007 A1 | 8/2022 | Misra | |
| 2022/0256146 A1 | 8/2022 | Zhang | |
| 2022/0256148 A1 | 8/2022 | Zhang | |
| 2022/0256195 A1 | 8/2022 | Zhang | |
| 2022/0272332 A1 | 8/2022 | Lai | |
| 2022/0272378 A1 | 8/2022 | Samuelsson | |
| 2022/0394301 A1 | 12/2022 | Deshpande et al. | |

FOREIGN PATENT DOCUMENTS

| | | |
|---|---|---|
| CN | 1609957 A | 4/2005 |
| CN | 1750659 A | 3/2006 |
| CN | 101668219 A | 3/2010 |
| CN | 101990103 A | 3/2011 |
| CN | 103202016 A | 7/2013 |
| CN | 103891292 A | 6/2014 |
| CN | 103891293 A | 6/2014 |
| CN | 103975596 A | 8/2014 |
| CN | 104041033 A | 9/2014 |
| CN | 104054347 A | 9/2014 |
| CN | 104641648 A | 5/2015 |
| CN | 104756495 A | 7/2015 |
| CN | 104823449 A | 8/2015 |
| CN | 104885464 A | 9/2015 |
| CN | 105027567 A | 11/2015 |
| CN | 105074819 A | 11/2015 |
| CN | 105144720 A | 12/2015 |
| CN | 105393536 A | 3/2016 |
| CN | 105531999 A | 4/2016 |
| CN | 105556975 A | 5/2016 |
| CN | 105684448 A | 6/2016 |
| CN | 106165419 A | 11/2016 |
| CN | 106303543 A | 1/2017 |
| CN | 106464893 A | 2/2017 |
| CN | 106537915 A | 3/2017 |
| CN | 106664424 A | 5/2017 |
| CN | 106797229 A | 5/2017 |
| CN | 106797476 A | 5/2017 |
| CN | 107105295 A | 8/2017 |
| CN | 107211156 A | 9/2017 |
| CN | 107801039 A | 3/2018 |
| CN | 107852490 A | 3/2018 |
| CN | 108028929 A | 5/2018 |
| CN | 108432250 A | 8/2018 |
| CN | 108781284 A | 11/2018 |
| CN | 108781294 A | 11/2018 |
| CN | 108965871 A | 12/2018 |
| CN | 109076214 A | 12/2018 |
| CN | 109076216 A | 12/2018 |
| CN | 109076218 A | 12/2018 |
| CN | 109076236 A | 12/2018 |
| CN | 109155855 A | 1/2019 |
| CN | 109600611 A | 4/2019 |
| CN | 109691102 A | 4/2019 |
| CN | 109792531 A | 5/2019 |
| CN | 109792533 A | 5/2019 |
| CN | 109996072 A | 7/2019 |
| CN | 110097889 A | 8/2019 |
| CN | 110140355 A | 8/2019 |
| CN | 110662036 A | 1/2020 |
| CN | 110677678 A | 1/2020 |
| EP | 1672930 A3 | 11/2010 |
| EP | 3468190 A1 | 4/2019 |
| EP | 3942823 A1 | 1/2022 |
| GB | 2577318 A | 3/2020 |
| GB | 2581852 A | 9/2020 |
| GB | 2586484 A | 2/2021 |
| IN | 104702963 A | 6/2015 |
| JP | 2015015575 A | 1/2015 |
| JP | 2017520162 A | 7/2017 |
| JP | 6280679 B2 | 2/2018 |
| JP | 2020017970 A | 1/2020 |
| KR | 20140056342 A | 5/2014 |
| KR | 1020150057591 A | 5/2015 |
| KR | 20170018819 A | 2/2017 |
| KR | 20180128955 A | 12/2018 |
| KR | 20180129584 A | 12/2018 |
| KR | 20200126813 A | 11/2020 |
| RU | 2686559 C2 | 4/2019 |
| WO | 2014106692 A1 | 7/2014 |
| WO | 2015008479 A1 | 1/2015 |
| WO | 2015038877 A1 | 3/2015 |
| WO | 2015056941 A1 | 4/2015 |
| WO | 2015142556 A2 | 9/2015 |
| WO | 2016100424 A1 | 6/2016 |
| WO | 2016120468 A1 | 8/2016 |
| WO | 2016127889 A1 | 8/2016 |
| WO | 2017083784 A1 | 5/2017 |
| WO | 2017137444 A1 | 8/2017 |
| WO | 2017157259 A1 | 9/2017 |
| WO | 2018099269 A1 | 6/2018 |
| WO | 2018113658 A1 | 6/2018 |
| WO | 2019008174 A1 | 1/2019 |
| WO | 2019010156 A1 | 1/2019 |
| WO | 2019073112 A1 | 4/2019 |
| WO | 2019078169 A1 | 4/2019 |
| WO | 2019/132577 A1 | 7/2019 |
| WO | 2019145262 A1 | 8/2019 |
| WO | 2019194507 A1 | 10/2019 |
| WO | 2019194568 A1 | 10/2019 |
| WO | 2019222060 A1 | 11/2019 |
| WO | 2020003273 A1 | 1/2020 |
| WO | 2020146582 A1 | 7/2020 |

(56) References Cited

FOREIGN PATENT DOCUMENTS

| WO | 2020222588 A1 | 11/2020 |
|---|---|---|
| WO | 2021049586 A1 | 3/2021 |
| WO | 2021052794 A1 | 3/2021 |

OTHER PUBLICATIONS

Document: JVET-N0236-r5, Luo, J., et al., "CE2-related: Prediction refinement with optical flow for affine mode," Joint Video Experts Team (JVET) of ITU-T SG 16 WP 3 and ISO/IEC JTC 1/SC 29/WG 11 14th Meeting: Geneva, CH, Mar. 19-27, 2019, 25 pages.
Series H: Audiovisual and Multimedia Systems Infrastructure of audiovisual services—Coding of moving video High efficiency video codingRec. ITU-T H.265 | ISO/IEC 23008-2, Feb. 2018, 692 pages.
Document: JCTVC-Y1002, Rosewarne, C., et al., "High Efficiency Video Coding (HEVC) Test Model 16 (HM 16) Improved Encoder Description Update 7," Joint Collaborative Team on Video Coding (JCT-VC) of ITU-T SG16 WP3 and ISO/IEC JTC1/SC29/WG11 25th Meeting: Chengdu, CN, Oct. 14-21, 2016, 70 pages.
Document: JVET-G1001-v1, Chen, J., et al., "Algorithm description of Joint Exploration Test Model 7 (JEM7)," Joint Video Experts Team (JVET) of ITU-T SG 16 WP 3 and ISO/IEC JTC 1/SC 29/WG 11 7th Meeting: Torino, IT, Jul. 13-21, 2017, 48 pages.
Retrieved from the internet: JEM-7.0: https://jvet.hhi.fraunhofer.de/svn/svn_HMJEMSoftware/tags/ HM-16.6-JEM-7.0, Apr. 17, 2023, 1 page.
Document: JVET-L0124-v2, Liao, R., et al., "CE10.3.1.b: Triangular prediction unit mode," Joint Video Exploration Team (JVET) of ITU-T SG 16 WP 3 and ISO/IEC JTC 1/SC 29/WG 11 12th Meeting: Macao, CN, Oct. 3-12, 2018, 8 pages.
Document: JVET-L0368-v2, Chen, H., et al., "CE4: Affine merge enhancement with simplification (Test 4.2.2)," Joint Video Experts Team (JVET) of ITU-T SG 16 WP 3 and ISO/IEC JTC 1/SC 29/WG 11 12th Meeting: Macao, CN, Oct. 3-12, 2018, 7 pages.
Document: JVET-L0332-v1, Liu, H., et al., "CE4-related: Adaptive Motion Vector Resolution for Affine Inter Mode," Joint Video Experts Team (JVET) of ITU-T SG 16 WP 3 and ISO/IEC JTC 1/SC 29/WG 11 12th Meeting: Macao, CN, Oct. 3-12, 2018, 8 pages.
Document: JVET-K0247-v1, Lai, C., et al., "CE4.3.4: Removal of AMVR flag constraint," Joint Video Experts Team (JVET) of ITU-T SG 16 WP 3 and ISO/IEC JTC 1/SC 29/WG 11 11th Meeting: Ljubljana, SI, Jul. 10-18, 2018, 3 pages.
Document: JVET-L1001-v5, Bross, B., et al., "Versatile Video Coding (Draft 3)," Joint Video Experts Team (JVET) of ITU-T SG 16 WP 3 and ISO/IEC JTC 1/SC 29/WG 11 12th Meeting: Macao, CN, Oct. 3-12, 2018, 193 pages.
Document: JVET-M0381, Laroche, G., et al., "CE2: On Subblock Merge index coding (Test CE2.2.2)," Joint Video Experts Team (JVET) of ITU-T SG 16 WP 3 and ISO/IEC JTC 1/SC 29/WG 11 13th Meeting: Marrakech, MA, Jan. 9-18, 2019, 6 pages.
Document: JVET-M0240, Lee, H., et al., "CE2-related: Simplification of subblock-based temporal merging candidates," Joint Video Experts Team (JVET) of ITU-T SG 16 WP 3 and ISO/IEC JTC 1/SC 29/WG 11 13th Meeting: Marrakech, MA, Jan. 9-18, 2019, 6 pages.
Document: JVET-M0273, Zhang, L., et al., "CE2-related: Early awareness of accessing temporal blocks in sub-block merge list construction," Joint Video Experts Team (JVET) of ITU-T SG 16 WP 3 and ISO/IEC JTC 1/SC 29/WG 11 13th Meeting: Marrakech, MA, Jan. 9-18, 2019, 4 pages.
Document: JVET-M1001-v7, Bross, B., et al., "Versatile Video Coding (Draft 4)," Joint Video Experts Team (JVET) of ITU-T SG 16 WP 3 and ISO/IEC JTC 1/SC 29/WG 11 13th Meeting: Marrakech, MA, Jan. 9-18, 2019, 300 pages.
Document: JVET-M0651, Li, G., Crosscheck of JVET-N0236 (CE2-related: Prediction refinement with optical flow for affine mode), Joint Video Experts Team (JVET) of ITU-T SG 16 WP 3 and ISO/IEC JTC 1/SC 29/WG 11 14th Meeting: Geneva, CH, Mar. 19-27, 2019, 2 pages.
Document: JVET-N1001-v5, Bross, B., et al., "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, 374 pages.
Document: JVET-L0632-v1, Chen, H., et al., "Crosscheck of JVET-L0142 (CE4: Simplification of the common base for affine merge (Test 4.2.6)," Joint Video Experts Team (JVET) of ITU-T SG 16 WP 3 and ISO/IEC JTC 1/SC 29/WG 11 12th Meeting: Macao, CN, Oct. 3-12, 2018, 7 pages.
Document: JVET-K0337, Han, Y., et al., "CE4.1.3: Affine motion compensation prediction," Joint Video Exploration Team (JVET) of ITU-T SG 16 WP 3 and ISO/IEC JTC 1/SC 29/WG 11 11th Meeting: Ljubljana, SI, Jul. 10-18, 2018, 6 pages.
Document: JCTVC-L0368, Lee, H., et al., "Cross-check of JCTVC-L0279 on motion data compression," Joint Collaborative Team on Video Coding (JCT-VC) of ITU-T SG 16 WP 3 and ISO/IEC JTC 1/SC 29/WG 11 12th Meeting: Geneva, CH, Jan. 14-23, 2013, 2 pages.
Bossen, F., Retrieved from the internet: vcgit.hhi.fraunhofer.de/jvet/VVCSoftware_VTM/tags/VTM-5.0, Apr. 17, 2023, 2 pages.
Document: JVET-M0246_r1, Liu, H., et al., "CE2: Adaptive Motion Vector Resolution for Affine Inter Mode (Test 2.1.2)," Joint Video Experts Team (JVET) of ITU-T SG 16 WP 3 and ISO/IEC JTC 1/SC 29/WG 11 13th Meeting: Marrakech, MA, Jan. 9-18, 2019, 10 pages.
Document: JVET-Q2001-vD, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 511 pages.
Document: JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 512 pages.
ITU-T and ISO/IEC, "Information technology—High Efficiency coding and media delivery in heterogeneous environments—Part 2: High efficiency video coding," Rec. ITU-T H.265 | ISO/IEC 23008-2 (in force edition), ISO/IEC JTC 1/SC 29/WG 11 N17661, Apr. 20, 20108, 8 pages.
Document: JVET-P0377-v1, Zhang, K., et al., "AHG12: Cleanups on syntax design of sub-pictures," Joint Video Experts Team (JVET) of ITU-T SG 16 WP 3 and ISO/IEC JTC 1/SC 29/WG 11 16th Meeting: Geneva, CH, Oct. 1-11, 2019, 4 pages.
Document: JVET-Q2002-v3, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.
Suehring, K., Retrieved from the internet: VTM software: https://vcgit.hhi.fraunhofer.de/jvet/VVCSoftware_VTM.git, Apr. 17, 2023, 3 pages.
Document: JVET-Q0270, Pettersson, M., et al., "AHG9: On Picture Header Modifications," Joint Video Experts Team (JVET) of ITU-T SG 16 WP 3 and ISO/IEC JTC 1/SC 29/WG 11 17th Meeting: Brussels, BE, Jan. 7-17, 2020, 7 pages.
Document: JVET-O0553_r1, Li, X., et al., "Non-CE4: On prediction refinement with optical flow," Joint Video Experts Team (JVET) of ITU-T SG 16 WP 3 and ISO/IEC JTC 1/SC 29/WG 11 15th Meeting: Gothenburg, SE, Jul. 3-12, 2019, 22 pages.
Document: JVET-O0070, Luo, J., et al., "CE4: Prediction refinement with optical flow for affine mode (Test 2.1)," Joint Video Experts Team (JVET) of ITU-T SG 16 WP 3 and ISO/IEC JTC 1/SC 29/WG 11 15th Meeting: Gothenburg, SE, Jul. 3-12, 2019, 4 pages.
JVET-O2002-v2, Chen, J., et al., "Algorithm description for Versatile Video Coding and Test Model 6 (VTM 6)," Joint Video Experts Team (JVET) of ITU-T SG 16 WP 3 and ISO/IEC JTC 1/SC 29/WG 11 15th Meeting: Gothenburg, SE, Jul. 3-12, 2019, 87 pages.
Alshin, A., et al., "Bi-directional optical flow for improvement motion compensation," 28th Picture Coding Symposium, PCS2010, Dec. 8-10, 2010, Nagoya, Japan, 4 pages.
Document: JVET-P0129, He, Y., et al., "AHG12: On subpicture grid syntax," Joint Video Experts Team (JVET) of ITU-T SG 16 WP 3 and ISO/IEC JTC 1/SC 29/WG 11 16th Meeting: Geneva, CH, Oct. 1-11, 2019, 3 pages.

(56) References Cited

OTHER PUBLICATIONS

Foreign Communication From a Related Counterpart Application, PCT Application No. PCT/CN2021/082242, International Search Report dated Jun. 22, 2021, 11 pages.
Foreign Communication From a Related Counterpart Application, PCT Application No. PCT/CN2021/082243, International Search Report dated Jun. 21, 2021, 13 pages.
Foreign Communication From a Related Counterpart Application, European Application No. 20810559.3, Extended European Search Report dated May 19, 2022, 7 pages.
Foreign Communication From a Related Counterpart Application, European Application No. 20809576.0, Extended European Search Report dated May 19, 2022, 7 pages.
Non-Final Office Action dated Feb. 4, 2022, 7 pages, U.S. Appl. No. 17/521,043, filed Nov. 8, 2021.
Final Office Action dated May 6, 2022, 22 pages, U.S. Appl. No. 17/521,012, filed Nov. 8, 2021.
Non-Final Office Action dated Jan. 24, 2022, 8 pages, U.S. Appl. No. 17/521,012, filed Nov. 8, 2021.
Non-Final Office Action dated Mar. 3, 2022, 17 pages, U.S. Appl. No. 17/520,975, filed Nov. 8, 2021.
Foreign Communication From a Related Counterpart Application, PCT Application No. PCT/CN2020/091537, International Search Report dated Jul. 29, 2020, 8 pages.
Foreign Communication From a Related Counterpart Application, PCT Application No. PCT/CN2020/091538, International Search Report dated Aug. 19, 2020, 10 pages.
Foreign Communication From a Related Counterpart Application, PCT Application No. PCT/CN2020/091539, International Search Report dated Aug. 21, 2020, 9 pages.
Foreign Communication From a Related Counterpart Application, PCT Application No. PCT/CN2020/091540, International Search Report dated Jul. 30, 2020, 10 pages.
Foreign Communication From a Related Counterpart Application, PCT Application No. PCT/CN2020/133271, International Search Report dated Mar. 8, 20201, 10 pages.
Foreign Communication From a Related Counterpart Application, European Application No. 21774361.6, Extended European Search Report dated Mar. 22, 2023, 8 pages.
Non-Final Office Action dated Mar. 13, 2023, 15 pages, U.S. Appl. No. 17/950,411, filed Sep. 22, 2022.
Non-Final Office Action dated Feb. 16, 20203, 17 pages, U.S. Appl. No. 17/950,443, filed Sep. 22, 2022.
Boyce, Jill, "AHG15: On Interoperability Point Signalling," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0276, 2019.
Boyce et al. "Sub-Pictures and Sub-Picture Sets with Level Derivation," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0555, 2019.
Bross et al. "Versatile Video Coding (Draft 4)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M1001, 2019.
Bross et al. "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2001, 2019.
Bross et al. "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P2001, 2019.
Chen et al. "AHG17: [SYS-VVC] Signalling Subpicture Coded Video Sequence," Joint Video Experts Team (JVET) of ITU-T SG 16 WP 3 and ISO/IEC JTC 1/SC 29/WG 11 14th Meeting: Geneva, Switzerland, Mar. 19-27, 2019, document JVET-N0073, 2019.
Chen et al. "AHG17/AHG12: On Signalling the Subpicture IDs," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0141, 2019.
Chen et al. "AHG17/AHG12: On Signalling of Subpicture Structure in the SPS," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0143, 2019.
Chen et al. "AHG17/AHG12: On Associating Slices with a Subpicture," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0144, 2019.
Choi et al. "AHG17: On Decoded Picture Buffer Management for VVC," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0154, 2019.
Choi et al. "AHG8/AHG12: On Sub-Picture Partitioning Support with Layers," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0334, 2019.
Choi et al. AHG8/AHG17: On Signaling Reference Picture Resampling, Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0219, 2019.
Fu et al. "CE4-Related: Quadtree-Based Merge Estimation Region for VVC," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0350, 2019.
Gao et al. "Simplified GEO without Multiplication and Minimum Blending Mask Storage (Harmonization of JVET-P0107, JVET-P0264 and JVET-P0304)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0084, 2019.
Hannuksela et al. "AHG12: On Grouping of Tiles," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0261, 2019.
Hannuksela et al. "AHG12: Summary of HLS Proposals on Subpictures," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0693, 2019.
He et al. "AHG12: On Picture and Sub-Picture Signaling," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0182, 2019.
Misra et al. "Cross-Component Adaptive Loop Filter for Chroma," Joint Video Experts Team (JVET) of ITU-T SG 16 WP 3 and ISO/IEC JTC 1/SC 29/WG 1115th Meeting: Gothenburg, SE, Jul. 3-12, 2019, document JVET-O0636, 2019.
Misra et al. "CE5-related: On the Design of CC-ALF," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P1008, 2019.
Sullivan et al. "Meeting Report of the 15th Meeting of the Joint Video Experts Team (JVET), Gothenburg, SE, Jul. 3-12, 2019," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2000, 2019.
Wang et al. "AHG12: Sub-Picture-Based Coding for VVC," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0107, 2019.
Wang et al. "AHG12: Harmonized Proposal for Sub-Picture-based Coding for VVC," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0826, 2019.
Wang et al. "AHG12: Sub-Picture Based Motion-Constrained Independent Regions," Joint Video Experts Team (JVET) of ITU-T SG 16 WP 3 and ISO/IEC JTC 1/SC 29/WG 11 15th Meeting: Gothernburg, SE, Jul. 3-12, 2019, document JVET-O0141, 2019.
Wennersten et al. "Encoder-Only GOP-Based Temporal Filter," Joint Collaborative Team on Video Coding (JCT-VC) of ITU-T SG 16 WP 3 and ISO/IEC JTC 1/SC 29/WG 11 35th Meeting: Geneva, CH, Mar. 22-27, 2019, document JCTVC-AI0023, 2019.

(56) References Cited

OTHER PUBLICATIONS

Xu et al. "Non-CE8: On IBC Reference Buffer Design," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0472, 2019.
Zhang et al.a "CE4: History-Based Motion Vector Prediction (Test 4.4.7)," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0266, 2018.
Zhang et al. "CE4-Related: Restrictions on History-Based Motion Vector Prediction," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0272, 2019.
Zhu et al. "CE8-related: Palette Mode Coding," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0258, 2019.
http://phenix.it-sudparis.eu/jvet/doc_end_user/current_document.phpid=5755, Jun. 22, 2022.
https://vcgit.hhi.fraunhofer.de/jvet/VVCSoftware_VTM/tags/VTM-5.0, Jun. 22, 2022.
Senanayake et al. "High Performance Hardware Architectures for Intra Block Copy and Palette Coding for HEVC Screen Content Coding Extension," 2017 IEEE, 978-1-5090-4825-0/17/$31.00.
Chen et al. "AHG8: Adaptive Resolution Change," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0303, 2019. (cited in EP20852929.7 EESR mailed Sep. 26, 2022).
Chen et al. "AHG8: Integrated Specification Text for Reference Picture Resampling," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O1164, 2019. (cited in EP20852929.7 EESR mailed Sep. 26, 2022).
Fan et al. "CE6-2.3-Related: Reduced 8×8 Matrices for LFNST," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0545, 2019. (cited in EP20871705.8 EESR mailed Oct. 31, 2022).
Hendry et al. "HG8: Support for Reference Picture Resampling—Handling of Picture Size Signalling, Conformance Windows, and DPB Management," Joint Video Experts Team (JVET) of ITU-T SG 16 WP 3 and ISO/IEC JTC 1/SC 29/WG 11 15th Meeting: Gothernburg, SE, Jul. 3-12, 2019, document JVET-O0133, 2019. (cited in EP20852929.7 EESR mailed Sep. 26, 2022).
Hsiang et al. "AHG9/AHG12: Modifications Related to Subpicture Signalling and RPR," Joint Video Experts Team (JVET) of ITU-T SG 16 WP3 and ISO/IEC JTC 1/SC 29/WG 11 17th Meeting Brussels, BE, Jan. 7-17, 2020, document JVET-Q0290, 2020. (cited in EP20852929.7 EESR mailed Sep. 26, 2022).
Nishi et al. "AHG9: Constraint About Usage of Reference Picture Resampling and Subpictures," Joint Video Experts Team (JVET) of ITU-T SG 16 WP3 and ISO/IEC JTC 1/SC 29/WG 11 17th Meeting Brussels, BE, Jan. 7-17, 2020, document JVET-Q0043, 2020. (cited in EP20852929.7 EESR mailed Sep. 26, 2022).
Samuelsson et al. "AHG 8: Adaptive Resolution Change (ARC) High-Level Syntax (HLS)," Joint Video Experts Team (JVET) of ITU-T SG 16 WP 3 and ISO/IEC JTC 1/SC 29/WG 11 15th Meeting, Gothenburg, SE Jul. 3-12, 2019, document JVET-O0204, 2019.(cited in EP20852929.7 EESR mailed Sep. 26, 2022).
Suehring et al. "AHG9: Subpicture Location Signalling Bugfix," Joint Experts Team (JVET) of ITU-T SG 16 WP 3 and ISO/IEC JTC 1/SC 29/WG 11 17th Meeting, Brussels, BE, Jan. 7-17, 2020, document JVET-Q0787, 2020. (cited in EP20876854.9 EESR mailed Oct. 31, 2022).
Sullivan et al. "Meeting Report of the 17th Meeting of the Joint Video Experts Team (JVET), Brussels, BE, Jan. 7-17, 2020," Joint Video Experts Team (JVET) of ITU-T SG 16 WP 3 and ISO/IEC JTC 1/SC 29/WG 11 17th Meeting, Brussels, BE Jan. 7-17, 2020, document JVET-Q2000, 2020 (cited in EP20876854.9 EESR mailed Oct. 31, 2022).
Wang et al. "AHG12: A Summary of Proposals on Subpicture ID Signalling," Joint Video Experts Team (JVET) of ITU-T SG 16 WP 3 and iSO/IEC JTC 1/SC 29/WG 11 17th Meeting, Brussels, BE Jan. 7-17, 2020, document JVET-Q0590, 2020. (cited in EP20876854.9 EESR mailed Oct. 31, 2022).
'Information technology—High efficiency coding and media delivery in heterogeneous environments—Part 2: High Efficiency Video Coding, ISO/IEC JTC 1/SC 29/WG 11 N17661, Text of DIS ISO/IEC 23008—2:201x High Efficiency Video Coding (4th ed.), XP030024288, Apr. 20, 2018, 874 pages.
Document: JVET-Q0297, Huang, H., et al., "AHG16: Merge estimation region with constraint in HMVP update," Joint Video Experts Team (JVET) of ITU-T SG 16 WP 3 and ISO/IEC JTC 1/SC 29/WG 11 17th Meeting: Brussels, BE, 67—Jan. 17, 2020, 11 pages.
Document: JVET-N0055-v2, Choi et al. AHG12: on Sub-Picture Partitioning,"" Joint Video Experts Teams (JVET) of ITU-T SG 16 WP 3 and iSO/IEC JTC 1/SC 29/WG 11 14th Meeting, Geneva, CH, Mar. 19-27, 2019, 8 pages.
Document: JVET-O1170-v1, Xu et al. "Bitstream Conformance with a Virtual IBC Buffer Concept," Joint Video Experts Team (JVET) of ITU-T SG 16 WP 3 and ISO/IEC JTC 1/SC 29/WG 11 15th Meeting, Gothenburg, SE Jul. 3-12, 2019, 8 pages.
Document: JVET-M0457-v1, Ye et al. "CE8: Palette Predictor List Enhancement (Test 8.2.6)," Joint Video Experts Team (JVET) of ITU-T SG WP 3 and ISO/IEC JTC 1/SC 29/WG 11 13th Meeting, Marrakech, MA, Jan. 9-18, 2019, 3 pages.
Notice of Allowance from U.S. Appl. No. 17/665,220 dated Sep. 29, 2022.
Non Final Office Action from U.S. Appl. No. 17/723,175 dated Oct. 12, 2022.
Non Final Office Action from U.S. Appl. No. 17/861,728 dated Sep. 26, 2022.
Extended European Search Report from European Patent Application No. 20852929.7 dated Sep. 26, 2022 (15 pages).
Extended European Search Report from European Patent Application No. 20871705.8 dated Oct. 31, 2022 (10 pages).
Extended European Search Report from European Patent Application No. 20876854.9 dated Oct. 31, 2022 (13 pages).
Examination Report from Indian Patent Application No. 202247022804 dated Sep. 8, 2022 (6 pages).
Examination Report from Indian Patent Application No. 202247023112 dated Aug. 18, 2022 (6 pages).
Examination Report from Indian Patent Application No. 202247039697 dated Oct. 12, 2022 (7 pages).
Examination Report from Indian Patent Application No. 202247007118 dated Jul. 6, 2022 (7 pages).
Non Final Office Action from U.S. Appl. No. 17/723,089 dated Aug. 1, 2022.
International Search Report and Written Opinion from International Patent Application No. PCT/CN2020/108142 dated Oct. 28, 2020 (9 pages).
International Search Report and Written Opinion from International Patent Application No. PCT/CN2020/108159 dated Nov. 12, 2020 (9 pages).
International Search Report and Written Opinion from International Patent Application No. PCT/CN2020/108175 dated Nov. 18, 2020 (10 pages).
International Search Report and Written Opinion from International Patent Application No. PCT/CN2020/108182 dated Nov. 16, 2020 (11 pages).
International Search Report and Written Opinion from International Patent Application No. PCT/CN2020/119931 dated Jan. 12, 2021 (10 pages).
International Search Report and Written Opinion from International Patent Application No. PCT/CN2020/119932 dated Dec. 30, 2020 (9 pages).
International Search Report and Written Opinion from International Patent Application No. PCT/CN2020/121767 dated Jan. 27, 2021 (12 pages).

(56) References Cited

OTHER PUBLICATIONS

International Search Report and Written Opinion from International Patent Application No. PCT/CN2020/121768 dated Jan. 8, 2021 (13 pages).
International Search Report and Written Opinion from International Patent Application No. PCT/CN2020/139389 dated Mar. 24, 2021 (9 pages).
International Search Report and Written Opinion from International Patent Application No. PCT/CN2021/071008 dated Apr. 12, 2021 (13 pages).
International Search Report and Written Opinion from International Patent Application No. PCT/CN2021/071360 dated Apr. 18, 2021 (10 pages).
Non Final Office Action from U.S. Appl. No. 17/665,242 dated Apr. 15, 2022.
Non Final Office Action from U.S. Appl. No. 17/665,220 dated May 24, 2022.
Non Final Office Action from U.S. Appl. No. 17/665,275 dated May 25, 2022.
Non Final Office Action from U.S. Appl. No. 171711,294 dated Jun. 7, 2022.
Extended European Search Report from European Application No. 21738561.6 dated Dec. 22, 2022.
Extended European Search Report from European Application No. 20852734.1 dated Jan. 20, 2023.
Non-Final Office Action from U.S. Appl. No. 17/711,319 dated Jun. 8, 2022.
Bross et al., "Versatile Video Coding (Draft 5)," Joint Video Experts Team (JVET) of ITU-T SG 16 WP 3 and ISO/IEC JTC 1/SC 29/WG 11, 14th Meeting: Geneva, CH, Mar. 19-27, 2019, JVET-N1001-v8, 397 pages.
Chen et al., "Algorithm description for Versatile Video Coding and Test Model 9 (VTM 9)," Joint Video Experts Team (JVET) of ITU-T SG 16 WP 3 and ISO/IEC JTC 1/SC 29/WG 11, 18th Meeting: by teleconference, Apr. 15-24, 2020, JVET-R2002-v2, 14 pages.
Choi et al., "AHG8: Region-wise scalability support with reference picture resampling," Joint Video Experts Team (JVET) of ITU-T SG 16 WP 3 and ISO/IEC JTC 1/SC 29/WG 11, 15th Meeting: Gothensburg, SE, Jul. 3-12, 2019, JVET-O0336, 5 pages.
Li et al., "CE2: Memory bandwidth reduction for the affine mode (Test 2.4.3)," Joint Video Experts Team (JVET) of ITU-T SG 16 WP 3 and ISO/IEC JTC 1/SC 29/WG 11, 14th Meeting: Geneva, CH, Mar. 19-27, 2019, JVET-N0195- v1, 4 pages.
Li et al., "Non-CE4: Adaptive subblock size for affine motion compensation," Joint Video Experts Team (JVET) of ITU-T SG 16 WP 3 and ISO/IEC JTC 1/SC 29/WG 11, 15th Meeting: Gothenburg, SE, Jul. 3-12, 2019, JVET-O0530-v2, 5 pages.
Liu et al., "CE2-related: Joint Test of AMVR for Affine Inter Mode (Test 2.1.1 and Test 2.1.2)," Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M0247, 3 pages.
Xu et al., "Overview of the Emerging HEVC Screen Content Coding Extension," IEEE Transactions on Circuits and Systems for Video Technology, Jan. 2016, vol. 26, No. 1, pp. 1-19.
Bross et al., "Versatile Video Coding (Draft 6)," Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O2001-vE, 456 pages.

Hannuksela et al., "AHG12: Signalling of subpicture IDs and layout," Joint Video Experts Team (JVET) of ITU-T SG 16 WP 3 and ISO/IEC JTC 1/SC 29/WG 11, 16th Meeting: Geneva, CH, Oct. 1-11, 2019, Document: JVET-P0126, 2 pages.
Joshi et al., "Screen content coding test model 2 (SCM 2)," Joint Collaborative Team on Video Coding (JCT-VC) of ITU-T SG 16 WP 3 and ISO/IEC JTC 1/SC 29/WG 11, 17th Meeting: Valencia, ES, Mar. 27-Apr. 4, 2014, Document: JCTVC-R1014, 10 pages.
Wenger et al., "[AHG19] On Signaling of Adaptive Resolution Change," Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0052, 11 pages.
Chen et al., "Test Model 6 of Versatile Video Coding (VTM 6)", Joint Video Experts Team (JVET) of ITU-T SG 16 WP 3 and ISO/IEC JTC 1/SC 29/WG 11, 15th Meeting, Gothenburg; Document: JVET-O-2002-v2, Jul. 3-12, 2019, 88 pages.
Bross et al., "Versatile Video Coding (Draft 7)", Joint Video Experts Team (JVET) of ITU-T SG 16 WP 3 and ISO/IEC JTC 1/SC 29/WG 11, 16th Meeting: Geneva, CH, Document: JVET-P2001, Oct. 1-11, 2019, 491 pages.
Extended European Search Report and Search Opinion in European Application No. 23214125.9, mailed Feb. 6, 2024, 4 pages.
Liu et al., "Overview of HEVC extensions on screen content coding", APSIPA Transactions on Signal and Information Processing, online, Cambridge University Press, vol. 4, Sep. 22, 2015, 12 pages.
Misra et al., "CE5-2.1, CE5-2.2: Cross Component Adaptive Loop Filter", Joint Video Experts Team (JVET) of ITU-T SG 16 WP 3 and ISO/IEC JTC 1/SC 29/WG 11, 16th Meeting: Geneva, CH, Oct. 1-11, 2019, Document JVET-P0080, 7 pages.
Norkin et al., "BoG Report on CE5 Loop Filtering Related Contributions", Joint Video Experts Team (JVET) of ITU-T SG 16 WP 3 and ISO/IEC JTC1/SC 29/WG 11, 16th Meeting: Geneva, CH, Oct. 1-11, 2019, Document JVET-P1033, 34 pages.
Pu et al., "Palette Mode Coding in HEVC Screen Content Coding Extension", IEEE Journal on Emerging and Selected Topics in Circuits and Systems, vol. 6, No. 4, Dec. 2016, 13 pages.
Segall et al., "BoG Report on CE5 Related Contributions", Joint Video Experts Team (JVET) of ITU-T SG 16 WP3 and ISO/IEC JTC 1/SC 29/WG 11, 17th Meeting, Brussels, BE, Jan. 7-17, 2020, Document JVET-Q0780, 10 pages.
Sun et al., "Improvements of HEVC SCC Palette Mode and Intra Block Copy", IEEE Journal on Emerging and Selected Topics in Circuits and Systems, vol. 6, No. 4, Dec. 2016, 13 pages.
Wang et al., "Non-CE5: On CC-ALF Paddling for ALF Virtual Boundaries", Joint Video Experts Team (JVET) of ITU-T SG 16 WP 3 and ISO/IEC JTC 1/SC 29/WG 11, 17th Meeting, Brussels, BE, Jan. 7-17, 2020, Document JVET- Q0311-v2, 6 pages.
Wang et al., "Non-CE5: Suggested Text for CC-ALF Padding Process with Raster Scan Slices", Joint Video Experts Team (JVET) of ITU-T SG 16 WP 3 and ISO/IEC JTC 1/SC 29/WG 11, 17th Meeting, Brussels, BE, Jan. 7-17, 2020, Document JVET-Q0310, 3 pages.
Xu et al., "Intra Block Copy in HEVC Screen Content Coding Extensions", IEEE Journal on Emerging and Selected Topics in Circuits and Systems, vol. 6, No. 4, Dec. 2016, 11 pages.
Zhou et al., "JVET-AHG Report: Implementation Studies (AHG16)", Joint Video Experts Team (JVET) of ITU-T SG 16 WP 3 and ISO/IEC JTC 1/SC 29/WG 11, 16th Meeting: Geneva, CH, Oct. 1-11, 2019, Document JVET-P0016, 7 pages.

* cited by examiner

SLICE LEVEL SIGNALING IN VIDEO BITSTREAMS THAT INCLUDE SUBPICTURES

CROSS REFERENCE TO RELATED APPLICATIONS

This application is a continuation of U.S. application Ser. No. 17/711,319, filed on Apr. 1, 2022, which is a continuation of International Application No. PCT/CN2020/119931, filed on Oct. 9, 2020, which claims the priority to and benefits of International Patent Application No. PCT/CN2019/109809, filed on Oct. 2, 2019. All the aforementioned patent applications are hereby incorporated by reference in their entireties.

TECHNICAL FIELD

The present disclosure is related to video and image coding and decoding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed embodiments may be used by video or image decoder or encoder embodiments in which sub-picture based coding or decoding is performed.

In one example aspect a method of video processing is disclosed. The method includes performing a conversion between a video comprising one or more pictures and a bitstream representation of the video. The bitstream representation is required to conform to a format rule that specifies that each picture is coded as one or more slices, wherein the format rule prohibits samples in a picture from not being covered by any of the one or more slices.

In another example aspect a method of video processing is disclosed. The method includes determining, for a conversion between a picture of a video and a bitstream representation of the video, a manner of signalling information of one or more slices in the picture according to a rule that is associated a number of tiles or a number of bricks in the picture. The method also includes performing the conversion based on the determining.

In another example aspect a method of video processing is disclosed. The method includes performing a conversion between a picture of a video and a bitstream representation of the video according to a rule. The picture is coded in the bitstream representation as one or more slices and the rule specifies whether or how an address of a slice of the picture is included in the bitstream representation.

In another example aspect a method of video processing is disclosed. The method includes determining, for a conversion between a picture of a video and a bitstream representation of the video, whether a syntax element indicating a filter operation that accesses samples across multiple bricks in the picture is enabled is included in the bitstream representation based on a number of tiles or a number of bricks in the picture. The method also includes performing the conversion based on the determining.

In another example aspect a method of video processing is disclosed. The method includes performing a conversion between a picture of a video and a bitstream representation of the video, wherein the picture comprises one or more sub-pictures, and wherein a number of the one or more sub-pictures is indicated by a syntax element in the bitstream representation.

In another example aspect a method of video processing is disclosed. The method includes performing a conversion between a picture of a video that comprises one or more sub-pictures and a bitstream representation of the video. The bitstream representation conforms to a format rule that specifies that information about a sub-picture is included in the bitstream representation based on at least one of: (1) one or more corner positions of the sub-picture, or (2) a dimension of the sub-picture.

In another example aspect a method of video processing is disclosed. The method includes determining that a reference picture resampling tool is enabled for a conversion between a picture of a video and a bitstream representation of the video due to the picture being divided into one or more sub-pictures. The method also includes performing the conversion based on the determining.

In another example aspect a method of video processing is disclosed. The method includes performing a conversion between video comprising a video picture comprising one or more sub-pictures comprising one or more slices and a bitstream representation of the video. The bitstream representation conforms to a format rule that specifies that, for a sub-picture and a slice, in case that an index identifying the sub-picture is included in a header of the slice, an address field for the slice indicates an address of the slice in the sub-picture.

In another example aspect a method of video processing is disclosed. The method includes determining, for a video block in a first video region of a video, whether a position at which a temporal motion vector predictor is determined for a conversion between the video block and a bitstream representation of the current video block using an affine mode is within a second video region; and performing the conversion based on the determining.

In another example aspect, another method of video processing is disclosed. The method includes determining, for a video block in a first video region of a video, whether a position at which an integer sample in a reference picture is fetched for a conversion between the video block and a bitstream representation of the current video block is within a second video region, wherein the reference picture is not used in an interpolation process during the conversion; and performing the conversion based on the determining.

In another example aspect, another method of video processing is disclosed. The method includes determining, for a video block in a first video region of a video, whether a position at which a reconstructed luma sample value is fetched for a conversion between the video block and a bitstream representation of the current video block is within a second video region; and performing the conversion based on the determining.

In another example aspect, another method of video processing is disclosed. The method includes determining, for a video block in a first video region of a video, whether a position at which a check regarding splitting, depth derivation or split flag signalling for the video block is performed during a conversion between the video block and a bitstream representation of the current video block is within a second video region; and performing the conversion based on the determining.

In another example aspect, another method of video processing is disclosed. The method includes performing a conversion between a video comprising one or more video pictures comprising one or more video blocks, and a coded representation of the video, wherein the coded representation complies with a coding syntax requirement that the conversion is not to use sub-picture coding/decoding and a dynamic resolution conversion coding/decoding tool or a reference picture resampling tool within a video unit.

In another example aspect, another method of video processing is disclosed. The method includes performing a conversion between a video comprising one or more video pictures comprising one or more video blocks, and a coded representation of the video, wherein the coded representation complies with a coding syntax requirement that a first syntax element subpic_grid_idx[i][j] is not larger than a second syntax element max_subpics_minus1.

In yet another example aspect, the above-described method may be implemented by a video encoder apparatus that comprises a processor.

In yet another example aspect, the above-described method may be implemented by a video decoder apparatus that comprises a processor.

In yet another example aspect, these methods may be embodied in the form of processor-executable instructions and stored on a computer-readable program medium.

These, and other, aspects are further described in the present disclosure.

DETAILED DESCRIPTION

The present disclosure provides various embodiments that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these embodiments during the process of encoding in order to reconstruct decoded frames used for further encoding.

Section headings are used in the present disclosure for ease of understanding and do not limit the embodiments to the corresponding sections. As such, embodiments from one section can be combined with embodiments from other sections.

SUMMARY

This disclosure is related to video coding technologies. Specifically, it is related to palette coding with employing base colors based representation in video coding. It may be applied to the existing video coding standard like high efficiency video coding (HEVC), or the standard (e.g., versatile video coding (VVC)) to be finalized. It may be also applicable to future video coding standards or video codec.

INITIAL DISCUSSION

Video coding standards have evolved primarily through the development of the well-known International Telecommunication Union (ITU) Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards[1,2]. Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting a 50% bitrate reduction compared to HEVC.

The Region Constraint in TMVP and Sub-Block TMVP in VVC

Figure 1:
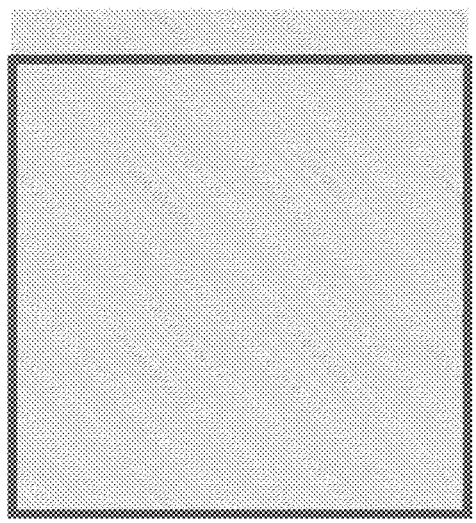
FIG. 1 shows an example of region constraint in temporal motion vector prediction (TMVP) and sub-block TMVP.

FIG. 1 illustrates example region constraint in TMVP and sub-block TMVP. In TMVP and sub-block TMVP, it is constrained that a temporal motion vector (MV) can only be fetched from the collocated CTU plus a column of 4×4 blocks as shown in FIG. 1.

Example Sub-Picture

In some embodiments, sub-picture-based coding embodiments based on flexible tiling approach can be implemented. A summary of the sub-picture-based coding embodiments includes the following:

(1) Pictures can be divided into sub-pictures.

(2) The indication of existence of sub-pictures is indicated in the sequence parameter set (SPS), along with other sequence-level information of sub-pictures.

(3) Whether a sub-picture is treated as a picture in the decoding process (excluding in-loop filtering operations) can be controlled by the bitstream.

(4) Whether in-loop filtering across sub-picture boundaries is disabled can be controlled by the bitstream for each sub-picture. The deblocking filter (DBF), sample adaptive offset (SAO) filter, and adaptive loop filter (ALF) processes are updated for controlling of in-loop filtering operations across sub-picture boundaries.

(5) For simplicity, as a starting point, the sub-picture width, height, horizontal offset, and vertical offset are signalled in units of luma samples in SPS. Sub-picture boundaries are constrained to be slice boundaries.

(6) Treating a sub-picture as a picture in the decoding process (excluding in-loop filtering operations) is specified by slightly updating the coding_tree_unit( ) syntax, and updates to the following decoding processes:

The derivation process for (advanced) temporal luma motion vector prediction

The luma sample bilinear interpolation process

The luma sample 8-tap interpolation filtering process

The chroma sample interpolation process (7) Sub-picture IDs are explicitly specified in the SPS and included in the tile group headers to enable extraction of sub-picture sequences without the need of changing video coding layer (VCL) network abstraction layer (NAL) units.

(8) Output sub-picture sets (OSPS) are proposed to specify normative extraction and conformance points for sub-pictures and sets thereof.

Example Sub-Pictures in Versatile Video Coding

Sequence parameter set (SPS) raw byte sequence payload (RBSP) syntax

|  | Descriptor |
|---|---|
| seq_parameter_set_rbsp( ) { |  |
|     sps_decoding_parameter_set_id | u(4) |
|     sps_video_parameter_set_id | u(4) |
| ... |  |
|     pic_width_max_in_luma_samples | ue(v) |
|     pic_height_max_in_luma_samples | ue(v) |
|     sub_pics_present_flag | u(1) |
|     if( subpics_present_flag ) { |  |
|         max_subpics_minus1 | u(8) |
|         sub_pic_grid_col_width_minus1 | u(v) |
|         sub_pic_grid_row_height_minus1 | u(v) |
|         for( i = 0; i < NumSubPicGridRows; i++ ) |  |
|             for( j = 0; j < NumSubPicGridCols; j++ ) |  |
|                 subpic_grid_idx[ i ][ j ] | u(v) |
|         for( i = 0; i <= NumSubPics; i++ ) { |  |
|             subpic_treated_as_pic_flag[ i ] | u(1) |
|             loop_filter_across_subpic_enabled_flag[ i ] | u(1) |
|         } |  |
|     } |  |
| ... |  |
| } |  | subpics_present_flag equal to 1 indicates that sub-picture parameters are present in the present in the SPS RBSP syntax. subpics_present_flag equal to 0 indicates that sub-picture parameters are not present in the present in the SPS RBSP syntax.

NOTE 2—When a bitstream is the result of a sub-bitstream extraction process and contains only a subset of the sub-pictures of the input bitstream to the sub-bitstream extraction process, it might be required to set the value of subpicspresent_flag equal to 1 in the RBSP of the SPSs.

maxsubpics_minus1 plus 1 specifies the maximum number of sub-pictures that may be present in the CVS. max_subpics_minus1 shall be in the range of 0 to 254. The value of 255 is reserved for future use by ITU-T ISO/IEC.

subpic_grid_col_width_minus1 plus 1 specifies the width of each element of the sub-picture identifier grid in units of 4 samples. The length of the syntax element is Ceil(Log 2(pic_width_max_in_luma_samples/4)) bits. The variable NumSubPicGridCols is derived as follows:

$$\text{NumSubPicGridCols} = (pic\_width\_max\_inlu masamples + subpic\_grid\_col\_width\_minus1*4 + 3)/(subpic\_grid\_col\_width\_minus1*4 + 4) \qquad (7\text{-}5)$$

subpic_grid_row_height_minus1 plus 1 specifies the height of each element of the sub-picture identifier grid in units of 4 samples. The length of the syntax element is Ceil(Log 2(pic_height_max_in_luma_samples/4)) bits. The variable NumSubPicGridRows is derived as follows:

$$\text{NumSubPicGridRows} = (pic\_height\_max\_in\_lu masamples + subpic\_grid\_row\_height\_minus1*4 + 3)/(subpic\_grid\_row\_height\_minus1*4 + 4) \qquad (7\text{-}6)$$

subpic_grid_idx[i][j] specifies the sub-picture index of the grid position (i,j). The length of the syntax element is Ceil(Log 2(max_subpics_minus1+1)) bits.

The variables SubPicTop[subpic_grid_idx[i][j]], SubPicLeft[subpic_grid_idx[i][j]], SubPicWidth[subpic_grid_idx[i][j]], SubPicHeight[subpic_grid_idx[i][j]], and NumSubPics are derived as follows:

```
NumSubPics = 0
for( i = 0; i. < NumSubPicGridRows; i++ ) {
  for( j = 0; j < NumSubPicGridCols; j++ ) {
    if( i = = 0)     SubPicTop[ subpic_grid_idx[ i ][ j ] ] = 0
    else if( subpic_grid_idx[ i ][ j ] != subpic_grid_idx[ i - 1 ][ j ] ) {
      SubPicTop[ subpic_grid_idx[ i ][ j ] ] = i
      SubPicHeight[ subpic_grid_idx[ i - 1][ j ] ] = i - SubPicTop[
```

-continued

```
            subpic_grid_idx[ i - 1 ][ j ] ]
        }
        if( j = = 0)
            SubPicLeft[ subpic_grid_idx[ i ][ j ] ] = 0
        else if (subpic_grid_idx[ i ][ j ] != subpic_grid_idx[ i ][ j - 1 ] ) {
            SubPicLeft[ subpic_grid_idx[ i ][ j ] ] = j
    SubPicWidth[ subpic_grid_idx[ i ][ j ] ] = j - SubPicLeft[
    subpic_grid_idx[ i ][ j - 1 ] ]
        }
        if ( i = = NumSubPicGridRows - 1)
    SubPicHeight[ subpic_grid_idx[ i ][ j ] ] = i - SubPicTop[
    subpic_grid_idx[ i - 1 ][ j ] ] + 1
        if (j = = NumSubPicGridRows - 1)
    SubPicWidth[ subpic_grid_idx[ i ][ j ] ] = j - SubPicLeft[
    subpic_grid_idx[ i ][ j - 1 ] ] + 1
            if( subpic_grid_idx[ i ][ j ] > NumSubPics)
                NumSubPics = subpic_grid_idx[ i ][ j ]
        }
    }
}
``` subpic_treated_as_pic_flag[i] equal to 1 specifies that the i-th sub-picture of each coded picture in the CVS is treated as a picture in the decoding process excluding in-loop filtering operations. subpic_treated_as_pic_flag[i] equal to 0 specifies that the i-th sub-picture of each coded picture in the CVS is not treated as a picture in the decoding process excluding in-loop filtering operations. When not present, the value of subpic_treated_as_pic_flag[i] is inferred to be equal to 0.

loop_filter_across_subpic_enabled_flag[i] equal to 1 specifies that in-loop filtering operations may be performed across the boundaries of the i-th sub-picture in each coded picture in the CVS. loop_filter_across_subpic_enabled_flag [i] equal to 0 specifies that in-loop filtering operations are not performed across the boundaries of the i-th sub-picture in each coded picture in the CVS. When not present, the value of loop_filter_across_subpic_enabledpic_flag[i] is inferred to be equal to 1.

It is a requirement of bitstream conformance that the following constraints apply:
   For any two sub-pictures subpicA and subpicB, when the index of subpicA is less than the index of subpicB, any coded NAL unit of subPicA shall succeed any coded NAL unit of subPicB in decoding order.
   The shapes of the sub-pictures shall be such that each sub-picture, when decoded, shall have its entire left boundary and entire top boundary consisting of picture boundaries or consisting of boundaries of previously decoded sub-pictures.

The list CtbToSubPicIdx[ctbAddrRs] for ctbAddrRs ranging from 0 to PicSizeInCtbsY-1, inclusive, specifying the conversion from a CTB address in picture raster scan to a sub-picture index, is derived as follows:

```
for( ctbAddrRs = 0; ctbAddrRs < PicSizeInCtbsY; ctbAddrRs++ ) {
    posX = ctbAddrRs % PicWidthInCtbsY * CtbSizeY
    posY = ctbAddrRs / PicWidthInCtbsY * CtbSizeY
    CtbToSubPicIdx[ ctbAddrRs ] = -1
    for( i = 0; CtbToSubPicIdx[ ctbAddrRs ] < 0 && i < NumSubPics;
    i++ ) {
        if( ( posX >= SubPicLeft[ i ] * ( subpic_grid_col_width_minus1 +
        1 ) * 4 ) &&
            ( posX < ( SubPicLeft[ i ] + SubPicWidth[ i ] ) *
                ( subpic_grid_col_width_minus1 + 1 ) * 4 ) &&
            ( posY >= SubPicTop[ i ] *
                ( subpic_grid_row_height_minus1 + 1 ) * 4 ) &&
            ( posY < ( SubPicTop[ i ] + SubPicHeight[ i ] ) *
                ( subpic_grid_row_height_minus1 + 1 ) * 4 ) )
            CtbToSubPicIdx[ ctbAddrRs ] = i
    }
}
``` num_bricks_in_slice_minus1, when present, specifies the number of bricks in the slice minus1. The value of num_bricks_in_slice_minus1 shall be in the range of 0 to NumBricksInPic−1, inclusive. When rect_slice_flag is equal to 0 and single_brick_per_slice_flag is equal to 1, the value of num_bricks_in_slice_minus1 is inferred to be equal to 0. When single_brick_per_slice_flag is equal to 1, the value of num_bricks_in_slice_minus1 is inferred to be equal to 0.

The variable NumBricksInCurrSlice, which specifies the number of bricks in the current slice, and SliceBrickIdx[i], which specifies the brick index of the i-th brick in the current slice, are derived as follows:

```
if( rect_slice_flag ) {
    sliceIdx = 0
    while( slice_address != slice_id[ sliceIdx ] )
        sliceIdx++
    NumBricksInCurrSlice = NumBricksInSlice[ sliceIdx ]
    brickIdx = TopLeftBrickIdx[ sliceIdx ]
    for( bIdx = 0; brickIdx <= BottomRightBrickIdx[ sliceIdx ];
    brickIdx++ )  (7-92)
        if( BricksToSliceMap[ brickIdx ] = = sliceIdx )
            SliceBrickIdx[ bIdx++ ] = brickIdx
} else {
    NumBricksInCurrSlice = num_bricks_in_slice_minus1 + 1
    SliceBrickIdx[ 0 ] = slice_address
    for( i = 1; i < NumBricksInCurrSlice; i++ )
        SliceBrickIdx[ i ] = SliceBrickIdx[ i - 1 ] + 1
}
```

The variables SubPicIdx, SubPicLeftBoundaryPos, SubPicTopBoundaryPos, SubPicRightBoundaryPos, and SubPicBotBoundaryPos are derived as follows:

```
SubPicIdx = CtbToSubPicIdx[ CtbAddrBsToRs[ FirstCtbAddrBs[
SliceBrickIdx[ 0 ] ] ] ]
if( subpic_treated_as_pic_flag[ SubPicIdx ] ) {
SubPicLeftBoundaryPos = SubPicLeft[ SubPicIdx ] *
    ( subpic_grid_col_width_minus1 + 1 ) * 4
SubPicRightBoundaryPos = ( SubPicLeft[ SubPicIdx ] + SubPicWidth[
SubPicIdx ] ) *
    ( subpic_grid_col_width_minus1 + 1 ) * 4
SubPicTopBoundaryPos = SubPicTop[ SubPicIdx ] *
    ( subpic_grid_row_height_minus1 + 1 )* 4
SubPicBotBoundaryPos = ( SubPicTop[ SubPicIdx ] + SubPicHeight[
SubPicIdx ] ) *
    ( subpic_grid_row_height_minus1 + 1 ) * 4
}
...
```

Derivation process for temporal luma motion vector prediction
   Inputs to this process are:
      a luma location (xCb, yCb) of the top-left sample of the current luma coding block relative to the top-left luma sample of the current picture,
      a variable cbWidth specifying the width of the current coding block in luma samples,
      a variable cbHeight specifying the height of the current coding block in luma samples,
      a reference index refIdxLX, with X being 0 or 1.
   Outputs of this process are:
      the motion vector prediction mvLXCol in 1/16 fractional-sample accuracy, the availability flag availableFlagLXCol.

The variable currCb specifies the current luma coding block at luma location (xCb, yCb).

The variables mvLXCol and availableFlagLXCol are derived as follows:
If slice_temporal_mvp_enabled_flag is equal to 0 or (cbWidth*cbHeight) is less than or equal to 32, both components of mvLXCol are set equal to 0 and availableFlagLXCol is set equal to 0.
Otherwise (slice_temporal_mvp_enabled_flag is equal to 1), the following ordered steps apply:
1. The bottom right collocated motion vector and the bottom and right boundary sample locations are derived as follows:

xColBr=$xCb$+cbWidth  (8-421)

yColBr=$yCb$+cbHeight  (8-422)

rightBoundaryPos=subpic_treated_aspic_flag[SubPicIdx]?SubPicRightBoundaryPos:
pic_width_in_luma_samples−1  (8-423)

botBoundaryPos=subpic_treated_aspic_flag[SubPicIdx]?SubPicBotBoundaryPos: pic_height_in_luma_samples−1  (8-424)

If yCb>>CtbLog 2SizeY is equal to yColBr>>CtbLog 2SizeY, yColBr is less than or equal to botBoundaryPos and xColBr is less than or equal to rightBoundaryPos, the following applies:
The variable colCb specifies the luma coding block covering the modified location given by ((xColBr>>3)<<3, (yColBr>>3)<<3) inside the collocated picture specified by ColPic.
The luma location (xColCb, yColCb) is set equal to the top-left sample of the collocated luma coding block specified by colCb relative to the top-left luma sample of the collocated picture specified by ColPic.
The derivation process for collocated motion vectors as specified in clause 8.5.2.12 is invoked with currCb, colCb, (xColCb, yColCb), refIdxLX and sbFlag set equal to 0 as inputs, and the output is assigned to mvLXCol and availableFlagLXCol.
Otherwise, both components of mvLXCol are set equal to 0 and availableFlagLXCol is set equal to 0.

Luma sample bilinear interpolation process
Inputs to this process are:
a luma location in full-sample units ($xInt_L$, $yInt_L$),
a luma location in fractional-sample units ($xFrac_L$, $yFrac_L$),
the luma reference sample array $refPicLX_L$.
Output of this process is a predicted luma sample value $predSampleLX_L$ The variables shift1, shift2, shift3, shift4, offset1, offset2 and offset3 are derived as follows:

shift1=$BitDepth_Y$−6  (8-453)

offset1=1<<(shift1−1)  (8-454)

shift2=4  (8-455)

offset2=1<<(shift2−1)  (8-456)

shift3=10−$BitDepth_Y$  (8-457)

shift4=$BitDepth_Y$−10  (8-458)

offset4=1<<(shift4−1)  (8-459)

The variable picW is set equal to pic_width_in_luma_samples and the variable picH is set equal to pic_height_in_luma_samples.

The luma interpolation filter coefficients $fb_L[p]$ for each ¹⁄₁₆ fractional sample position p equal to $xFrac_L$ or $yFrac_L$ are specified in Table 8-10.

The luma locations in full-sample units ($xInt_i$, $yInt_i$) are derived as follows for i=0..1:
If subpic_treated_aspic_flag[SubPicIdx] is equal to 1, the following applies:

$xInt_i$=Clip3(SubPicLeftBoundaryPos,SubPicRightBoundaryPos,$xInt_L$+i)  (8-460)

$yInt_i$=Clip3(SubPicTopBoundaryPos,SubPicBotBoundaryPos,$yInt_L$+i)  (8-461)

Otherwise (subpic_treated_as_pic_flag[SubPicIdx] is equal to 0), the following applies:

$xInt_i$=Clip3(0,picW−1,sps_ref wraparound_enabled_flag?

ClipH((sps_ref_wraparound_offset_minus1+1)
*MinCbSizeY,picW,($xInt_L$+i)):  (8-462)

$xInt_L$+i)

$yInt_i$=Clip3(0,picH−1,$yInt_L$+i)  (8-463)

Derivation process for subblock-based temporal merging candidates
Inputs to this process are:
a luma location (xCb, yCb) of the top-left sample of the current luma coding block relative to the top-left luma sample of the current picture,
a variable cbWidth specifying the width of the current coding block in luma samples,
a variable cbHeight specifying the height of the current coding block in luma samples.
the availability flag availableFlagA₁ of the neighbouring coding unit,
the reference index refIdxLXA₁ of the neighbouring coding unit with X being 0 or 1,
the prediction list utilization flag predFlagLXA₁ of the neighbouring coding unit with X being 0 or 1,
the motion vector in ¹⁄₁₆ fractional-sample accuracy mvLXA₁ of the neighbouring coding unit with X being 0 or 1.
Outputs of this process are:
the availability flag availableFlagSbCol,
the number of luma coding subblocks in horizontal direction numSbX and in vertical direction numSbY,
the reference indices refIdxL0SbCol and refIdxL1SbCol,
the luma motion vectors in ¹⁄₁₆ fractional-sample accuracy mvL0SbCol[xSbIdx][ySbIdx] and myL1SbCol[xSbIdx][ySbIdx] with xSbIdx=0..numSbX−1, ySbIdx=0 numSbY−1,
the prediction list utilization flags predFlagL0SbCol[xSbIdx][ySbIdx] and predFlagL1SbCol[xSbIdx][ySbIdx] with xSbIdx=0..numSbX−1, ySbIdx=0 numSbY−1.
The availability flag availableFlagSbCol is derived as follows.
If one or more of the following conditions is true, availableFlagSbCol is set equal to 0.
slice_temporal_mvp_enabled_flag is equal to 0.
sps_sbtmvp_enabled_flag is equal to 0.
cbWidth is less than 8.
cbHeight is less than 8.

Otherwise, the following ordered steps apply:
1. The location (xCtb, yCtb) of the top-left sample of the luma coding tree block that contains the current coding block and the location (xCtr, yCtr) of the below-right center sample of the current luma coding block are derived as follows:

xCtb=(xCb>>Ctu Log 2Size)<<Ctu Log 2Size    (8-542)

yCtb=(yCb>>Ctu Log 2Size)<<Ctu Log 2Size    (8-543)

xCtr=xCb+(cbWidth/2)    (8-544)

yCtr=yCb+(cbHeight/2)    (8-545)

2. The luma location (xColCtrCb, yColCtrCb) is set equal to the top-left sample of the collocated luma coding block covering the location given by (xCtr, yCtr) inside ColPic relative to the top-left luma sample of the collocated picture specified by ColPic.
3. The derivation process for subblock-based temporal merging base motion data as specified in clause 8.5.5.4 is invoked with the location (xCtb, yCtb), the location (xColCtrCb, yColCtrCb), the availability flag availableFlag$A_1$, and the prediction list utilization flag predFlagLX$A_1$, and the reference index refIdxLX$A_1$, and the motion vector mvLX$A_1$, with X being 0 and 1 as inputs and the motion vectors ctrMvLX, and the prediction list utilization flags ctrPredFlagLX of the collocated block, with X being 0 and 1, and the temporal motion vector tempMv as outputs.
4. The variable availableFlagSbCol is derived as follows:
   If both ctrPredFlagL0 and ctrPredFlagL1 are equal to 0, availableFlagSbCol is set equal to 0.
   Otherwise, availableFlagSbCol is set equal to 1.

When availableFlagSbCol is equal to 1, the following applies:
   The variables numSbX, numSbY, sbWidth, sbHeight and refIdxLXSbCol are derived as follows:

numSbX=cbWidth>>3    (8-546)

numSbY=cbHeight>>3    (8-547)

sbWidth=cbWidth/numSbX    (8-548)

sbHeight=cbHeight/numSbY    (8-549)

refIdxLXSbCol=0    (8-550)

For xSbIdx=0..numSbX−1 and ySbIdx=0 numSbY−1, the motion vectors mvLXSbCol[xSbIdx][ySbIdx] and prediction list utilization flags predFlagLXSbCol[xSbIdx][ySbIdx] are derived as follows:
   The luma location (xSb, ySb) specifying the top-left sample of the current coding subblock relative to the top-left luma sample of the current picture is derived as follows:

xSb=xCb+xSbIdx*sbWidth+sbWidth/2    (8-551)

ySb=yCb+ySbIdx*sbHeight+sbHeight/2    (8-552)

The location (xColSb, yColSb) of the collocated subblock inside ColPic is derived as follows.
   The following applies:

yColSb=Clip3(yCtb,

Min(CurPicHeightInSamplesY−1,yCtb+(1<<Ctb Log 2SizeY)−1),    (8-553)

ySb+(tempMv[1]>>4))

If subpic_treated_aspic_flag[SubPicIdx] is equal to 1, the following applies:

xColSb=Clip3(xCtb,

Min(SubPicRightBoundaryPos,xCtb+(1<<Ctb Log 2SizeY)+3),    (8-554)

xSb+(tempMv[0]>>4))

Otherwise (subpic_treated_as_pic_flag[SubPicIdx] is equal to 0), the following applies:

xColSb=Clip3(xCtb,

Min(CurPicWidthInSamplesY−1,xCtb+(1<<Ctb Log 2SizeY)+3),    (8-555)

xSb+(tempMv[0]>>4))

Derivation process for subblock-based temporal merging base motion data
Inputs to this process are:
   the location (xCtb, yCtb) of the top-left sample of the luma coding tree block that contains the current coding block,
   the location (xColCtrCb, yColCtrCb) of the top-left sample of the collocated luma coding block that covers the below-right center sample.
   the availability flag availableFlag$A_1$ of the neighbouring coding unit,
   the reference index refIdxLX$A_1$ of the neighbouring coding unit,
   the prediction list utilization flag predFlagLX$A_1$ of the neighbouring coding unit,
   the motion vector in ⅟16 fractional-sample accuracy mvLX$A_1$ of the neighbouring coding unit.
Outputs of this process are:
   the motion vectors ctrMvL0 and ctrMvL1,
   the prediction list utilization flags ctrPredFlagL0 and ctrPredFlagL1,
   the temporal motion vector tempMv.
The variable tempMv is set as follows:

tempMv[0]=0    (8-558)

tempMv[1]=0    (8-559)

The variable currPic specifies the current picture.
When availableFlag$A_1$ is equal to TRUE, the following applies:
   If all of the following conditions are true, tempMv is set equal to mvL0$A_1$:
      predFlagL0$A_1$ is equal to 1,
      DiffPicOrderCnt(ColPic, RefPicList[0][refIdxL_DA$_1$]) is equal to 0,
   Otherwise, if all of the following conditions are true, tempMv is set equal to mvL1$A_1$:
      slice_type is equal to B,
      predFlagL1$A_1$ is equal to 1,
      DiffPicOrderCnt(ColPic, RefPicList[1][refIdxL1$A_1$]) is equal to 0.
The location (xColCb, yColCb) of the collocated block inside ColPic is derived as follows.
   The following applies:

yColCb=Clip3(yCtb,

Min(CurPicHeightInSamplesY−1,yCtb+(1<<Ctb Log 2SizeY)−1),    (8-560)

yColCtrCb+(tempMv[1]>>4))

If subpic_treated_as_pic_flag[SubPicIdx] is equal to 1, the following applies:

xColCb=Clip3(xCtb,

Min(SubPicRightBoundaryPos,xCtb+(1<<Ctb Log 2SizeY)+3),   (8-561)

xColCtrCb+(tempMv[0]>>4))

Otherwise (subpic_treated_as_pic_flag[SubPicIdx] is equal to o, the following applies:

xColCb=Clip3(xCtb,

Min(CurPicWidthInSamplesY−1,xCtb+(1<<Ctb Log 2SizeY)+3),   (8-562)

xColCtrCb+(tempMv[0]>>4))

Luma sample interpolation filtering process
Inputs to this process are:
a luma location in full-sample units ($xInt_L$, $yInt_L$),
a luma location in fractional-sample units ($xFrac_L$, $yFrac_L$),
a luma location in full-sample units ($xSbInt_L$, $ySbInt_L$) specifying the top-left sample of the bounding block for reference sample padding relative to the top-left luma sample of the reference picture,
the luma reference sample array $refPicLX_L$,
the half sample interpolation filter index hpelIfIdx,
a variable sbWidth specifying the width of the current sub-block,
a variable sbHeight specifying the height of the current sub-block,
a luma location (xSb, ySb) specifying the top-left sample of the current subblock relative to the top-left luma sample of the current picture,
Output of this process is a predicted luma sample value $predSampleLX_L$ The variables shift1, shift2 and shift3 are derived as follows:
The variable shift1 is set equal to Min(4, $BitDepth_Y$−8), the variable shift2 is set equal to 6 and the variable shift3 is set equal to Max(2, 14−$BitDepth_Y$).
The variable picW is set equal to pic_width_in_luma_samples and the variable picH is set equal to pic_height_in_luma_samples.
The luma interpolation filter coefficients $f_L[p]$ for each 1/16 fractional sample position p equal to $xFrac_L$ or $yFrac_L$ are derived as follows:
If MotionModelIdc[xSb][ySb] is greater than 0, and sbWidth and sbHeight are both equal to 4, the luma interpolation filter coefficients $f_L[p]$ are specified in Table 8-12.
Otherwise, the luma interpolation filter coefficients $f_L[p]$ are specified in Table 8-11 depending on hpelIfIdx.
The luma locations in full-sample units ($xInt_i$, $yInt_i$) are derived as follows for i=0..7:
If subpic_treated_aspic_flag[SubPicIdx] is equal to 1, the following applies:

$xInt_i$=Clip3(SubPicLeftBoundaryPos,SubPicRight-BoundaryPos,$xInt_L$+i−3)   (8-771)

$yInt_i$=Clip3(SubPicTopBoundaryPos,SubPicBot-BoundaryPos,$yInt_L$+i−3)   (8-772)

Otherwise (subpic_treated_aspic_flag[SubPicIdx] is equal to 0), the following applies:

$xInt_i$=Clip3(0,picW−1,sps_ref wraparound_enabled_flag?
ClipH((sps_ref_wraparound_offset_minus1+1)
*MinCbSizeY,picW,$xInt_L$+i−3):   (8-773)

$xInt_L$+i−3)

$yInt_i$=Clip3(0,picH−1,$yInt_L$+i−3)   (8-774)

Chroma sample interpolation process
Inputs to this process are:
a chroma location in full-sample units ($xInt_C$, $yInt_C$),
a chroma location in 1/32 fractional-sample units ($xFrac_C$, $yFrac_C$),
a chroma location in full-sample units (xSbIntC, ySbIntC) specifying the top-left sample of the bounding block for reference sample padding relative to the top-left chroma sample of the reference picture,
a variable sbWidth specifying the width of the current sub-block,
a variable sbHeight specifying the height of the current sub-block,
the chroma reference sample array $refPicLX_C$.
Output of this process is a predicted chroma sample value $predSampleLX_C$
The variables shift1, shift2 and shift3 are derived as follows:
The variable shift1 is set equal to Min(4, $BitDepth_C$−8), the variable shift2 is set equal to 6 and the variable shift3 is set equal to Max(2, 14−$BitDepth_C$).
The variable $picW_C$ is set equal to pic_width_in_luma_samples/SubWidthC and the variable $picH_C$ is set equal to pic_height_in_lumasamples/SubHeightC.
The chroma interpolation filter coefficients $f_C[p]$ for each 1/32 fractional sample position p equal to $xFrac_C$ or $yFrac_C$ are specified in Table 8-13.
The variable xOffset is set equal to (sps_ref_wraparound_offset_minus1+1)*MinCbSizeY)/SubWidthC.
The chroma locations in full-sample units ($xInt_i$, $yInt_i$) are derived as follows for i=0..3:
If subpic_treated_as_pic_flag[SubPicIdx] is equal to 1, the following applies:

$xInt_i$=Clip3(SubPicLeftBoundaryPos/SubWidthC,
SubPicRightBoundaryPos/SubWidthC,$xInt_L$+i)   (8-785)

$yInt_i$=Clip3(SubPicTopBoundaryPos/SubHeightC,
SubPicBotBoundaryPos/SubHeightC,$yInt_L$+i)   (8-786)

Otherwise (subpic_treated_as_pic_flag[SubPicIdx] is equal to 0), the following applies:

$xInt_i$=Clip3(0,$picW_C$−1,sps_ref wraparound_enabled_flag?ClipH(xOffset,$picW_C$,$xInt_C$+i−1):   (8-787)

$xInt_C$+i−1)

$yInt_i$=Clip3(0,$picH_C$−1,$yInt_C$+i−1)   (8-788)

2.4 Example Encoder-Only Group of Pictures (GOP)-Based Temporal Filter

In some embodiments, an encoder-only temporal filter can be implemented. The filtering is done at the encoder side as a pre-processing step. Source pictures before and after the selected picture to encode are read and a block-based motion compensation method relative to the selected picture is applied on those source pictures. Samples in the selected picture are temporally filtered using sample values after motion compensation.

The overall filter strength is set depending on the temporal sub layer of the selected picture as well as the quantization parameter (QP). Only pictures at temporal sub layers 0 and 1 are filtered and pictures of layer 0 are filtered by a stronger filter than pictures of layer 1. The per sample filter strength is adjusted depending on the difference between the sample value in the selected picture and the co-located samples in motion compensated pictures so that small differences between a motion compensated picture and the selected picture are filtered more strongly than larger differences.

GOP-Based Temporal Filter

A temporal filter is introduced directly after reading a picture, and before encoding the picture. Below are the steps described in more detail.

Operation 1: Pictures are read by the encoder

Operation 2: If a picture is low enough in the coding hierarchy, it is filtered before encoding. Otherwise, the picture is encoded without filtering. Random-access (RA) pictures with picture order count (POC) % 8==0 are filtered as well as low-delay (LD) pictures with POC % 4=0. AI pictures are never filtered.

The overall filter strength, $s_o$, is set according to the equation below for RA.

$$s_o(n) = \begin{cases} 1.5, & n \bmod 16 = 0 \\ 0.95, & n \bmod 16 \neq 0 \end{cases}$$

where n is the number of pictures read.

For the LD case, $s_o(n)=0.95$ is used.

Operation 3: Two pictures before and/or after the selected picture (sometimes referred to as the original picture herein) are read. In the edge cases e.g., if is the first picture or close to the last picture, only the available pictures are read.

Operation 4: Motion of the read pictures before and after, relative to the original picture is estimated per 8×8 picture block.

Figure 2:
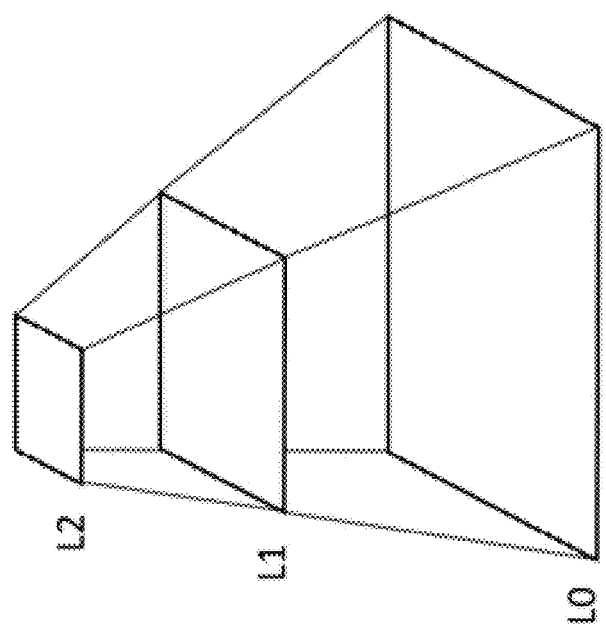
FIG. 2 shows an example of a hierarchical motion estimation scheme.

A hierarchical motion estimation scheme is used and the layers L0, L1 and L2, are illustrated in FIG. 2. Subsampled pictures are generated by averaging each 2×2 block for all read pictures and the original picture, e.g., L1 in FIG. 1. L2 is derived from L1 using the same subsampling method.

FIG. 2 shows examples of different layers of the hierarchical motion estimation. L0 is the original resolution. L1 is a subsampled version of L0. L2 is a subsampled version of L1.

First, motion estimation is done for each 16×16 block in L2. The squared difference is calculated for each selected motion vector and the motion vector corresponding to the smallest difference is selected. The selected motion vector is then used as initial value when estimating the motion in L1. Then the same is done for estimating motion in L0. As a final step, subpixel motion is estimated for each 8×8 block by using an interpolation filter on L0.

The VVC test model (VTM) 6-tap interpolation filter can used:

0: 0, 0, 64, 0, 0, 0
1: 1, −3, 64, 4, −2, 0
2: 1, −6, 62, 9, −3, 1
3: 2, −8, 60, 14, −5, 1
4: 2, −9, 57, 19, −7, 2
5: 3, −10, 53, 24, −8, 2
6: 3, −11, 50, 29, −9, 2
7: 3, −11, 44, 35, −10, 3
8: 1, −7, 38, 38, −7, 1
9: 3, −10, 35, 44, −11, 3
10: 2, −9, 29, 50, −11, 3
11: 2, −8, 24, 53, −10, 3
12: 2, −7, 19, 57, −9, 2
13: 1, −5, 14, 60, −8, 2

-continued

14: 1, −3, 9, 62, −6, 1
15: 0, −2, 4, 64, −3, 1

Operation 5: Motion compensation is applied on the pictures before and after the original picture according to the best matching motion for each block, e.g., so that the sample coordinates of the original picture in each block have the best matching coordinates in the referenced pictures.

Operation 6: The samples of the processed one-by-one for the luma and chroma channels as described in the following steps.

Operation 7: The new sample value, $I_n$, is calculated using the following formula.

$$I_n = \frac{I_o + \sum_{i=0}^{3} w_r(i,a)I_r(i)}{1 + \sum_{i=0}^{3} w_r(i,a)}$$

Where $I_o$ is the sample value of the original sample, $I_r(i)$ is the intensity of the corresponding sample of motion compensated picture i and $w_r(i,a)$ is the weight of motion compensated picture i when the number of available motion compensated pictures is a.

In the luma channel, the weights, $w_r(i,a)$, are defined as follows:

$$w_r(i,a) = s_l s_o(n) s_r(i,a) e^{-\frac{\Delta I(i)^2}{2\sigma_l(QP)^2}}$$

Where $s_l = 0.4$ $$s_r(i,2) = \begin{cases} 1.2, & i = 0 \\ 1.0, & i = 1 \end{cases}$$

$$s_r(i,4) = \begin{cases} 0.60, & i = 0 \\ 0.85, & i = 1 \\ 0.85, & i = 2 \\ 0.60, & i = 3 \end{cases}$$

For all other cases of i, and a: $s_r(i,a)=0.3$ $\sigma_l(QP)=3*(QP-10)$ $\Delta I(i)=I_r(i)-I_o$ For the chroma channels, the weights, $w_r(i,a)$, are defined as follows:

$$w_r(i,a) = s_c s_o(n) s_r(i,a) e^{-\frac{\Delta I(i)^2}{2\sigma_c^2}}$$

Where $s_c=0.55$ and $\sigma_c=30$

Operation 8: The filter is applied for the current sample. The resulting sample value is stored separately.

Operation 9: The filtered picture is encoded.

Example Picture Partitions Tiles, Bricks, Slices

In some embodiments, a picture is divided into one or more tile rows and one or more tile columns. A tile is a sequence of CTUs that covers a rectangular region of a picture.

A tile is divided into one or more bricks, each of which consisting of a number of CTU rows within the tile.

A tile that is not partitioned into multiple bricks is also referred to as a brick. However, a brick that is a true subset of a tile is not referred to as a tile.

A slice either contains a number of tiles of a picture or a number of bricks of a tile.

A sub-picture contains one or more slices that collectively cover a rectangular region of a picture.

Two modes of slices are supported, namely the raster-scan slice mode and the rectangular slice mode. In the raster-scan slice mode, a slice contains a sequence of tiles in a tile raster scan of a picture. In the rectangular slice mode, a slice contains a number of bricks of a picture that collectively form a rectangular region of the picture. The bricks within a rectangular slice are in the order of brick raster scan of the slice.

Figure 5:
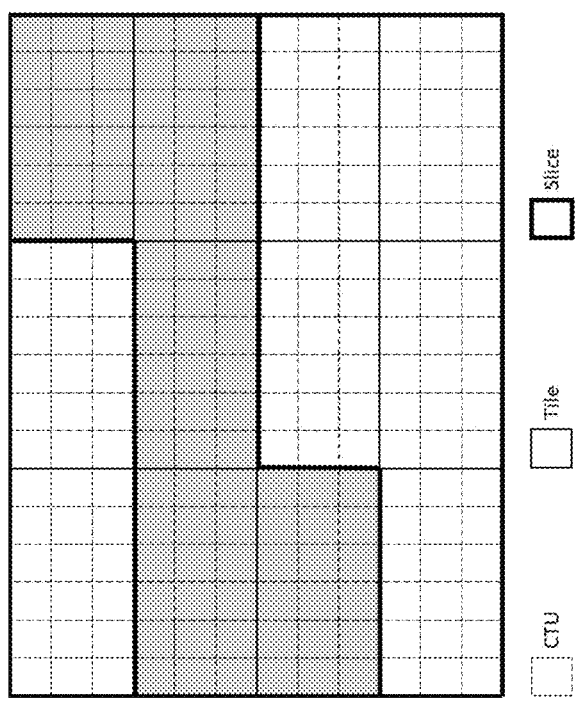
FIG. 5 shows an example of a picture with 18-by-12 luma coding tree units (CTUs) that are partitioned into 12 tiles and 3 raster-scan slices.

FIG. 5 shows an example of raster-scan slice partitioning of a picture, where the picture is divided into 12 tiles and 3 raster-scan slices.

Figure 6:
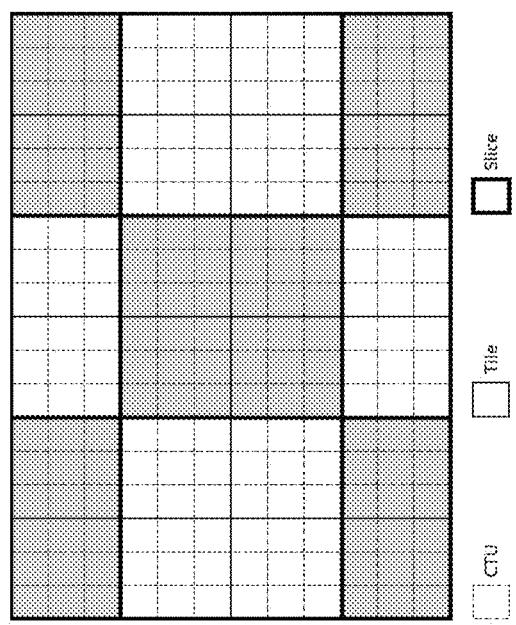
FIG. 6 shows an example of picture with 18-by-12 luma CTUs that are partitioned into 24 tiles and 9 rectangular slices.

FIG. 6 shows an example of rectangular slice partitioning of a picture, where the picture is divided into 24 tiles (6 tile columns and 4 tile rows) and 9 rectangular slices.

Figure 7:
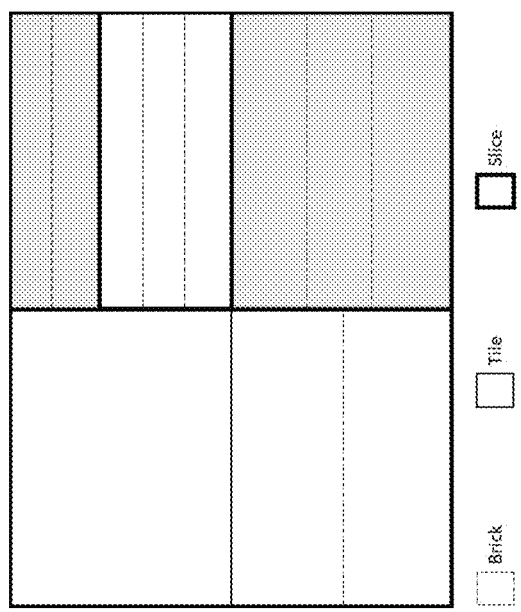
FIG. 7 shows an example of a picture that is partitioned into 4 tiles, 11 bricks, and 4 rectangular slices.

FIG. 7 shows an example of a picture partitioned into tiles, bricks, and rectangular slices, where the picture is divided into 4 tiles (2 tile columns and 2 tile rows), 11 bricks (the top-left tile contains 1 brick, the top-right tile contains 5 bricks, the bottom-left tile contains 2 bricks, and the bottom-right tile contain 3 bricks), and 4 rectangular slices.

Picture parameter set (PPS) RBSP syntax

| | Descriptor |
|---|---|
| pic_parameter_set_rbsp( ) { | |
| ... | |
|     single_tile_in_pic_flag | u(1) |
|     if( !single_tile_in_pic_flag ) { | |
|         uniform_tile_spacing_flag | u(1) |
|         if( uniform_tile_spacing_flag ) { | |
|             tile_cols_width_minus1 | ue(v) |
|             tile_rows_height_minus1 | ue(v) |
|         } else { | |
|             num_tile_columns_minus1 | ue(v) |
|             num_tile_rows_minus1 | ue(v) |
|             for( i = 0; i < num tile columns minus1; i++ ) | |
|                 tile_column_width_minus1[ i ] | ue(v) |
|             for( i = 0; i < num_tile_rows_minus1; i++ ) | |
|                 tile_row_height_minus1[ i ] | ue(v) |
|         } | |
|         brick_splitting_present_flag | u(1) |
|         if( uniform_tile_spacing_flag && brick_splitting_present_flag ) | |
|             num_tiles_in_pic_minus1 | ue(v) |
|         for( i = 0; brick_splitting_present_flag && i <= num_tiles_in_pic_minus1 + 1; i++ ) { | |
|             if( RowHeight[ i ] > 1 ) | |
|                 brick_split_flag[ i ] | u(1) |
|             if( brick_split_flag[ i ] ) { | |
|                 if( RowHeight[ i ] > 2 ) | |
|                     uniform_brick_spacing_flag[ i ] | u(1) |
|                 if( uniform_brick_spacing_flag[ i ] ) | |
|                     brick_height_minus1[ i ] | ue(v) |
|                 else { | |
|                     num_brick_rows_minus2[ i ] | ue(v) |
|                     for( j = 0; j <= num_brick_rows_minus2[ i ]; j++ ) | |
|                         brick_row_height_minus1[ i ][ j ] | ue(v) |
|                 } | |
|             } | |
|         } | |
|         single_brick_per_slice_flag | u(1) |
|         if( !single_brick_per_slice_flag ) | |
|             rect_slice_flag | u(1) |
|         if( rect_slice_flag && !single_brick_per_slice_flag ) { | |
|             num_slices_in_pic_minus1 | ue(v) |
|             bottom_right_brick_idx_length_minus1 | ue(v) |
|             for( i = 0; i < num_slices_in_pic_minus1; i++ ) { | |
|                 bottom_right_brick_idx_delta[ i ] | u(v) |
|                 brick_idx_delta_sign_flag[ i ] | u(1) |
|             } | |
|         } | |
|         loop_filter_across_bricks_enabled_flag | u(1) |
|         if( loop_filter_across_bricks_enabled_flag ) | |
|             loop_filter_across_slices_enabled_flag | u(1) |
|     } | |
|     if( rect_slice_flag ) { | |
|         signalled_slice_id_flag | u(1) |
|         if( signalled_slice_id flag ) { | |
|             signalled_slice_id_length_minus1 | ue(v) |
|             for( i = 0; i <= num_slices_in_pic_minus1; i++ ) | |
|                 slice_id[ i ] | u(v) |
|         } | |
|     } | |
| ... | |

```
slice_header( ) {
        slice_pic_parameter_set_id                                      ue(v)
        if( rect_slice_flag | | NumBricksInPic > 1 )
            slice_address                                               u(v)
        if( !rect_slice_flag && !single_brick_per_slice_flag )
            num_bricks_in_slice_minus1                                  ue(v)
        non_reference_picture_flag                                      u(1)
        slice_type                                                      ue(v)
...
``` single_tile_in_pic_flag equal to 1 specifies that there is only one tile in each picture referring to the PPS. single_tile_in_pic_flag equal to 0 specifies that there is more than one tile in each picture referring to the PPS.

NOTE—In absence of further brick splitting within a tile, the whole tile is referred to as a brick. When a picture contains only a single tile without further brick splitting, it is referred to as a single brick.

It is a requirement of bitstream conformance that the value of single_tile_in_pic_flag shall be the same for all PPSs that are referred to by coded pictures within a CVS.

uniform_tile_spacing_flag equal to 1 specifies that tile column boundaries and likewise tile row boundaries are distributed uniformly across the picture and signalled using the syntax elements tile_cols_width_minus1 and tile_rows_height_minus1. uniform_tile_spacing_flag equal to 0 specifies that tile column boundaries and likewise tile row boundaries may or may not be distributed uniformly across the picture and signalled using the syntax elements num_tile_columns_minus1 and num_file_rows_minus1 and a list of syntax element pairs tile_column_width_minus1[i] and tile_row_height_minus1[i]. When not present, the value of uniform_tile_spacing_flag is inferred to be equal to 1.

tile_cols_width_minus1 plus 1 specifies the width of the tile columns excluding the right-most tile column of the picture in units of CTBs when uniform_tile_spacing_flag is equal to 1. The value of tile_cols_width_minus1 shall be in the range of 0 to PicWidthInCtbsY− 1, inclusive. When not present, the value of tile_cols_width_minus1 is inferred to be equal to PicWidthInCtbsY− 1.

tile_rows_height_minus1 plus 1 specifies the height of the tile rows excluding the bottom tile row of the picture in units of CTBs when uniform_tile_spacing_flag is equal to 1. The value of tile_rows_height_minus1 shall be in the range of 0 to PicHeightInCtbsY− 1, inclusive. When not present, the value of tile_rows_height_minus1 is inferred to be equal to PicHeightInCtbsY− 1.

num_tile_columns_minus1 plus 1 specifies the number of tile columns partitioning the picture when uniform_tile_spacing_flag is equal to 0. The value of num_tile_columns_minus1 shall be in the range of 0 to PicWidthInCtbsY−1, inclusive. If single_tile_in_pic_flag is equal to 1, the value of num_tile_columns_minus1 is inferred to be equal to 0. Otherwise, when uniform_tile_spacing_flag is equal to 1, the value of numtile_columns_minus1 is inferred as specified in clause 6.5.1.

num_tile_rows_minus1 plus 1 specifies the number of tile rows partitioning the picture when uniform_tile_spacing_flag is equal to 0. The value of num_tile_rows_minus1 shall be in the range of 0 to PicHeightInCtbsY− 1, inclusive. If single_tile_in_pic_flag is equal to 1, the value of num_tile_rows_minus1 is inferred to be equal to 0. Otherwise, when uniform_tile_spacing_flag is equal to 1, the value of num_tile_rows_minus1 is inferred as specified in clause 6.5.1.

The variable NumTilesInPic is set equal to (num_tile_columns_minus1+1)*(num_tile_rows_minus1+1). When single_tile_in_pic_flag is equal to 0, NumTilesInPic shall be greater than 1.

tile_column_width_minus1[i] plus 1 specifies the width of the i-th tile column in units of CTBs.

tile_row_height_minus1[i] plus 1 specifies the height of the i-th tile row in units of CTBs.

brick_splitting_present_flag equal to 1 specifies that one or more tiles of pictures referring to the PPS may be divided into two or more bricks. brick_splitting_present_flag equal to 0 specifies that no tiles of pictures referring to the PPS are divided into two or more bricks.

num_tiles_in_pic_minus1 plus 1 specifies the number of tiles in each picture referring to the PPS. The value of numtiles_in_pic_minus1 shall be equal to NumTilesInPic−1. When not present, the value of num_tiles_in_pic_minus1 is inferred to be equal to NumTilesInPic−1.

brick_split_flag[i] equal to 1 specifies that the i-th tile is divided into two or more bricks. brick_split_flag[i] equal to 0 specifies that the i-th tile is not divided into two or more bricks. When not present, the value of brick_split_flag[i] is inferred to be equal to 0. In some embodiments, PPS parsing dependency on SPS is introduced by adding the syntax condition "if(RowHeight[i]>1)" (e.g., similarly for uniform_ brick_spacing_flag[i]).

uniform_brick_spacing_flag[i] equal to 1 specifies that horizontal brick boundaries are distributed uniformly across the i-th tile and signalled using the syntax element brick_height_minus1[i]. uniform_brick_spacing_flag[i] equal to 0 specifies that horizontal brick boundaries may or may not be distributed uniformly across i-th tile and signalled using the syntax element num_brick_rows_minus2[i] and a list of syntax elements brick_row_height_minus1[i][j]. When not present, the value of uniform_brick_spacing_flag[i] is inferred to be equal to 1.

brick_height_minus1[i] plus 1 specifies the height of the brick rows excluding the bottom brick in the i-th tile in units of CTBs when uniform_brick_spacing_flag[i] is equal to 1. When present, the value of brick_height_minus1 shall be in the range of 0 to RowHeight[i]−2, inclusive. When not present, the value of brick_height_minus1[i] is inferred to be equal to RowHeight[i]−1.

num_brick_rows_minus2[i] plus 2 specifies the number of bricks partitioning the i-th tile when uniform_brick_spacing_flag[i] is equal to 0. When present, the value of num_brick_rows_minus2[i] shall be in the range of 0 to RowHeight[i]−2, inclusive. If brick_split_flag[i] is equal to 0, the value of numbrick_rows_minus2[i] is inferred to be equal to −1. Otherwise, when uniform_brick_spacing_flag[i] is equal to 1, the value of num_brick_rows_minus2[i] is inferred as specified in 6.5.1.

brick_row_height_minus1[i][j] plus 1 specifies the height of the j-th brick in the i-th tile in units of CTBs when uniform_tile_spacing_flag is equal to 0.

The following variables are derived, and, when uniform_tile_spacing_flag is equal to 1, the values of numtile_columns_minus1 and numtile_rows_minus1 are inferred, and, for each i ranging from 0 to NumTilesInPic−1, inclusive, when uniform_brick_spacing_flag[i] is equal to 1, the value of numbrick_rows_minus2[i] is inferred, by invoking the CTB raster and brick scanning conversion process as specified in clause 6.5.1:

the list RowHeight[j] for j ranging from 0 to numtile_rows_minus1, inclusive, specifying the height of the j-th tile row in units of CTBs, the list CtbAddrRsToBs[ctbAddrRs] for ctbAddrRs ranging from 0 to PicSizeInCtbsY−1, inclusive, specifying the conversion from a CTB address in the CTB raster scan of a picture to a CTB address in the brick scan, the list CtbAddrBsToRs[ctbAddrBs] for ctbAddrBs ranging from 0 to PicSizeInCtbsY−1, inclusive, specifying the conversion from a CTB address in the brick scan to a CTB address in the CTB raster scan of a picture, the list BrickId[ctbAddrBs] for ctbAddrBs ranging from 0 to PicSizeInCtbsY−1, inclusive, specifying the conversion from a CTB address in brick scan to a brick ID, the list NumCtusInBrick[brickIdx] for brickIdx ranging from 0 to NumBricksInPic−1, inclusive, specifying the conversion from a brick index to the number of CTUs in the brick, the list FirstCtbAddrBs[brickIdx] for brickIdx ranging from 0 to NumBricksInPic−1, inclusive, specifying the conversion from a brick ID to the CTB address in brick scan of the first CTB in the brick.

single_brick_per_slice_flag equal to 1 specifies that each slice that refers to this PPS includes one brick. single_brick_per_slice_flag equal to 0 specifies that a slice that refers to this PPS may include more than one brick. When not present, the value of single_brick_per_slice_flag is inferred to be equal to 1.

rect_slice_flag equal to 0 specifies that bricks within each slice are in raster scan order and the slice information is not signalled in PPS. rect_slice_flag equal to 1 specifies that bricks within each slice cover a rectangular region of the picture and the slice information is signalled in the PPS. When brick_splitting_present_flag is equal to 1, the value of rect_slice_flag shall be equal to 1. When not present, rect_slice_flag is inferred to be equal to 1.

num_slices_in_pic_minus1 plus 1 specifies the number of slices in each picture referring to the PPS. The value of num_slices_in_pic_minus1 shall be in the range of 0 to NumBricksInPic−1, inclusive. When not present and single_brick_per_slice_flag is equal to 1, the value of num_slices_in_pic_minus1 is inferred to be equal to NumBricksInPic−1.

bottom_right_brick_idx_length_minus1 plus 1 specifies the number of bits used to represent the syntax element bottom_right_brick_idx_delta[i]. The value of bottom_right_brick_idx_length_minus1 shall be in the range of 0 to Ceil(Log 2(NumBricksInPic))−1, inclusive.

bottom_right_brick_idx_delta[i] when i is greater than 0 specifies the difference between the brick index of the brick located at the bottom-right corner of the i-th slice and the brick index of the bottom-right corner of the (i−1)-th slice. bottom_right_brick_idx_delta[0] specifies the brick index of the bottom right corner of the 0-th slice. When single_brick_per_slice_flag is equal to 1, the value of bottom_right_brick_idx_delta[i] is inferred to be equal to 1. The value of the BottomRightBrickIdx[num_slices_in_pic_minus1] is inferred to be equal to NumBricksInPic−1. The length of the bottom_right_brick_idx_delta[i] syntax element is bottom_right_brick_idx_length_minus1+1 bits.

brick_idx_delta_sign_flag[i] equal to 1 indicates a positive sign for bottom_right_brick_idx_delta[i]. sign_bottom_right_brick_idx_delta[i] equal to 0 indicates a negative sign for bottom_right_brick_idx_delta[i]. It is a requirement of bitstream conformance that a slice shall include either a number of complete tiles or only a consecutive sequence of complete bricks of one tile.

The variable TopLeftBrickIdx[i], BottomRightBrickIdx[i], NumBricksInSlice[i] and BricksToSliceMap[j], which specify the brick index of the brick located at the top left corner of the i-th slice, the brick index of the brick located at the bottom right corner of the i-th slice, the number of bricks in the i-th slice and the mapping of bricks to slices, are derived as follows:

```
for( j = 0; i = = 0 && j < NumBricksInPic; j++ )
    BricksToSliceMap[ j ] = −1
NumBricksInSlice[ i ] = 0
BottomRightBrickIdx[ i ] = bottom_right_brick_idx_delta[ i ] ] +( (
i = = 0 ) ? 0 :
        ( brick_idx_delta_sign_flag[ i ] ? BottomRightBrickIdx[ i −
    1 ] :
−BottomRightBrickIdx[ i−1 ] )
for( j = BottomRightBrickIdx[ i ]; j >= 0; j− − ) {
    if( BrickColBd[ j ] <= BrickColBd[ BottomRightBrickIdx[ i ] ]
    && (7-43)
        BrickRowBd[ j ] <= BrickRowBd[ BottomRightBrickIdx[ i ] ]
        && BricksToSliceMap[ j ] = = −1 ) {
    TopLeftBrickIdx[ i ] = j
    NumBricksInSlice[ i ]++
    BricksToSliceMap[ j ] = i
    }
}
```

General Slice Header Semantics

When present, the value of each of the slice header syntax elements slice_pic_parameter_set_id, non_reference_picture_flag, colour_plane_id, slice_pic_order_cnt_lsb, recovery_poc_cnt, no_output_of_prior_pics_flag, pic_output_flag, and slice_temporal_mvp_enabled_flag shall be the same in all slice headers of a coded picture.

The variable CuQpDeltaVal, specifying the difference between a luma quantization parameter for the coding unit containing cu_qp_delta_abs and its prediction, is set equal to 0. The variables CuQpOffset$_{Cb}$, CuQpOffset$_{Cr}$, and CuQpOffset$_{CbCr}$, specifying values to be used when determining the respective values of the Qp'$_{Cb}$, Qp'$_{Cr}$, and Qp'$_{CbCr}$ quantization parameters for the coding unit containing cu_chroma_qp_offset_flag, are all set equal to 0.

slice_pic_parameter_set_id specifies the value of pps_pic_parameter_set_id for the PPS in use. The value of slice_pic_parameter_set_id shall be in the range of 0 to 63, inclusive.

It is a requirement of bitstream conformance that the value of TemporalId of the current picture shall be greater than or equal to the value of TemporalId of the PPS that has pps_pic_parameter_set_id equal to slice_pic_parameter_set_id.

slice_address specifies the slice_address of the slice. When not present, the value of slice_address is inferred to be equal to 0.

If rect_slice_flag is equal to 0, the following applies:
  The slice_address is the brick ID as specified by Equation (7-59).
  The length of slice_address is Ceil(Log 2 (NumBricksInPic)) bits.

The value of slice_address shall be in the range of 0 to NumBricksInPic−1, inclusive.

Otherwise (rect_slice_flag is equal to 1), the following applies:

The slice_address is the slice ID of the slice.
The length of slice_address is signalled_slice_id_length_minus1+1 bits.
If signalled_slice_id_flag is equal to 0, the value of slice_address shall be in the range of 0 to num_slices_in_pic_minus1, inclusive. Otherwise, the value of slice_address shall be in the range of 0 to $2^{(signalled\_slice\_id\_length\_minus1+1)}-1$, inclusive.

It is a requirement of bitstream conformance that the following constraints apply:

The value of slice_address shall not be equal to the value of slice_address of any other coded slice NAL unit of the same coded picture.
When rect_slice_flag is equal to 0, the slices of a picture shall be in increasing order of their slice_address values.
The shapes of the slices of a picture shall be such that each brick, when decoded, shall have its entire left boundary and entire top boundary consisting of a picture boundary or consisting of boundaries of previously decoded brick(s).

num_bricks_in_slice_minus1, when present, specifies the number of bricks in the slice minus1. The value of num_bricks_in_slice_minus1 shall be in the range of 0 to NumBricksInPic−1, inclusive. When rect_slice_flag is equal to 0 and single_brick_per_slice_flag is equal to 1, the value of num_bricks_in_slice_minus1 is inferred to be equal to 0. When single_brick_per_slice_flag is equal to 1, the value of num_bricks_in_slice_minus1 is inferred to be equal to 0.

The variable NumBricksInCurrSlice, which specifies the number of bricks in the current slice, and SliceBrickIdx[i], which specifies the brick index of the i-th brick in the current slice, are derived as follows:

```
if( rect_slice_flag ) {
   sliceIdx = 0
   while( slice_address != slice_id[ sliceIdx ] )
      sliceIdx++
   NumBricksInCurrSlice = NumBricksInSlice[ sliceIdx ]
   brickIdx = TopLeftBrickIdx[ sliceIdx ]
   for( bIdx = 0; brickIdx <= BottomRightBrickIdx[ sliceIdx ];
   brickIdx++ )  (7-92)
      if( BricksToSliceMap[ brickIdx ] = = sliceIdx )
         SliceBrickIdx[ bIdx++ ] = brickIdx
} else {
   NumBricksInCurrSlice = num_bricks_in_slice_minus1 + 1
   SliceBrickIdx[ 0 ] = slice_address
   for( i = 1; i < NumBricksInCurrSlice; i++ )
      SliceBrickIdx[ i ] = SliceBrickIdx[ i − 1 ] + 1
}
```

The variables SubPicIdx, SubPicLeftBoundaryPos, SubPicTopBoundaryPos, SubPicRightBoundaryPos, and SubPicBotBoundaryPos are derived as follows:

```
SubPicIdx = CtbToSubPicIdx[ CtbAddrBsToRs[ FirstCtbAddrBs[
SliceBrickIdx[ 0 ] ] ] ]
if( subpic_treated_as_pic_flag[ SubPicIdx ] ) {
  SubPicLeftBoundaryPos = SubPicLeft[ SubPicIdx ] *
  ( subpic_grid_col_width_minus1 + 1 ) * 4
  SubPicRightBoundaryPos = ( SubPicLeft[ SubPicIdx ] + SubPicWidth[
  SubPicIdx ] ) *
     ( subpic_grid_col_width_minus1 + 1 ) * 4  (7-93)
  SubPicTopBoundaryPos = SubPicTop[ SubPicIdx ] *
     ( subpic_grid_row_height_minus1 + 1 )* 4
  SubPicBotBoundaryPos = ( SubPicTop[ SubPicIdx ] + SubPicHeight[
  SubPicIdx ] ) *
     ( subpic_grid_row_height_minus1 + 1 ) * 4
}
```

Examples of Technical Problems Solved by Disclosed Embodiments (1) There are some designs that can violate the sub-picture constrain.

A. TMVP in the affine constructed candidates may fetch a MV in the collocated picture out of the range of the current sub-picture.

B. When deriving gradients in bidirectional optical flow (BDOF) and prediction refinement optical flow (PROF), two extended rows and two extended columns of integer reference samples are required to be fetched. These reference samples may be out of the range of the current sub-picture.

C. When deriving the chroma residual scaling factor in luma mapping chroma scaling (LMCS), the accessed reconstructed luma samples may be out of the range of the range of the current sub-picture.

D. The neighboring block may be out of the range of the current sub-picture, when deriving the luma intra prediction mode, reference samples for intra prediction, reference samples for cross-component linear model (CCLM), neighboring block availability for spatial neighboring candidates for merge/advanced motion vector prediction (AMVP)/combination of intra and inter prediction (CIIP)/intra block copy (IBC)/LMCS, quantization parameters, context-adaptive binary arithmetic coding (CABAC) initialization process, ctxInc derivation using left and above syntax elements, and ctxIncfor the syntax element mtt_split_cu_vertical_flag. The representation of sub-picture may lead to sub-picture with incomplete CTUs. The CTU partitions and coding unit (CU) splitting process may need to consider incomplete CTUs.

(2) The signalled syntax elements related to sub-picture may be arbitrarily large, which may cause an overflow problem.

(3) The representation of sub-pictures may lead to non-rectangular sub-pictures.

(4) Currently the sub-picture and sub-picture grid is defined in units of 4 samples. And the length of syntax element is dependent on the picture height divided by 4. However, since the current pic_width_in_luma_samples and pic_height_in_luma_samples shall be an integer multiple of Max(8, MinCbSizeY), the sub-picture grid may need to be defined in units of 8 samples.

(5) The SPS syntax, pic_width_max_in_luma_samples and pic_height_max_in_luma_samples may need to be restricted to be no smaller than 8.

(6) Interaction between reference picture resampling/scalability and sub-picture is not considered in the current design.

(7) In temporal filtering, samples across different sub-pictures may be required.

(8) When signalling the slices, the information could be inferred without signalling in some cases.

(9) It is possible that all the defined slices cannot cover the whole picture or sub-picture.

Example Techniques and Embodiments

The detailed listing below should be considered as examples to explain general concepts. These items should not be interpreted in a narrow way. Furthermore, these items can be combined in any manner. Hereinafter, temporal filter is used to represent filters that require samples in other pictures. Max(x,y) returns the larger one of x and y. Min(x,y) returns the smaller one of x and y.

1. The position (named position RB) at which a temporal MV predictor is fetched in a picture to generate affine motion candidates (e.g., a constructed affine merge candidate) must be in a required sub-picture, assuming the top-left corner coordinate of the required sub-picture is (xTL, yTL) and bottom-right coordinate of the required sub-picture is (xBR, yBR).
   a. In one example, the required sub-picture is the sub-picture covering the current block.
   b. In one example, if position RB with a coordinate (x,y) is out of the required sub-picture, the temporal MV predictor is treated as unavailable.
      i. In one example, position RB is out of the required sub-picture if x>xBR.
      ii. In one example, position RB is out of the required sub-picture if y>yBR.
      iii. In one example, position RB is out of the required sub-picture if x<xTL.
      iv. In one example, position RB is out of the required sub-picture if y<yTL.
   c. In one example, position RB, if outside of the required sub-picture, a replacement of RB is utilized.
      i. Alternatively, furthermore, the replacement position shall be in the required sub-picture.
   d. In one example, position RB is clipped to be in the required sub-picture.
      i. In one example, x is clipped as x=Min(x, xBR).
      ii. In one example, y is clipped as y=Min(y, yBR).
      iii. In one example, x is clipped as x=Max(x, xTL).
      iv. In one example, y is clipped as y=Max(y, yTL).
   e. In one example, the position RB may be the bottom right position inside the corresponding block of current block in the collocated picture.
   f. The proposed method may be utilized in other coding tools which require to access motion information from a picture different than the current picture.
   g. In one example, whether the above methods are applied (e.g., position RB must be in a required sub-picture (e.g., to do as claimed in 1.a and/or 1.b)) may depend on one or more syntax elements signalled in video parameter set (VPS)/dependency parameter set (DPS)/SPS/PPS/adaptation parameter set (APS)/slice header/tile group header. For example, the syntax element may be subpic_treated_as_pic_flag[SubPicIdx], where SubPicIdx is the sub-picture index of sub-picture covering the current block.
2. The position (named position S) at which an integer sample is fetched in a reference not used in the interpolation process must be in a required sub-picture, assuming the top-left corner coordinate of the required sub-picture is (xTL, yTL) and the bottom-right coordinate of the required sub-picture is (xBR, yBR).
   a. In one example, the required sub-picture is the sub-picture covering the current block.
   b. In one example, if position S with a coordinate (x,y) is out of the required sub-picture, the reference sample is treated as unavailable.
      i. In one example, position S is out of the required sub-picture if x>xBR.
      ii. In one example, position S is out of the required sub-picture if y>yBR.
      iii. In one example, position S is out of the required sub-picture if x<xTL.
      iv. In one example, position S is out of the required sub-picture if y<yTL.
   c. In one example, position S is clipped to be in the required sub-picture.
      i. In one example, x is clipped as x=Min(x, xBR).
      ii. In one example, y is clipped as y=Min(y, yBR).
      iii. In one example, x is clipped as x=Max(x, xTL).
      iv. In one example, y is clipped as y=Max(y, yTL).
   d. In one example, whether position S must be in a required sub-picture (e.g., to do as claimed in 2.a and/or 2.b) may depend on one or more syntax elements signalled in VPS/DPS/SPS/PPS/APS/slice header/tile group header. For example, the syntax element may be subpic_treated_as_pic_flag[SubPicIdx], where SubPicIdx is the sub-picture index of sub-picture covering the current block.
   e. In one example, the fetched integer sample is used to generate gradients in BDOF and/or PROF.
3. The position (named position R) at which the reconstructed luma sample value is fetched may be in a required sub-picture, assuming the top-left corner coordinate of the required sub-picture is (xTL, yTL) and the bottom-right coordinate of the required sub-picture is (xBR, yBR).
   a. In one example, the required sub-picture is the sub-picture covering the current block.
   b. In one example, if position R with a coordinate (x,y) is out of the required sub-picture, the reference sample is treated as unavailable.
      i. In one example, position R is out of the required sub-picture if x>xBR.
      ii. In one example, position R is out of the required sub-picture if y>yBR.
      iii. In one example, position R is out of the required sub-picture if x<xTL.
      iv. In one example, position R is out of the required sub-picture if y<yTL.
   c. In one example, position R is clipped to be in the required sub-picture.
      i. In one example, x is clipped as x=Min(x, xBR).
      ii. In one example, y is clipped as y=Min(y, yBR).
      iii. In one example, x is clipped as x=Max(x, xTL).
      iv. In one example, y is clipped as y=Max(y, yTL).
   d. In one example, whether position R must be in a required sub-picture (e.g., to do as claimed in 4.a and/or 4.b) may depend on one or more syntax elements signalled in VPS/DPS/SPS/PPS/APS/slice header/tile group header. For example, the syntax element may be subpic_treated_as_pic_flag[SubPicIdx], where SubPicIdx is the sub-picture index of sub-picture covering the current block.
   e. In one example, the fetched luma sample is used to derive the scaling factor for the chroma component(s) in LMCS.
4. The position (named position N) at which the picture boundary check for binary tree (BT)/ternary tree (TT)/quaternary tree (QT) splitting, BT/TT/QT depth derivation, and/or the signalling of CU split flag must be in a required sub-picture, assuming the top-left corner coordinate of the required sub-picture is (xTL, yTL) and the bottom-right coordinate of the required sub-picture is (xBR, yBR).
   a. In one example, the required sub-picture is the sub-picture covering the current block.

b. In one example, if position N with a coordinate (x,y) is out of the required sub-picture, the reference sample is treated as unavailable.
   i. In one example, position N is out of the required sub-picture if x>xBR.
   ii. In one example, position N is out of the required sub-picture if y>yBR.
   iii. In one example, position N is out of the required sub-picture if x<xTL.
   iv. In one example, position N is out of the required sub-picture if y<yTL.
c. In one example, position N is clipped to be in the required sub-picture.
   i. In one example, x is clipped as x=Min(x, xBR).
   ii. In one example, y is clipped as y=Min(y, yBR).
   iii. In one example, x is clipped as x=Max(x, xTL).
d. In one example, y is clipped as y=Max(y, yTL),In one example, whether position N must be in a required sub-picture (e.g., to do as claimed in 5.a and/or 5.b) may depend on one or more syntax elements signalled in VPS/DP S/SPS/PP S/AP S/slice header/tile group header. For example, the syntax element may be subpic_treated_as_pic_flag [SubPicIdx], where SubPicIdx is the sub-picture index of sub-picture covering the current block.

5. History-based motion vector prediction (HMVP) table may be reset before decoding a new sub-picture in one picture.
   a. In one example, the HMVP table used for IBC coding may be reset
   b. In one example, the HMVP table used for inter coding may be reset
   c. In one example, the HMVP table used for intra coding may be reset 6. The sub-picture syntax elements may be defined in units of N (such as N=8, 32, etc.) samples.
   a. In one example, the width of each element of the sub-picture identifier grid in units of N samples.
   b. In one example, the height of each element of the sub-picture identifier grid in units of N samples.
   c. In one example, N is set to the width and/or height of CTU.

7. The syntax element of picture width and picture height may be restricted to be no smaller than K(K>=8).
   a. In one example, the picture width may need to be restricted to be no smaller than 8.
   b. In one example, the picture height may need to be restricted to be no smaller than 8.

8. A conformance bitstream shall satisfy that sub-picture coding and adaptive resolution conversion (ARC)/dynamic resolution conversion (DRC)/reference picture resampling (RPR) are disallowed to be enabled for one video unit (e.g., sequence).
   a. In one example, signalling of enabling sub-picture coding may be under the conditions of disallowing ARC/DRC/RPR.
      i. In one example, when sub-picture is enabled, such as subpics_present_flag equal to 1, pic_width_in_luma_samples for all pictures for which this SPS is active is equal to max width in luma samples.
   b. Alternatively, sub-picture coding and ARC/DRC/RPR may both be enabled for one video unit (e.g., sequence).
      i. In one example, a conformance bitstream shall satisfy that the donwsampled sub-picture due to ARC/DRC/RPR shall still be in the form of K CTUs in width and M CTUs in height wherein K and M are both integers.
      ii. In one example, a conformance bitstream shall satisfy that for sub-pictures not located at picture boundaries (e.g., right boundary and/or bottom boundary), the downsampled sub-picture due to ARC/DRC/RPR shall still be in the form of K CTUs in width and M CTUs in height wherein K and M are both integers.
      iii. In one example, CTU sizes may be adaptively changed based on the picture resolution.
         1) In one example, a max CTU size may be signalled in SPS. For each picture with less resolution, the CTU size may be changed accordingly based on the reduced resolution.
         2) In one example, CTU size may be signalled in SPS and PPS, and/or sub-picture level.

9. The syntax element subpic_grid_col_width_minus1 and subpic_grid_row_height_minus1 may be constrained.
   a. In one example, subpic_grid_col_width_minus1 must be no larger (or must be smaller) than T1.
   b. In one example, subpic_grid_row_height_minus1 must be no larger (or must be smaller) than T2.
   c. In one example, in a conformance bit-stream, subpic_grid_col_width_minus1 and/or subpic_grid_row_height_minus1 must follow the constraint such as bullet 3.a or 3.b.
   d. In one example, T1 in 3.a and/or T2 in 3.b may depend on profiles/levels/tiers of a video coding standard.
   e. In one example, T1 in 3.a may depend on the picture width.
      i. For example, T1 is equal to pic_width_max_in_luma_samples/4 or pic_width_max_in_luma_samples/4+Off. Off may be 1, 2,−1, −2, etc.
   f. In one example, T2 in 3.b may depend on the picture width.
      i. For example, T2 is equal to pic_height_max_in_luma_samples/4 or pic_height_max_in_luma_samples/4−1+Off. Off may be 1, 2, −1, −2, etc.

10. It is constrained that a boundary between two sub-pictures must be a boundary between two CTUs.
    a. In other words, a CTU cannot be covered by more than one sub-picture.
    b. In one example, the unit of subpic_grid_col_width_minus1 may be the CTU width (such as 32, 64, 128), instead of 4 as in VVC. The sub-picture grid width should be (subpic_grid_col_width_minus1+1)*CTU width.
    c. In one example, the unit of subpic_grid_col_height_minus1 may be the CTU height (such as 32, 64, 128), instead of 4 as in VVC. The sub-picture grid height should be (subpic_grid_col_height_minus1+1) *CTU height.
    d. In one example, in a conformance bit-stream, the constraint must be satisfied if the sub-picture approach is applied.

11. It is constrained that the shape of a sub-picture must be rectangular.
    a. In one example, in a conformance bit-stream, the constraint must be satisfied if the sub-picture approach is applied.
    b. Sub-picture may only contain rectangular slices. For example, in a conformance bit-stream, the constraint must be satisfied if the sub-picture approach is applied.

12. It is constrained that two sub-pictures cannot be overlapped.
    a. In one example, in a conformance bit-stream, the constraint must be satisfied if the sub-picture approach is applied.
    b. Alternatively, two sub-pictures may be overlapped with each other.
13. It is constrained that any position in the picture must be covered by one and only one sub-picture.
    a. In one example, in a conformance bit-stream, the constraint must be satisfied if the sub-picture approach is applied.
    b. Alternatively, one sample may not belong to any sub-picture.
    c. Alternatively, one sample may belong to more than one sub-pictures.
14. It may be constrained that sub-pictures defined in a SPS mapped to every resolution presented in the same sequence should obey the location and/or size constrained mentioned above.
    a. In one example, the width and height of a sub-picture defined in the SPS mapped to a resolution presented in the same sequence, should be integer multiple times of N (such as 8, 16, 32) luma samples.
    b. In one example, sub-pictures may be defined for certain layer and may be mapped to other layers.
        i. For example, sub-pictures may be defined for the layer with the highest resolution in the sequence.
        ii. For example, sub-pictures may be defined for the layer with the lowest resolution in the sequence.
        iii. Which layer the sub-pictures are defined for may be signalled in SPS/VPS/PPS/slice header.
    c. In one example, when sub-pictures and different resolutions are both applied, all resolutions (e.g., width or/and height) may be integer multiple of a given resolution.
    d. In one example, the width and/or height of a sub-picture defined in the SPS may be integer multiple times (e.g., M) of the CTU size.
    e. Alternatively, sub-pictures and different resolutions in a sequence may not be allowed simultaneously.
15. Sub-pictures may only apply to a certain layer(s)
    a. In one example, sub-pictures defined in a SPS may only apply to the layer with the highest resolution in a sequence.
    b. In one example, sub-pictures defined in a SPS may only apply to the layer with the lowest temporal id in a sequence.
    c. Which layer(s) that sub-pictures may be applied to may be indicated by one or multiple syntax elements in SPS/VPS/PPS.
    d. Which layer(s) that sub-picture cannot be applied to may be indicated by one or multiple syntax elements in SPS/VPS/PPS.
16. In one example, the position and/or dimensions of a sub-picture may be signalled without using subpic_grid_idx.
    a. In one example, the top-left position of a sub-picture may be signalled.
    b. In one example, the bottom-right position of a sub-picture may be signalled.
    c. In one example, the width of sub-picture may be signalled.
    d. In one example, the height of a sub-picture may be signalled.
17. For temporal filter, when performing the temporal filtering of a sample, only samples within the same sub-picture that the current sample belongs to may be used. The required samples may be in the same picture that the current sample belongs to or in other pictures.
18. In one example, whether to and/or how to apply a partitioning method (such as QT, horizontal BT, vertical BT, horizontal TT, vertical TT, or not split, etc.) may depend on whether the current block (or partition) crosses one or multiple boundary of a sub-picture.
    a. In one example, the picture boundary handling method for partitioning in VVC may also be applied when a picture boundary is replaced by a sub-picture boundary.
    b. In one example, whether to parse a syntax element (e.g., a flag) which represents a partitioning method (such as QT, horizontal BT, vertical BT, horizontal TT, vertical TT, or not split, etc.) may depend on whether the current block (or partition) crosses one or multiple boundary of a sub-picture.
19. Instead of splitting one picture into multiple sub-pictures with independent coding of each sub-picture, it is proposed to split a picture into at least two sets of sub-regions, with the first set including multiple sub-pictures and the second set including all the remaining samples.
    a. In one example, a sample in the second set is not in any sub-pictures.
    b. Alternatively, furthermore, the second set may be encoded/decoded based on the information of the first set.
    c. In one example, a default value may be utilized to mark whether a sample/M×K sub-region belonging to the second set.
        i. In one example, the default value may be set equal to (max_subpics_minus1+K) wherein K is an integer greater than 1.
        ii. The default value may be assigned to subpic_grid_idx[i][j] to indicate that grid belongs to the second set.
20. It is proposed that the syntax element subpic_grid_idx[i][j] cannot be larger than max_subpics_minus1.
    a. For example, it is constrained that in a conformance bit-stream, subpic_grid_idx[i][j] cannot be larger than max_subpics_minus1.
    b. For example, the codeword to code subpic_grid_idx[i][j] cannot be larger than max_subpics_minus1.
21. It is proposed that, any integer number from 0 to max_subpics_minus1 must be equal to at least one subpic_grid_idx[i][j].
22. IBC virtual buffer may be reset before decoding a new sub-picture in one picture.
    a. In one example, all the samples in the IBC virtual buffer may be reset to −1.
23. Palette entry list may be reset before decoding a new sub-picture in one picture.
    a. In one example, PredictorPaletteSize may be set equal to 0 before decoding a new sub-picture in one picture.
24. Whether to signal the information of slices (e.g., number of slices and/or ranges of slices) may depend on the number of tiles and/or the number of bricks.
    a. In one example, if the number of bricks in a picture is one, num_slices_in_pic_minus1 is not signalled and inferred to be 0.
    b. In one example, if the number of bricks in a picture is one, the information of slices (e.g., number of slices and/or ranges of slices) may not be signalled.

c. In one example, if the number of bricks in a picture is one, the number of slices may be inferred to be one. And the slice covers the whole picture. In one example, if the number of bricks in a picture is one, single brick_per_slice_flag is not signalled and inferred to be one.

i. Alternatively, if the number of bricks in a picture is one, single brick_per_slice_flag must be one.

d. An exemplary syntax design is as below:

|  | Descriptor |
|---|---|
| pic_parameter_set_rbsp( ) { | |
| ... | |
|   *if(NumBricksInPic > 1){* | |
|     single_brick_per_slice_flag | u(1) |
|     if( !single_brick_per_slice_flag ) | |
|       rect_slice_flag | u(1) |
|     if( rect_slice_flag && !single_brick_per_slice_flag ) { | |
|       num_slices_in_pic_minus1 | ue(v) |
|       bottom_right_brick_idx_length_minus1 | ue(v) |
|       for( i = 0; i < num_slices_in_pic_minus1; i++ ) { | |
|         bottom_right_brick_idx_delta[ i ] | u(v) |
|         brick_idx_delta_sign_flag[ i ] | u(1) |
|       } | |
|     } | |
|   *}* | |
|     loop_filter_across_bricks_enabled_flag | u(1) |
|     if( loop_filter_across_bricks_enabled_flag ) | |
|       loop_filter_across_slices_enabled_flag | u(1) |
|   } | |
| ... | |

25. Whether to signal slice_address may be decoupled from whether slices are signalled to be rectangles (e.g., whether rect_slice_flag is equal to 0 or 1).
　　a. An exemplary syntax design is as below:

| | |
|---|---|
| if( [[rect_slice flag \| ]] NumBricksInPic > 1 ) | |
|   slice_address | u(v) |

26. Whether to signal slice_address may depend on the number of slices when slices are signalled to be rectangles.

| | |
|---|---|
| *if(( rect slice flag && num slices in pic minus1> 0 ) \|\| (!rect slice flag && NumBricksInPic > 1 ))* | |
|   slice_address | u(v) |

27. Whether to signal num_bricks_in_slice_minus1 may depend on the slice_address and/or the number of bricks in the picture.
　　a. An exemplary syntax design is as below:

| | |
|---|---|
| if( !rect_slice_flag && ! single_brick_per_slice_flag *&& slice address < NumBricksInPic-1)* | |
|   num_bricks_in_slice_minus1 | ue(v) |

28. Whether to signal loop_filter_across_bricks_enabled_flag may depend on the number of tiles and/or the number of bricks.

a. In one example, loop_filter_across_bricks_enabled_flag is not signalled if the number of bricks is less than 2.
　　b. An exemplary syntax design is as below:

|  | Descriptor |
|---|---|
| pic_parameter_set_rbsp( ) { | |
| ... | |
|   *if(NumBricksInPic > 1)* | |
|     loop_filter_across_bricks_enabled_flag | u(1) |

-continued

|  | Descriptor |
|---|---|
|   if( loop_filter_across_bricks_enabled_flag ) | |
|     loop_filter_across_slices_enabled_flag | u(1) |
| ... | |

29. It is a requirement of bitstream conformance that all the slices of a picture must cover the whole picture.
　　a. The requirement must be satisfied when slices are signalled to be rectangles (e.g., rect_slice_flag is equal to 1).
30. It is a requirement of bitstream conformance that all the slices of a sub-picture must cover the whole sub-picture.
　　a. The requirement must be satisfied when slices are signalled to be rectangles (e.g., rect_slice_flag is equal to 1).
31. It is a requirement of bitstream conformance that a slice cannot be overlapped with more than one sub-picture.
32. It is a requirement of bitstream conformance that a tile cannot be overlapped with more than one sub-picture.
33. It is a requirement of bitstream conformance that a brick cannot be overlapped with more than one sub-picture.

In the following discussion, a basic unit block (BUB) with dimensions CW×CH is a rectangle region. For example, a BUB may be a coding tree block (CTB).
34. In one example, the number of sub-pictures (denoted as N) may be signalled.
  a. It may be required on a conformance bit-stream that there are at least two sub-pictures in a picture if sub-pictures are used (e.g., subpics_present_flag is equal to 1).
  b. Alternatively, N minus d (i.e., N-d) may be signalled, where d is an integer such as 0, 1, or 2.
  c. For example, N-d may be coded with fixed length coding e.g., u(x).
    i. In one example, x may be a fixed number such as 8.
    ii. In one example, x or x-dx may be signalled before N-d is signalled, where dx is an integer such as 0, 1 or 2. The signalled x may not be larger than a maximum value in a conformance bitstream.
    iii. In one example, x may be derived on-the-fly.
      1) For example, x may be derived as a function of the total number (denoted as M) of BUBs in the picture. E.g., x=Ceil(log 2(M+d0))+d1, where d0 and d1 are two integers, such as −2, −1, 0, 1, 2, etc.
      2) M may be derived as M=Ceiling(W/CW)× Ceiling(H/CH), where W and H represent the width and height, respectively, of the picture, and CW and CH represent the width and height, respectively, of a BUB.
  d. For example, N-d may be coded with a unary code or a truncated unary code.
  e. In one example, the allowed maximum value of N-d may be a fixed number.
    i. Alternatively, the allowed maximum value of N-d may be derived as a function of the total number (denoted as M) of BUBs in the picture. E.g., x=Ceil(log 2(M+d0))+d1, where d0 and d1 are two integers, such as −2, −1, 0, 1, 2, etc.
35. In one example, a sub-picture may be signalled by indications of one or multiple its selected positions (e.g., top-left/top-right/bottom-left/bottom-right position) and/or its width and/or its height.
  a. In one example, the top-left position of a sub-picture may be signalled in the granularity of a basic unit block (BUB) with dimensions CW×CH.
    i. For example, the column index (denoted as Col) in terms of BUBs of the top-left BUB of the sub-picture may be signalled.
      1) For example, Col-d may be signalled, where d is an integer such as 0, 1, or 2.
        a) Alternatively, d may be equal to Col of a sub-picture previously coded, added by d1, where d1 is an integer such as −1,0, or 1.
        b) The sign of Col-d may be signalled.
    ii. For example, the row index (denoted as Row) in term of BUBs of the top-left BUB of the sub-picture may be signalled.
      1) For example, Row-d may be signalled, where d is an integer such as 0, 1, or 2.
        a) Alternatively, d may be equal to Row of a sub-picture previously coded, added by d1, where d1 is an integer such as −1,0, or 1.
        b) The sign of Row-d may be signalled.
    iii. The row/column index (denoted as Row) mentioned above may be represented in the CTB unit,
      e.g., the x or y coordinate relative to the top-left position of a picture may be divided by CTB size and signalled.
    iv. In one example, whether to signal the position of a sub-picture may depend on the sub-picture index.
      1) In one example, for the first sub-picture within a picture, the top-left position may be not signalled.
        a) Alternatively, furthermore, the top-left position may be inferred, e.g., to be (0, 0).
      2) In one example, for the last sub-picture within a picture, the top-left position may be not signalled.
        a) The top-left position may be inferred depending on information of sub-pictures previously signalled.
  b. In one example, indications of the width/height/a selected position of a sub-picture may be signalled with truncated unary/truncated binary/unary/fixed length/K-th exponential Golomb (EG) coding (e.g., K=0, 1, 2, 3).
  c. In one example, the width of a sub-picture may be signalled in the granularity of a BUB with dimensions CW× CH.
    i. For example, the number of columns of BUBs in the sub-picture (denoted as W) may be signalled.
    ii. For example, W-d may be signalled, where d is an integer such as 0, 1, or 2.
      1) Alternatively, d may be equal to W of a sub-picture previously coded, added by d1, where d1 is an integer such as −1,0, or 1.
      2) The sign of W-d may be signalled.
  d. In one example, the height of a sub-picture may be signalled in the granularity of a BUB with dimensions CW× CH.
    i. For example, the number of rows of BUBs in the sub-picture (denoted as H) may be signalled.
    ii. For example, H-d may be signalled, where d is an integer such as 0, 1, or 2.
      1) Alternatively, d may be equal to H of a sub-picture previously coded, added by d1, where d1 is an integer such as −1,0, or 1.
      2) The sign of H-d may be signalled.
  e. In one example, Col-d may be coded with fixed length coding e.g., u(x).
    i. In one example, x may be a fixed number such as 8.
    ii. In on example, x or x-dx may be signalled before Col-d is signalled, where dx is an integer such as 0, 1 or 2. The signalled x may not be larger than a maximum value in a conformance bitstream.
    iii. In one example, x may be derived on-the-fly.
      1) For example, x may be derived as a function of the total number (denoted as M) of BUB columns in the picture. E.g., x=Ceil(log 2(M+d0))+d1, where d0 and d1 are two integers, such as −2, −1, 0, 1, 2, etc.
      2) M may be derived as M=Ceiling(W/CW), where W represents the width of the picture, and CW represents the width of a BUB.
  f. In one example, Row-d may be coded with fixed length coding e.g., u(x).
    i. In one example, x may be a fixed number such as 8.
    ii. In one example, x or x-dx may be signalled before Row-d is signalled, where dx is an integer such as 0, 1 or 2. The signalled x may not be larger than a maximum value in a conformance bitstream.

iii. In one example, x may be derived on-the-fly.

1) For example, x may be derived as a function of the total number (denoted as M) of BUB rows in the picture. E.g., x=Ceil(log 2(M+d0))+d1, where d0 and d1 are two integers, such as −2, −1, 0, 1, 2, etc.

2) M may be derived as M=Ceiling(H/CH), where H represents the height of the picture, and CH represents the height of a BUB.

g. In one example, W-d may be coded with fixed length coding e.g., u(x).

i. In one example, x may be a fixed number such as 8.

ii. In on example, x or x-dx may be signalled before W-d is signalled, where dx is an integer such as 0, 1 or 2. The signalled x may not be larger than a maximum value in a conformance bitstream.

iii. In one example, x may be derived on-the-fly.

1) For example, x may be derived as a function of the total number (denoted as M) of BUB columns in the picture. E.g., x=Ceil(log 2(M+d0))+d1, where d0 and d1 are two integers, such as −2, −1, 0, 1, 2, etc.

2) M may be derived as M=Ceiling(W/CW), where W represents the width of the picture, and CW represents the width of a BUB.

h. In one example, H-d may be coded with fixed length coding e.g., u(x).

i. In one example, x may be a fixed number such as 8.

ii. In one example, x or x-dx may be signalled before H-d is signalled, where dx is an integer such as 0, 1 or 2. The signalled x may not be larger than a maximum value in a conformance bitstream.

iii. In one example, x may be derived on-the-fly.

1) For example, x may be derived as a function of the total number (denoted as M) of BUB rows in the picture. E.g., x=Ceil(log 2(M+d0))+d1, where d0 and d1 are two integers, such as −2, −1, 0, 1, 2, etc.

2) M may be derived as M=Ceiling(H/CH), where H represents the height of the picture, and CH represents the height of a BUB.

i. Col-d and/or Row-d may be signalled for all sub-pictures.

i. Alternatively, Col-d and/or Row-d may not be signalled for all sub-pictures.

1) Col-d and/or Row-d may not be signalled if the number of sub-pictures are less than 2. (equal to 1).

2) For example, Col-d and/or Row-d may not be signalled for the first sub-picture (e.g., with the sub-picture index (or sub-picture ID) equal to 0).

a) When they are not signalled, they may be inferred to be 0.

3) For example, Col-d and/or Row-d may not be signalled for the last sub-picture (e.g., with the sub-picture index (or sub-picture ID) equal to NumSubPics-1).

a) When they are not signalled, they may be inferred depending on the positions and dimensions of sub-pictures already signalled.

j. W-d and/or H-d may be signalled for all sub-pictures.

i. Alternatively, W-d and/or H-d may not be signalled for all sub-pictures.

1) W-d and/or H-d may not be signalled if the number of sub-pictures are less than 2. (equal to 1).

2) For example, W-d and/or H-d may not be signalled for the last sub-picture (e.g., with the sub-picture index (or sub-picture ID) equal to NumSubPics-1).

a) When they are not signalled, they may be inferred depending on the positions and dimensions of sub-pictures already signalled.

k. In the above bullets, a BUB may be a CTB.

36. In one example, the information of sub-pictures should be signalled after information of the CTB size (e.g., log 2_ctu_size_minus5) has already been signalled.

37. subpic_treated_as_pic_flag[i] may not be signalled for each sub-pictures. Instead, one subpic_treated_as_pic_flag is signalled to control whether a sub-picture is treated as a picture for all sub-pictures.

38. loop_filter_across_subpic_enabled_flag[i] may not be signalled for each sub-pictures. Instead, one loop_filter_across_subpic_enabled_flag is signalled to control whether loop filters can be applied across sub-pictures for all sub-pictures.

39. subpic_treated_as_pic_flag[i](subpic_treated_as_pic_flag) and/or loop_filter_across_subpic_enabled_flag[i] (loop_filter_across_subpic_enabled_flag) may be signalled conditionally.

a. In one example, subpic_treated_as_pic_flag[i] and/or loop_filter_across_subpic_enabled_flag[i] may not be signalled if the number of sub-pictures are less than 2. (equal to 1).

40. RPR may be applied when sub-pictures are used.

a. In one example, the scaling ratio in RPR may be constrained to be a limited set when sub-pictures are used, such as {1:1, 1:2 and/or 2:1}, or {1:1, 1:2 and/or 2:1, 1:4 and/or 4:1}, {1:1, 1:2 and/or 2:1, 1:4 and/or 4:1, 1:8 and/or 8:1}.

b. In one example, the CTB size of a picture A and the CTB size of a picture B may be different if the resolution of picture A and picture B are different.

c. In one example, suppose a sub-picture SA with dimensions SAW×SAH is in picture A and a sub-picture SB with dimensions SBW×SBH is in picture B, SA corresponds to SB, and the scaling ratios between picture A and picture B are Rw and Rh along the horizontal and vertical directions, then i. SAW/SBW or SBW/SAW should be equal to Rw.

ii. SAH/SBH or SBH/SAH should be equal to Rh.

41. When sub-pictures are used (e.g., sub_pics_present_flag is true), a subpicture index (or sub-picture ID) may be signalled in the slice header, and the slice_address is interrupted as the address in a sub-picture instead of the whole picture.

EMBODIMENTS

In the following embodiments, the newly added texts are bold italicized and the deleted texts are marked by double square brackets (e.g., [[ ]]).

Embodiment 1: Sub-Picture Constraint on Affine Constructed Merge Candidates 8.5.5.6 Derivation Process for Constructed Affine Control Point Motion Vector Merging Candidates
Inputs to this process are:
a luma location (xCb, yCb) specifying the top-left sample of the current luma coding block relative to the top-left luma sample of the current picture,
two variables cbWidth and cbHeight specifying the width and the height of the current luma coding block,
the availability flags availableA$_0$, availableA$_1$, availableA$_2$, availableB$_0$, availableB$_1$, availableB$_2$, availableB$_3$,
the sample locations (xNbA$_0$, yNbA$_0$), (xNbA$_1$, yNbA$_1$), (xNbA$_2$, yNbA$_2$), (xNbB$_0$, yNbB$_0$), (xNbB$_1$, yNbB$_1$), (xNbB$_2$, yNbB$_2$) and (xNbB$_3$, yNbB$_3$).
Output of this process are:
the availability flag of the constructed affine control point motion vector merging candidates availableFlagConstK, with K=1..6,
the reference indices refIdxLXConstK, with K=1..6, X being 0 or 1,
the prediction list utilization flags predFlagLXConstK, with K=1..6, X being 0 or 1,
the affine motion model indices motionModelIdcConstK, with K=1..6,
the bi-prediction weight indices bcwIdxConstK, with K=1..6,
the constructed affine control point motion vectors cpMvLXConstK[cpIdx] with cpIdx=0..2, K=1..6 and X being 0 or 1.
The fourth (collocated bottom-right) control point motion vector cpMvLXCorner[3], reference index refIdxLXCorner[3], prediction list utilization flag predFlagLXCorner[3] and the availability flag availableFlagCorner[3] with X being 0 and 1 are derived as follows:
The reference indices for the temporal merging candidate, refIdxLXCorner[3], with X being 0 or 1, are set equal to 0.
The variables mvLXCol and availableFlagLXCol, with X being 0 or 1, are derived as follows:
If slice_temporal_mvp_enabled_flag is equal to 0, both components of mvLXCol are set equal to 0 and availableFlagLXCol is set equal to 0.
Otherwise (slice_temporal_mvp_enabled_flag is equal to 1), the following applies:

$$xColBr = xCb + cbWidth \quad (8\text{-}601)$$

$$yColBr = yCb + cbHeight \quad (8\text{-}602)$$

*rightBoundaryPos = subpic treated as pic flag[ SubPicIdx ] ?*
*SubPicRightBoundaryPos :*
*pic width in luma samples – 1*
*botBoundaryPos = subpic treated as pic flag[ SubPicIdx ] ?*
*SubPicBotBoundaryPos :*
*pic height in luma samples – 1*
If yCb>>CtbLog2SizeY is equal to yColBr>>CtbLog2SizeY, *yColBr is less than or equal to botBoundaryPos and xColBr is less than or equal to rightBoundaryPos, the following applies*:
The variable colCb specifies the luma coding block covering the modified location given by ((xColBr>>3)<<3, (yColBr>>3)<<3) inside the collocated picture specified by ColPic.
The luma location (xColCb, yColCb) is set equal to the top-left sample of the collocated luma coding block specified by colCb relative to the top-left luma sample of the collocated picture specified by ColPic.
The derivation process for collocated motion vectors as specified in clause 8.5.2.12 is invoked with currCb, colCb, (xColCb, yColCb), refIdxLXCorner[ 3 ] and sbFlag set equal to 0 as inputs, and the output is assigned to mvLXCol and availableFlagLXCol.
Otherwise, both components of mvLXCol are set equal to 0 and availableFlagLXCol is set equal to 0.

Embodiment 2: Sub-Picture Constraint on Affine Constructed Merge Candidates 8.5.5.6 Derivation Process for Constructed Affine Control Point Motion Vector Merging Candidates
Inputs to this process are:
a luma location (xCb, yCb) specifying the top-left sample of the current luma coding block relative to the top-left luma sample of the current picture,
two variables cbWidth and cbHeight specifying the width and the height of the current luma coding block,
the availability flags availableA$_0$, available& availableA$_2$, availableB$_0$, availableB$_1$, availableB$_2$, availableB$_3$,
the sample locations (xNbA$_0$, yNbA$_0$), (xNbA$_1$, yNbA$_1$), (xNbA$_2$, yNbA$_2$), (xNbB$_0$, yNbB$_0$), (xNbB$_1$, yNbB$_1$), (xNbB$_2$, yNbB$_2$) and (xNbB$_3$, yNbB$_3$).
Output of this process are:
the availability flag of the constructed affine control point motion vector merging candidates availableFlagConstK, with K=1..6,
the reference indices refIdxLXConstK, with K=1..6, X being 0 or 1,
the prediction list utilization flags predFlagLXConstK, with K=1..6, X being 0 or 1,
the affine motion model indices motionModelIdcConstK, with K=1..6,
the bi-prediction weight indices bcwIdxConstK, with K=1..6,
the constructed affine control point motion vectors cpMvLXConstK[cpIdx] with cpIdx=0..2, K=1..6 and X being 0 or 1.
The fourth (collocated bottom-right) control point motion vector cpMvLXCorner[3], reference index refIdxLXCorner[3], prediction list utilization flag predFlagLXCorner[3] and the availability flag availableFlagCorner[3] with X being 0 and 1 are derived as follows:
The reference indices for the temporal merging candidate, refIdxLXCorner[3], with X being 0 or 1, are set equal to 0.
The variables mvLXCol and availableFlagLXCol, with X being 0 or 1, are derived as follows:
If slice_temporal_mvp_enabled_flag is equal to 0, both components of mvLXCol are set equal to 0 and availableFlagLXCol is set equal to 0.
Otherwise (slice_temporal_mvp_enabled_flag is equal to 1), the following applies:

$$xColBr = xCb + cbWidth \quad (8\text{-}601)$$

$$yColBr = yCb + cbHeight \quad (8\text{-}602)$$

*rightBoundaryPos = subpic*
*treated as pic flag[ SubPicIdx ] ?*

*SubPicRightBoundaryPos :*
*pic width in luma samples – 1*
  *botBoundaryPos = subpic*
    *treated as pic flag[ SubPicIdx ] ?*
  *SubPicBotBoundaryPos :*
    *pic height in luma samples – 1*
  *xColBr = Min( rightBoundaryPos , xColBr)*
  *yColBr = Min (botBoundaryPos , yColBr)*
  If yCb>>CtbLog 2SizeY is equal to yColBr>>CtbLog 2SizeY:
    The variable colCb specifies the luma coding block covering the modified location given by ((xColBr>>3)<<3, (yColBr>>3)<<3) inside the collocated picture specified by ColPic.
    The luma location (xColCb, yColCb) is set equal to the top-left sample of the collocated luma coding block specified by colCb relative to the top-left luma sample of the collocated picture specified by ColPic.
    The derivation process for collocated motion vectors as specified in clause 8.5.2.12 is invoked with currCb, colCb, (xColCb, yColCb), refIdxLXCorner[3] and sbFlag set equal to 0 as inputs, and the output is assigned to mvLXCol and availableFlagLXCol.
  Otherwise, both components of mvLXCol are set equal to 0 and availableFlagLXCol is set equal to 0.

Embodiment 3: Fetching Integer Samples Under the Sub-Picture Constraint 8.5.6.3.3 Luma Integer Sample Fetching Process
Inputs to this process are:
a luma location in full-sample units (xInt$_L$, yInt$_L$),
the luma reference sample array refPicLX$_L$,
Output of this process is a predicted luma sample value predSampleLX$_L$
The variable shift is set equal to Max(2, 14−BitDepth$_Y$)
The variable picW is set equal to pic_width_in_luma_samples and the variable picH is set equal to pic_height_in_luma_samples.
The luma locations in full-sample units (xInt, yInt) are derived as follows:
  – *If subpic treated as pic flag[*
  *the following applies:*
    *SubPicIdx ] is equal to 1,*
      *SubPicRightBoundaryPos, xInt)*
    *xInt = Clip3( SubPicLeftBoundaryPos,*
      *SubPicBotBoundaryPos, yInt*
    *yInt = Clip3( SubPicTopBoundaryPos,  –  Otherwise:* xInt=Clip3(0,picW−1,*sps*_ref_wraparound_enabled_flag? (8-782)

ClipH((*sps*_ref_raparound_offset_minus1+1)*MinCbSizeY,picW,xInt$_L$): xInt$_L$)

yInt=Clip3(0,picH−1,yInt$_L$) (8-783)

The predicted luma sample value predSampleLX$_L$ is derived as follows:

predSampleLX$_L$=refPicLX$_L$[xInt][yInt]<<shift3 (8-784)

Embodiment 4: Deriving the Variable InvAvgLuma in Chroma Residual Scaling of LMCS 8.7.5.3 Picture Reconstruction with Luma Dependent Chroma Residual Scaling Process for Chroma Samples
Inputs to this process are:
a chroma location (xCurr, yCurr) of the top-left chroma sample of the current chroma transform block relative to the top-left chroma sample of the current picture,
a variable nCurrSw specifying the chroma transform block width,
a variable nCurrSh specifying the chroma transform block height,
a variable tuCbfChroma specifying the coded block flag of the current chroma transform block,
an (nCurrSw)x(nCurrSh) array predSamples specifying the chroma prediction samples of the current block,
an (nCurrSw)x(nCurrSh) array resSamples specifying the chroma residual samples of the current block,
Output of this process is a reconstructed chroma picture sample array recSamples.
The variable sizeY is set equal to Min(CtbSizeY, 64).
The reconstructed chroma picture sample recSamples is derived as follows for i=0..nCurrSw−1, j=0..nCurrSh−1:
Otherwise, the following applies:
The variable currPic specifies the array of reconstructed luma samples in the current picture.
For the derivation of the variable varScale the following ordered steps apply:
  1. The variable invAvgLuma is derived as follows:
    The array recLuma[i] with i=0..(2*sizeY−1) and the variable cnt are derived as follows:
      The variable cnt is set equal to 0.
      *The variablerightBoundary*
        *Pos and botBoundaryPos*
        *are derived as follows:*
      *rightBoundaryPos = subpic_treated_*
        *as_pic_flag[ SubPicIdx ] ?*
      *SubPicRightBoundaryPos :*
        *pic_width_in_luma_samples – 1*
      *botBoundaryPos = subpic_treated_*
        *as_pic_flag[ SubPicIdx ] ?*
      *SubPicBotBoundaryPos :*
        *pic_height_in_luma_samples - 1*
      When availL is equal to TRUE, the array recLuma[i] with i=0..sizeY−1 is set equal to currPic[xCuCb−1][Min(yCuCb+i, botBoundaryPos)] with i=0..sizeY−1, and cnt is set equal to sizeY
      When availT is equal to TRUE, the array recLuma[cnt+i] with i=0.. sizeY−1 is set equal to currPic[Min(xCuCb+i, *rightBoundaryPos* )][yCuCb−1] with i=0..sizeY−1, and cnt is set equal to (cnt+sizeY)
    The variable invAvgLuma is derived as follows:
      If cnt is greater than 0, the following applies:

invAvgLuma=Clip1$_Y$(($\Sigma_{k=0}^{cnt-1}$recLuma[k]+ (cnt>>1))>>Log 2(cnt)) (8-1013)

Otherwise (cnt is equal to 0), the following applies:

invAvgLuma=1<<(BitDepth$_Y$−1) (8-1014)

Embodiment 5: An Example of Defining the Sub-Picture Element in Unit of N(Such as N=8 or 32) Other than 4 Samples 7.4.3.3 Sequence Parameter Set RBSP Semantics
subpic_grid_col_width_minus1 plus 1 specifies the width of each element of the sub-picture identifier grid in units of 4-N samples. The length of the syntax element is Ceil(Log 2(pic_width_max_in_luma_samples/4-N))) bits. The variable NumSubPicGridCols is derived as follows:

NumSubPicGridCols=(*pic*_width_max_in_lumasamples+subpic_grid_*col*_width_minus1*N+ N−1)/(subpic_grid_*col*_width_minus1*N+N−1) (7-5)

subpic_grid_row_height_minus1 plus 1 specifies the height of each element of the sub-picture identifier grid in units of 4 samples. The length of the syntax element is Ceil(Log 2(pic_height_max_in_luma_samples/4-N)) bits. The variable NumSubPicGridRows is derived as follows:

NumSubPicGridRows=(pic_height_max_in_luma_samples+
subpic_grid_row_height_minus1*4N+N−1)/
(subpic_grid_row_height_minus1*N+N−1)

7.4.7.1 General Slice Header Semantics

The variables SubPicIdx, SubPicLeftBoundaryPos, SubPicTopBoundaryPos, SubPicRightBoundaryPos, and SubPicBotBoundaryPos are derived as follows:

SubPicIdx=CtbToSubPicIdx[CtbAddrBsToRs[FirstCtbAddrBs[SliceBrickIdx[0]]]]if(subpic_treated_as_pic_flag[SubPicIdx]){

SubPicLeftBoundaryPos=SubPicLeft[SubPicIdx]*
(subpic_grid_col_width_minus1+1)*4NSubPicRightBoundaryPos=(SubPicLeft[SubPicIdx]+
SubPicWidth[SubPicIdx])*
(subpic_grid_col_width_minus1+1)*4N           (7–93)

SubPicTopBoundaryPos=SubPicTop[SubPicIdx]*
(subpic_grid_row_height_minus1+1)*4NSubPicBotBoundaryPos=(SubPicTop[SubPicIdx]+
SubPicHeight[SubPicIdx])*
(subpic_grid_row_height_minus1+1)*4N}

Embodiment 6: Restrict the Picture Width and the Picture Height to be Equal or Larger than 8

7.4.3.3 Sequence Parameter Set RBSP Semantics pic_width_max_in_luma_samples specifies the maximum width, in units of luma samples, of each decoded picture referring to the SPS. pic_width_max_in_lumasamples shall not be equal to 0 and shall be an integer multiple of *Max( 8, MinCbSizeY )* .

pic_height_max_in_luma_samples specifies the maximum height, in units of luma samples, of each decoded picture referring to the SPS. pic_height_max_in_luma_samples shall not be equal to 0 and shall be an integer multiple of *Max( 8, MinCbSizeY )* .

5.7 Embodiment 7: Sub-Picture Boundary Check for BT/TT/QT Splitting, BT/TT/QT Depth Derivation, and/or the Signalling of CU Split Flag

6.4.2 Allowed Binary Split Process

The variable allowBtSplit is derived as follows:
Otherwise, if all of the following conditions are true,
 allowBtSplit is set equal to FALSE
 btSplit is equal to SPLIT_BT_VER
 y0+cbHeight is greater than
  *subpic treated as pic flag[ SubPicIdx ] ?*
   *SubPicBotBoundaryPos + 1.*
  *pic height in luma samples*
Otherwise, if all of the following conditions are true,
 allowBtSplit is set equal to FALSE
 btSplit is equal to SPLIT_BT_VER
 cbHeight is greater than MaxTbSizeY
 x0+cbWidth is greater than
  *subpic treated as pic flag[ SubPicIdx ] ?*
   *SubPicRightBoundaryPos + 1.*
  *pic width in luma samples*
Otherwise, if all of the following conditions are true,
 allowBtSplit is set equal to FALSE
 btSplit is equal to SPLIT_BT_HOR
 cbWidth is greater than MaxTbSizeY
 y0+cbHeight is greater than
  *subpic treated as pic flag[ SubPicIdx ] ?*
   *SubPicBotBoundaryPos + 1:*
  *pic height in luma samples*
Otherwise, if all of the following conditions are true,
 allowBtSplit is set equal to FALSE
 x0+cbWidth is greater than
  *subpic treated as pic flag[ SubPicIdx ] ?*
   *SubPicRightBoundaryPos + 1*
  *: pic width in luma samples*
 y0+cbHeight is greater than
  *subpic treated as pic flag[ SubPicIdx ] ?*
   *SubPicBotBoundaryPos + 1:*
  *pic height in luma samples*
 cbWidth is greater than minQtSize
Otherwise, if all of the following conditions are true,
 allowBtSplit is set equal to FALSE
 btSplit is equal to SPLIT_BT_HOR
 x0+cbWidth is greater than
  *subpic treated as pic flag[ SubPicIdx ] ?*
   *SubPicRightBoundaryPos + 1:*
  *pic width in luma samples*
 y0+cbHeight is less than or equal to
  *subpic treated as pic flag[ SubPicIdx ]*
  *?SubPicBotBoundaryPos + 1:*
  *pic height in luma samples.*

6.4.2 Allowed Ternary Split Process

The variable allowTtSplit is derived as follows:
If one or more of the following conditions are true,
 allowTtSplit is set equal to FALSE:
 cbSize is less than or equal to 2*MinTtSizeY
 cbWidth is greater than Min(MaxTbSizeY, maxTtSize)
 cbHeight is greater than Min(MaxTbSizeY, maxTtSize)
 mttDepth is greater than or equal to maxMttDepth
 x0+cbWidth is greater than
  *subpic treated as pic flag[ SubPicIdx ] ?*
   *SubPicRightBoundaryPos + 1*
  *: pic width in luma samples*
 y0+cbHeight is greater than
  *subpic treated as pic flag[ SubPicIdx ] ?*
   *SubPicBotBoundaryPos + 1:*
  *pic height in luma samples*.
 treeType is equal to DUAL_TREE_CHROMA and (cbWidth/SubWidthC)*(cbHeight/SubHeightC) is less than or equal to 32
 treeType is equal to DUAL_TREE_CHROMA and modeType is equal to MODE_TYPE_INTRA
Otherwise, allowTtSplit is set equal to TRUE.

7.3.8.2 Coding Tree Unit Syntax

| | Descriptor |
|---|---|

```
dual_tree_implicit_qt_split( x0, y0, cbSize, cqtDepth ) {
  ...
  if( x1 < [[pic_width_in_luma_samples]]
  (subpic treated as pic flag[ SubPicIdx ] ? ) )
    SubPicRightBoundaryPos + 1 : pic width in luma samples))
    dual_tree_implicit_qt_split( x1, y0, cbSize / 2, cqtDepth + 1 )
```

-continued

|  | Descriptor |
|---|---|
|     if( y1 < [[pic_height_in_luma samples]] (*subpic treated as pic flag[ SubPicIdx ] ?*<br>*SubPicBotBoundaryPos + 1: pic height in luma samples*<br>        dual_tree_implicit_qt_split( x0, y1, cbSize / 2, cqtDepth + 1 )<br>      if( x1 < [[pic width in luma samples]] *(subpic treated as pic flag[ SubPicIdx ] ?*<br>***SubPicRightBoundaryPos + 1 : pic width in luma samples)* && y1 <**<br>[[pic height in luma samples]] (*subpic treated as pic flag[ SubPicIdx ] ?*<br>*SubPicBotBoundaryPos + 1: pic height in luma samples* ) )<br>        dual_tree_implicit_qt_split( x1, y1, cbSize / 2, cqtDepth + 1 )<br>   } else {<br>...<br>   }<br>} |  |

7.3.8.4 Coding Tree Syntax

|  | Descriptor |
|---|---|
| coding_tree( x0, y0, cbWidth, cbHeight, qgOnY, qgOnC, cbSubdiv, cqtDepth, mttDepth,<br>depthOffset,<br>        partIdx, treeTypeCurr, modeTypeCurr ) {<br>  if( (allowSplitBtVer \|\| allowSplitBtHor \|\| allowSplitTtVer \|\| allowSplitTtHor \|\| allowSplitQT )<br>    &&( x0 + cbWidth <= [[pic_width_in_luma_samples]]<br>*(subpic treated as pic flag[ SubPicIdx ] ? SubPicRightBoundaryPos + 1 :*<br>***pic width in luma samples)* )**<br>    && (y0 + cbHeight <= [[pic_height_in_luma_samples]]<br>*(subpic treated as pic flag[ SubPicIdx ] ? SubPicBotBoundaryPos +*<br>***1: pic height in luma samples)* ) )**<br>        split_cu_flag | ae(v) |
|   if( cu_qp_delta_enabled_flag && qgOnY && cbSubdiv <= cu_qp_delta_subdiv ) {<br>...<br>        depthOffset += ( y0 + cbHeight > [[pic_height_in_luma_samples]]<br>*(subpic treated as pic flag[ SubPicIdx ] ? SubPicBotBoundaryPos +*<br>***1: pic height in luma samples)* ) ? 1 : 0**<br>        y1 = y0 + (cbHeight / 2 )<br>        coding_tree( x0, y0, cbWidth, cbHeight / 2, qgOnY, qgOnC, cbSubdiv + 1,<br>                  cqtDepth, mttDepth + 1, depthOffset, 0, treeType, modeType )<br>        if( y1 < [[pic_height_in_luma_samples]] *(subpic treated as pic flag[ SubPicIdx ]?*<br>***SubPicBotBoundaryPos + 1: pic height in luma samples)* )**<br>           coding_tree( x0, y1, cbWidth, cbHeight / 2, qgOnY, qgOnC, cbSubdiv + 1,<br>                  cqtDepth, mttDepth + 1, depthOffset, 1, treeType, modeType )<br>...<br>    if( x1 < [[pic_width_in_luma_samples]] *(subpic treated as pic flag[ SubPicIdx ] ?*<br>***SubPicRightBoundaryPos + 1 : pic width in luma samples)* )**<br>        coding_tree( x1, y0, cbWidth / 2, cbHeight / 2, qgOnY, qgOnC, cbSubdiv + 2,<br>            cqtDepth + 1, 0, 0, 1, treeType, modeType )<br>    if( y1 < [[pic_height_in_luma_samples]] *(subpic treated as pic flag[ SubPicIdx ] ?*<br>***SubPicBotBoundaryPos + 1: pic height in luma samples)*)**<br>        coding_tree( x0, y1, cbWidth / 2, cbHeight / 2, qgOnY, qgOnC, cbSubdiv + 2,<br>            cqtDepth + 1, 0, 0, 2, treeType, modeType )<br>    if( y1 < [[pic_height_in_luma_samples]] (*subpic_treated_as_pic_flag[ SubPicIdx ] ?*<br>***SubPicBotBoundaryPos + 1: pic_height_in_luma_samples*) && x1 <**<br>[[pic_width_in_luma_samples]] *(subpic treated as pic flag[ SubPicIdx ] ?*<br>***SubPicRightBoundaryPos + 1: pic width in luma samples)* )**<br>        coding_tree( x1, y1, cbWidth / 2, cbHeight / 2, qgOnY, qgOnC, cbSubdiv + 2,<br>            cqtDepth + 1, 0, 0, 3, treeType, modeType ) |  |

Embodiment 8: An Example of Defining the Sub-Pictures

|  | Descriptor |
|---|---|
| seq_parameter_set_rbsp( ) { |  |
| ... |  |
|     sps_decoding_parameter_set_id | u(4) |
| ... |  |
|     pic_width_max_in_luma_samples | ue(v) |
|     pic_height_max_in_luma_samples | ue(v) |
|     [[subpics_present_flag | u(1) |
|     if( subpics_present_flag ) { |  |
|         max_subpics_minus1 | u(8) |
|         subpic_grid_col_width_minus1 | u(v) |
|         subpic_grid_row_height_minus1 | u(v) |
|         for( i = 0; i < NumSubPicGridRows; i++ ) |  |
|             for( j = 0; j < NumSubPicGridCols; j++ ) |  |
|                 subpic_grid_idx[ i ] [ j ] | u(v) |
|         for( i = 0; i <= NumSubPics; i++ ) { |  |
|             subpic_treated_as_pic_flag[ i ] | u(1) |
|             loop_filter_across_subpic_enabled_flag[ i ] | u(1) |
|         } |  |
| } |  |

|  | Descriptor |
|---|---|
| ... |  |
|     }]] |  |
|     bit_depth_luma_minus8 | ue(v) |
| ... |  |
|     log2_ctu_size_minus5 | u(2) |
| ... |  |
|     *subpics_present_flag* | *u(1)* |
|     *if( subpics_present_flag ) {* |  |
|     *num_subpics_minus1* | *u(8)* |
|         *for( i = 0; i <= num_subpics_minus1; i++ ) {* |  |
|     *subpic_ctb_addr_x[i]* | *u(8)* |
|     *subpic_ctb_addr_y[i]* | *u(8)* |
|     *subpic_ctb_width_minus1[i]* | *u(8)* |
|     *subpic_ctb_height_minus1[i]* | *u(8)* |
|         *subpic_treated_as_pic_flag[ i ]* | *u(1)* |
|         *loop_filter_across_subpic_enabled_flag[ i ]* | *u(1)* |
|     } |  |
| ... |  |

Embodiment 9: An Example of Defining the Sub-Pictures

|  | Descriptor |
|---|---|
| seq_parameter_set_rbsp( ) { |  |
| ... |  |
|     sps_decoding_parameter_set_id | u(4) |
| ... |  |
|     pic_width_max_in_luma_samples | ue(v) |
|     pic_height_max_in_luma_samples | ue(v) |
|     [[subpics_present_flag | u(1) |
|     if( subpics_present_flag ) { |  |
|       max_subpics_minus1 | u(8) |
|       sub_pic_grid_col_width_minus1 | u(v) |
|       sub_pic_grid_row_height_minus1 | u(v) |
|       for( i = 0; i < NumSubPicGridRows; i++ ) |  |
|         for( j = 0; j < NumSubPicGridCols; j++ ) |  |
|           subpic_grid_idx[ i ] [ j ] | u(v) |
|       for( i = 0; i <= NumSubPics; i++ ) { |  |
|         subpic_treated_as_pic_flag[ i ] | u(1) |
|         loop_filter_across_subpic_enabled_flag[ i ] | u(1) |
|       } |  |
|     }]] |  |
|     bit_depth_luma_minus8 | ue(v) |
| ... |  |
|     log2_ctu_size_minus5 | u(2) |
| ... |  |
|     *subpics_present_flag* | *u(1)* |
|     *if( subpics_present_flag ) {* |  |
|   *num_subpics_minus1* | *ue(v)* |
|     *for( i = 0; i <= num_subpics_minus1; i++ ) {* |  |
|     *subpic_ctb_addr_x[i]* | *u(8)* |
|     *subpic_ctb_addr_y[i]* | *u(8)* |
|     *subpic_ctb_width_minus1[i]* | *u(8)* |
|     *subpic_ctb_height_minus1[i]* | *u(8)* |
|       *subpic_treated_as_pic_flag[ i ]* | *u(1)* |
|       *loop_filter_across_subpic_enabled_flag[ i ]* | *u(1)* |
|     } |  |
| ... |  |

Embodiment 10: An Example of Defining the Sub-Pictures

|  | Descriptor |
|---|---|
| seq_parameter_set_rbsp( ) { |  |
|     sps_decoding_parameter_set_id | u(4) |
| ... |  |
|     pic_width_max_in_luma_samples | ue(v) |
|     pic_height_max_in_luma_samples | ue(v) |
|     [[subpics_present_flag | u(1) |
|     if( subpics_present_flag ) { |  |
|         max_subpics_minus1 | u(8) |
|         subpic_grid_col_width_minus1 | u(v) |
|         sub_pic_grid_row_height_minus1 | u(v) |
|         for( i = 0; i < NumSubPicGridRows; i++ ) |  |
|             for( j = 0; j < NumSubPicGridCols; j++ ) |  |
|                 subpic_grid_idx[ i ][ j ] | u(v) |
|         for( i = 0; i <= NumSubPics; i++ ) { |  |
|             subpic_treated_as_pic_flag[ i ] | u(1) |
|             loop_filter_across_subpic_enabled_flag[ i ] | u(1) |
|         } |  |
|     }]] |  |
| ... |  |
|     log2_ctu_size_minus5 | u(2) |
| ... |  |
|     *__subpics_present_flag__* | *u(1)* |
|     *__if( subpics_present_flag) {__* |  |
| *__num_subpics_minus2__* | *u(v)* |
|     subpic_addr_x_length_minus1 | *ue(v)* |
|     subpic_addr_y_length_minus1 | *ue(v)* |
|     *__for( i = 0; i < NumSubPics; i++ ) {__* |  |
| *__subpic_ctb_addr_x[i]__* | *u(v)* |
| *__subpic_ctb_addr_y[i]__* | *u(v)* |
| *__subpic_ctb_width_minus1[i]__* | *u(v)* |
| *__subpic_ctb_height_minus1[i]__* | *u(v)* |
|         *__subpic_treated_as_pic_flag[ i ]__* | *u(1)* |
|         *__loop_filter_across_subpic_enabled_flag[ i ]__* | *u(1)* |
|     } |  |
| ... |  |

40

Embodiment 11: An Example of Defining the Sub-Pictures

|  | Descriptor |
|---|---|
| seq_parameter_set_rbsp( ) { |  |
|     sps_decoding_parameter_set_id | u(4) |
| ... |  |
|     pic_width_max_in_luma_samples | ue(v) |
|     pic_height_max_in_luma_samples | ue(v) |
|     [[subpics_present_flag | u(1) |
|     if( subpics_present_flag ) { |  |
|         max_sub_pics_minus1 | u(8) |
|         sub_pic_grid_col_width_minus1 | u(v) |
|         sub_pic_grid_row_height_minus1 | u(v) |
|         for( i = 0; i < NumSubPicGridRows; i++ ) |  |
|             for( j = 0; j < NumSubPicGridCols; j++ ) |  |
|                 subpic_grid_idx[ i ][ j ] | u(v) |
|         for( i = 0; i <= NumSubPics; i++ ) { |  |
|             subpic_treated_as_pic_flag[ i ] | u(1) |
|             loop_filter_across_subpic_enabled_flag[ i ] | u(1) |
|         } |  |
|     }]] |  |
| ... |  |
|     log2_ctu_size_minus5 | u(2) |
| ... |  |
|     *__subpics_present_flag__* | *u(1)* |

-continued

|  | Descriptor |
|---|---|
| if( subpics_present_flag ) { | |
|    num_subpics_minus2 | u(v) |
|    sub_pic_addr_x_length_minus1 | ue(v) |
|    sub_pic_addr_y_length_minus1 | ue(v) |
|    for( i = 0; i < NumSubPics; i++ ) { | |
|     if(i < NumSubPics - 1){ | |
|      subpic_ctb_addr_x[i] | u(v) |
|      subpic_ctb_addr_y[i] | u(v) |
|      subpic_ctb_width_minus1[i] | u(v) |
|      subpic_ctb_height_minus1[i] | u(v) |
|     } | |
|      subpic_treated_as_pic_flag[ i ] | |
|      loop_filter_across_subpic_enabled_flag[ i ] | |
| } | |
| ... | |

NumSubPics=Num Subpics Minus2+2.

Figure 3:
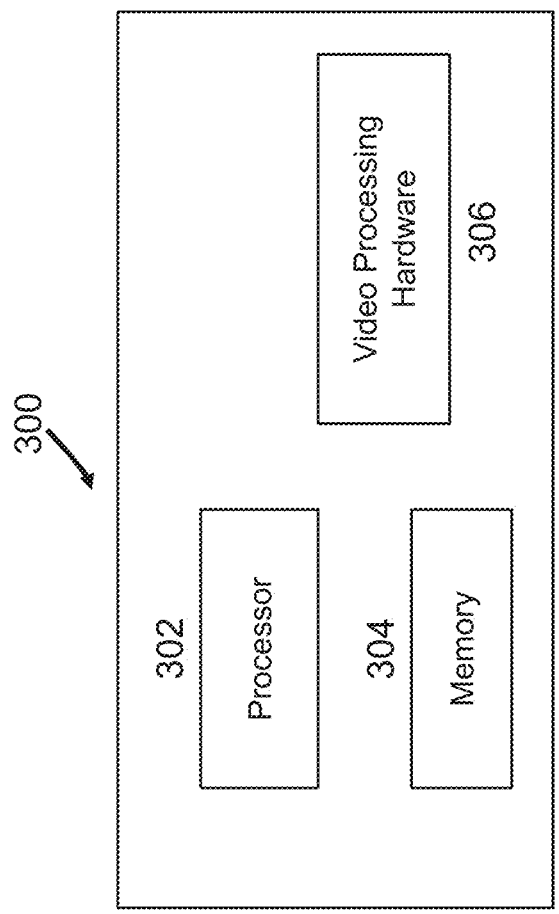
FIG. 3 is a block diagram of an example of a hardware platform used for implementing embodiments described in the present disclosure.

FIG. 3 is a block diagram of a video processing apparatus 300. The apparatus 300 may be used to implement one or more of the methods described herein. The apparatus 300 may be embodied in a smartphone, tablet, computer, Internet of Things (IoT) receiver, and so on. The apparatus 300 may include one or more processors 302, one or more memories 304 and video processing hardware 306. The processor(s) 302 may be configured to implement one or more methods described in the present disclosure. The memory (memories) 304 may be used for storing data and code used for implementing the methods and embodiments described herein. The video processing hardware 306 may be used to implement, in hardware circuitry, some embodiments described in the present disclosure.

Figure 4:
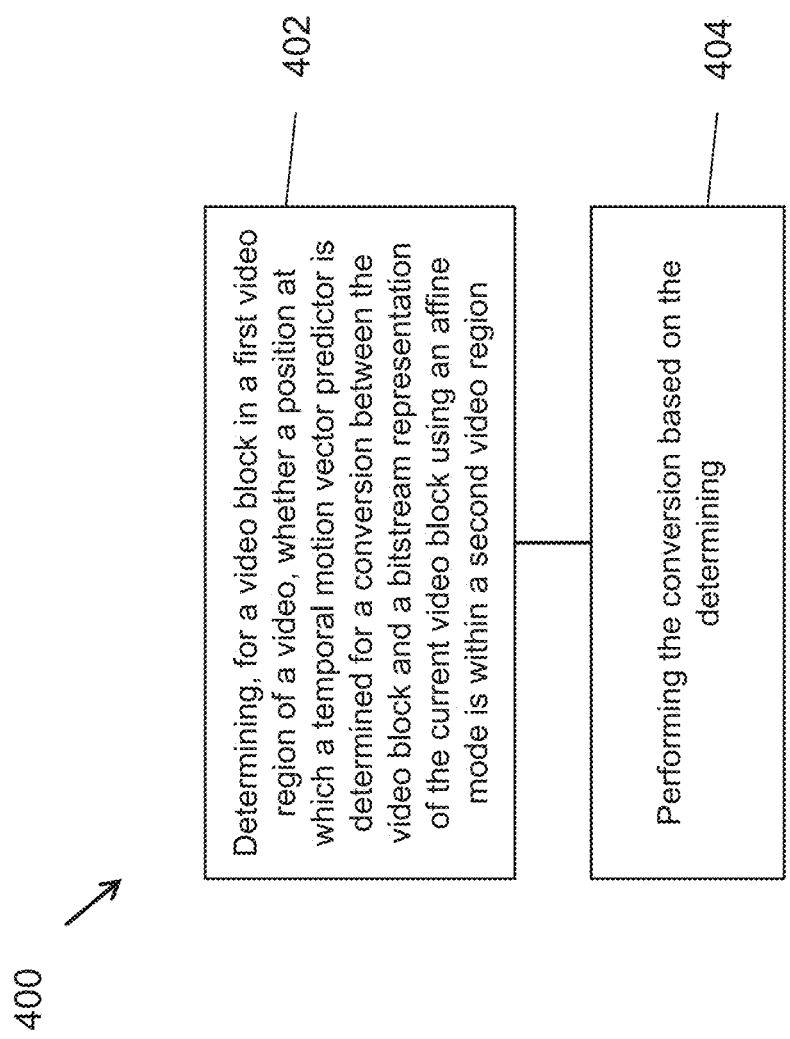
FIG. 4 is a flowchart for an example method of video processing.

FIG. 4 is a flowchart for a method 400 of processing a video. The method 400 includes determining (402), for a video block in a first video region of a video, whether a position at which a temporal motion vector predictor is determined for a conversion between the video block and a bitstream representation of the current video block using an affine mode is within a second video region, and performing (404) the conversion based on the determining.

The following solutions may be implemented as preferred solutions in some embodiments.

The following solutions may be implemented together with additional embodiments described in items listed in the previous section (e.g., item 1).

1. A method of video processing, comprising: determining, for a video block in a first video region of a video, whether a position at which a temporal motion vector predictor is determined for a conversion between the video block and a bitstream representation of the current video block using an affine mode is within a second video region; and performing the conversion based on the determining.

2. The method of solution 1, wherein the video block is covered by the first region and the second region.

3. The method of any of solutions 1-2, wherein, in case that the position of the temporal motion vector predictor is outside of the second video region, then the temporal motion vector predictor is marked as unavailable and is unused in the conversion.

The following solutions may be implemented together with additional embodiments described in items listed in the previous section (e.g., item 2).

4. A method of video processing, comprising: determining, for a video block in a first video region of a video, whether a position at which an integer sample in a reference picture is fetched for a conversion between the video block and a bitstream representation of the current video block is within a second video region, wherein the reference picture is not used in an interpolation process during the conversion; and performing the conversion based on the determining.

5. The method of solution 4, wherein the video block is covered by the first region and the second region.

6. The method of any of solutions 4-5, wherein, in case that the position of the sample is outside of the second video region, then the sample is marked as unavailable and is unused in the conversion.

The following solutions may be implemented together with additional embodiments described in items listed in the previous section (e.g., item 3).

7. A method of video processing, comprising: determining, for a video block in a first video region of a video, whether a position at which a reconstructed luma sample value is fetched for a conversion between the video block and a bitstream representation of the current video block is within a second video region; and performing the conversion based on the determining.

8. The method of solution 7, wherein the luma sample is covered by the first region and the second region.

9. The method of any of solutions 7-8, wherein, in case that the position of the luma sample is outside of the second video region, then the luma sample is marked as unavailable and is unused in the conversion.

The following solutions may be implemented together with additional embodiments described in items listed in the previous section (e.g., item 4).

10. A method of video processing, comprising: determining, for a video block in a first video region of a video, whether a position at which a check regarding splitting, depth derivation or split flag signalling for the video block is performed during a conversion between the video block and a bitstream representation of the current video block is within a second video region; and performing the conversion based on the determining.

11. The method of solution 10, wherein the position is covered by the first region and the second region.

12. The method of any of solutions 10-11, wherein, in case that the position is outside of the second video region, then the luma sample is marked as unavailable and is unused in the conversion.

The following solutions may be implemented together with additional embodiments described in items listed in the previous section (e.g., item 8).

13. A method of video processing, comprising: performing a conversion between a video comprising one or more video pictures comprising one or more video blocks, and a coded representation of the video, wherein the coded representation complies with a coding syntax requirement that the conversion is not to use sub-picture coding/decoding and a dynamic resolution conversion coding/decoding tool or a reference picture resampling tool within a video unit.

14. The method of solution 13, wherein the video unit corresponds to a sequence of the one or more video pictures.

15. The method of any of solutions 13-14, wherein the dynamic resolution conversion coding/decoding tool comprises an adaptive resolution conversion coding/decoding tool.

16. The method of any of solutions 13-14, wherein the dynamic resolution conversion coding/decoding tool comprises a dynamic resolution conversion coding/decoding tool.

17. The method of any of solutions 13-16, wherein the coded representation indicates that the video unit complies with the coding syntax requirement.

18. The method of solution 17, wherein the coded representation indicates that the video unit uses sub-picture coding.

19. The method of solution 17, wherein the coded representation indicates that the video unit uses the dynamic resolution conversion coding/decoding tool or the reference picture resampling tool.

The following solutions may be implemented together with additional embodiments described in items listed in the previous section (e.g., item 10).

20. The method of any of solutions 1-19, wherein the second video region comprises a video sub-picture and wherein boundaries of the second video region and another video region is also a boundary between two coding tree units.

21. The method of any of solutions 1-19, wherein the second video region comprises a video sub-picture and wherein boundaries of the second video region and another video region is also a boundary between two coding tree units.

The following solutions may be implemented together with additional embodiments described in items listed in the previous section (e.g., item 11).

22. The method of any of solutions 1-21, wherein the first video region and the second video region have rectangular shapes.

The following solutions may be implemented together with additional embodiments described in items listed in the previous section (e.g., item 12).

23. The method of any of solutions 1-22, wherein the first video region and the second video region are non-overlapping.

The following solutions may be implemented together with additional embodiments described in items listed in the previous section (e.g., item 13).

24. The method of any of solutions 1-23, wherein the video picture is divided into video regions such that a pixel in the video picture is covered by one and only one video region.

The following solutions may be implemented together with additional embodiments described in items listed in the previous section (e.g., item 15).

25. The method of any of solutions 1-24, wherein the video picture is split into the first video region and the second video region due to the video picture being in a specific layer of the video sequence.

The following solutions may be implemented together with additional embodiments described in items listed in the previous section (e.g., item 10).

26. A method of video processing, comprising: performing a conversion between a video comprising one or more video pictures comprising one or more video blocks, and a coded representation of the video, wherein the coded representation complies with a coding syntax requirement that a first syntax element subpic_grid_idx[i][j] is not larger than a second syntax element max_subpics_minus1.

27. The method of solution 26, wherein a codeword representing the first syntax element is not larger than a codeword representing the second syntax element.

28. The method of any of solutions 1-27, wherein the first video region comprises a video sub-picture.

29. The method of any of solutions 1-28, wherein the second video region comprises a video sub-picture.

30. The method of any of solutions 1 to 29, wherein the conversion comprises encoding the video into the coded representation.

31. The method of any of solutions 1 to 29, wherein the conversion comprises decoding the coded representation to generate pixel values of the video.

32. A video decoding apparatus comprising a processor configured to implement a method recited in one or more of solutions 1 to 31.

33. A video encoding apparatus comprising a processor configured to implement a method recited in one or more of solutions 1 to 31.

34. A computer program product having computer code stored thereon, the code, when executed by a processor, causes the processor to implement a method recited in any of solutions 1 to 31.

35. A method, apparatus or system described in the present disclosure.

Figure 8:
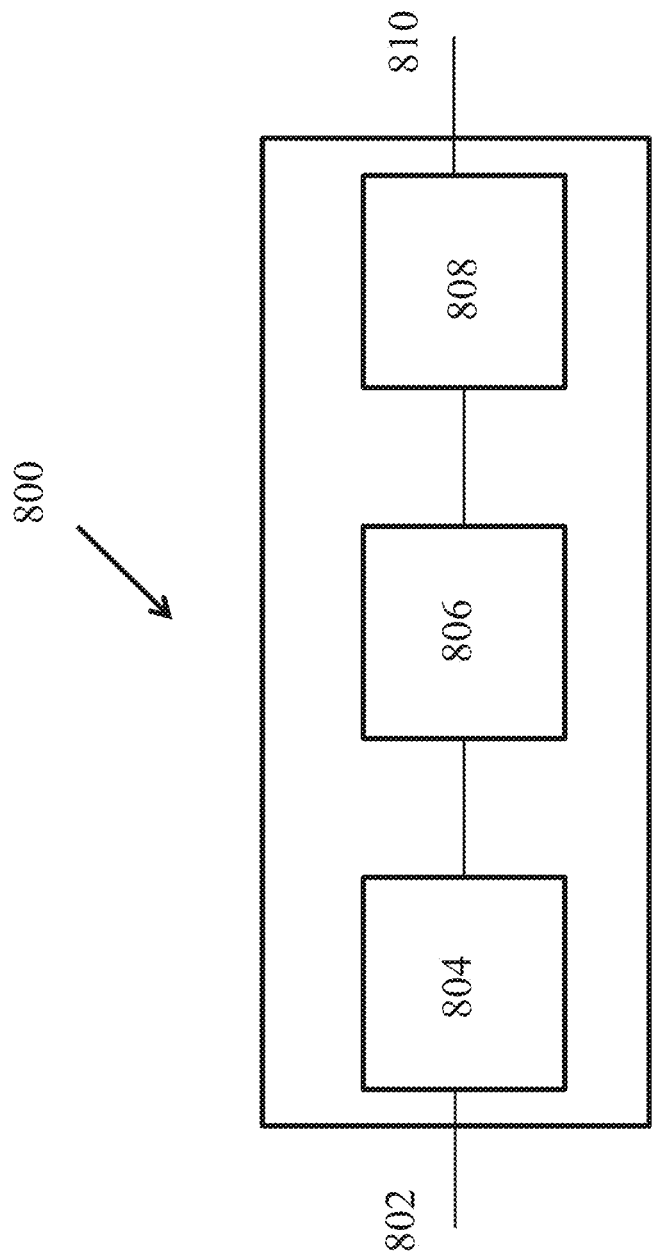
FIG. 8 is a block diagram showing an example video processing system in which various embodiments disclosed herein may be implemented.

FIG. 8 is a block diagram showing an example video processing system 800 in which various embodiments disclosed herein may be implemented. Various implementations may include some or all of the components of the system 800. The system 800 may include input 802 for receiving video content. The video content may be received in a raw or uncompressed format, e.g., 8- or 10-bit multi-component pixel values, or may be in a compressed or encoded format. The input 802 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 800 may include a coding component 804 that may implement the various coding or encoding methods described in the present disclosure. The coding component 804 may reduce the average bitrate of video from the input 802 to the output of the coding component 804 to produce a coded representation of the video. The coding techniques are therefore sometimes called video compression or video transcoding techniques. The output of the coding component 804 may be either stored, or transmitted via a communication connected, as represented by the component 806. The stored or communicated bitstream (or coded) representation of the video received at the input 802 may be used by the component 808 for generating pixel values or displayable video that is sent to a display interface 810. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or DisplayPort, and so on. Examples of storage interfaces include serial advanced technology attachment (SATA), peripheral component interface (PCI), integrated drive electronics (IDE) interface, and the like. The embodiments described in the present disclosure may be embodied in various electronic devices such as mobile phones, laptops, smartphones or other devices that are capable of performing digital data processing and/or video display.

Figure 9:
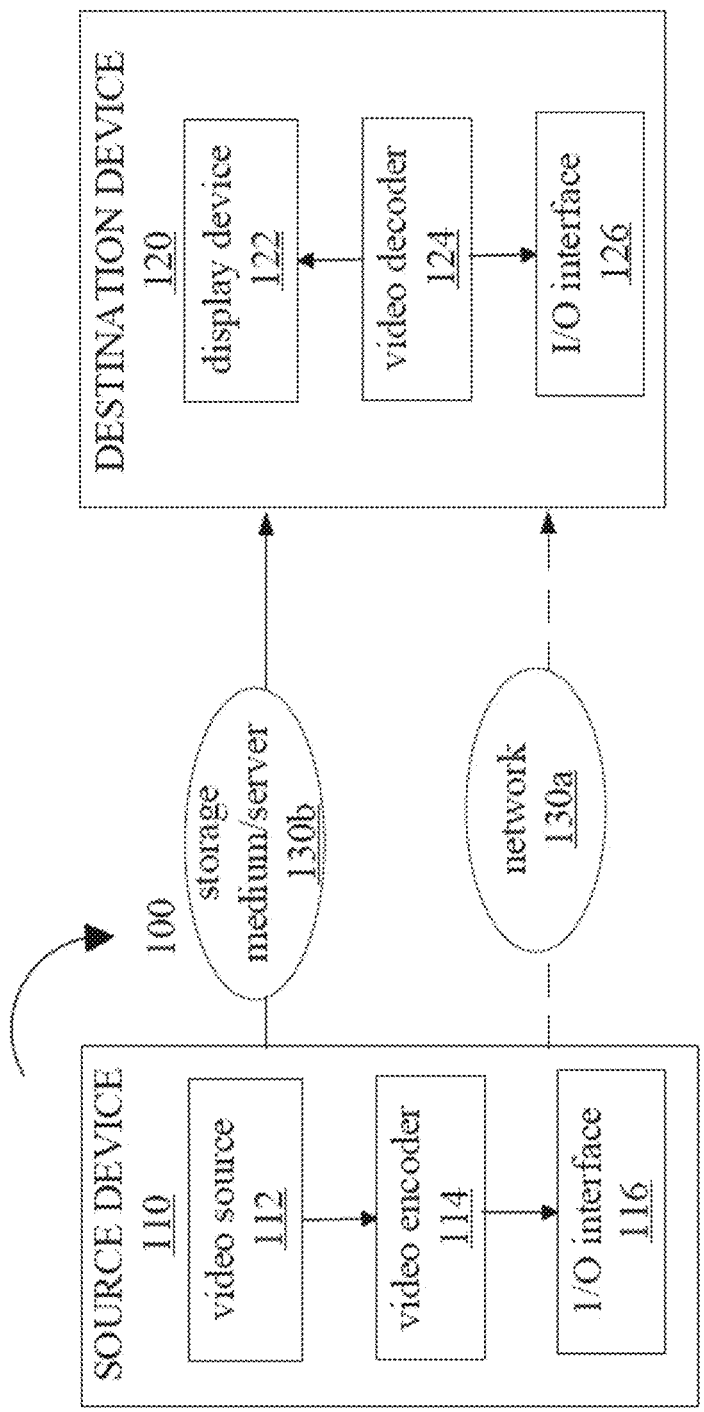
FIG. 9 is a block diagram that illustrates an example video coding system.

FIG. 9 is a block diagram that illustrates an example video coding system 100 that may utilize the embodiments of this disclosure.

As shown in FIG. 9, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 10:
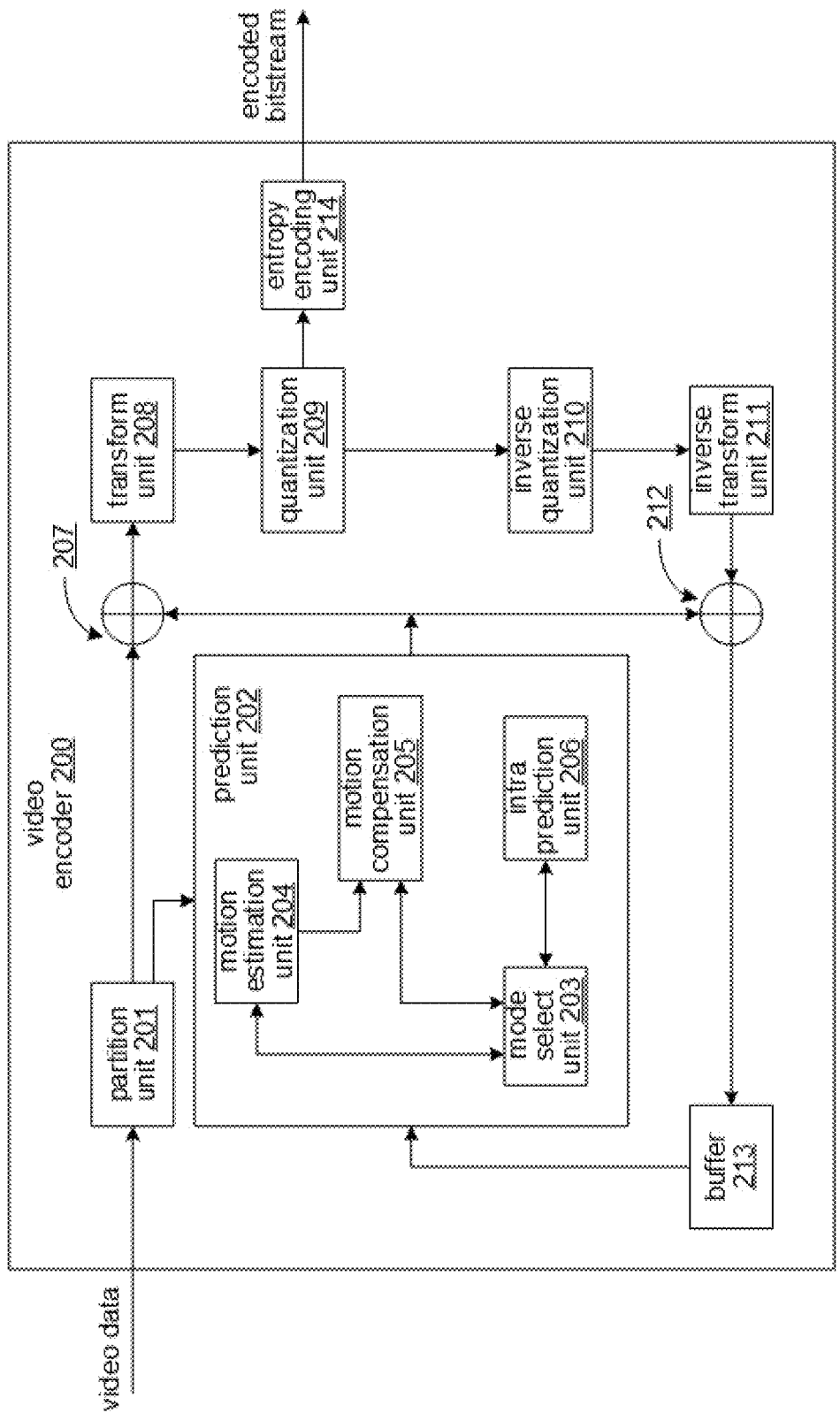
FIG. 10 is a block diagram that illustrates an encoder in accordance with some embodiments of the present disclosure.

FIG. 10 is a block diagram illustrating an example of video encoder 200, which may be video encoder 114 in the system 100 illustrated in FIG. 9.

Video encoder 200 may be configured to perform any or all of the embodiments of this disclosure. In the example of FIG. 10, video encoder 200 includes a plurality of functional components. The embodiments described in this disclosure may be shared among the various components of video encoder 200. In some examples, a processor may be configured to perform any or all of the embodiments described in this disclosure.

The functional components of video encoder 200 may include a partition unit 201, a prediction unit 202 which may include a mode select unit 203, a motion estimation unit 204, a motion compensation unit 205, and an intra prediction unit 206; a residual generation unit 207; a transform unit 208; a quantization unit 209; an inverse quantization unit 210; an inverse transform unit 211; a reconstruction unit 212; a buffer 213; and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 10 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some examples, mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signalling techniques that may be implemented by video encoder 200 include advanced motion vector prediction (AMVP) and merge mode signalling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 11:
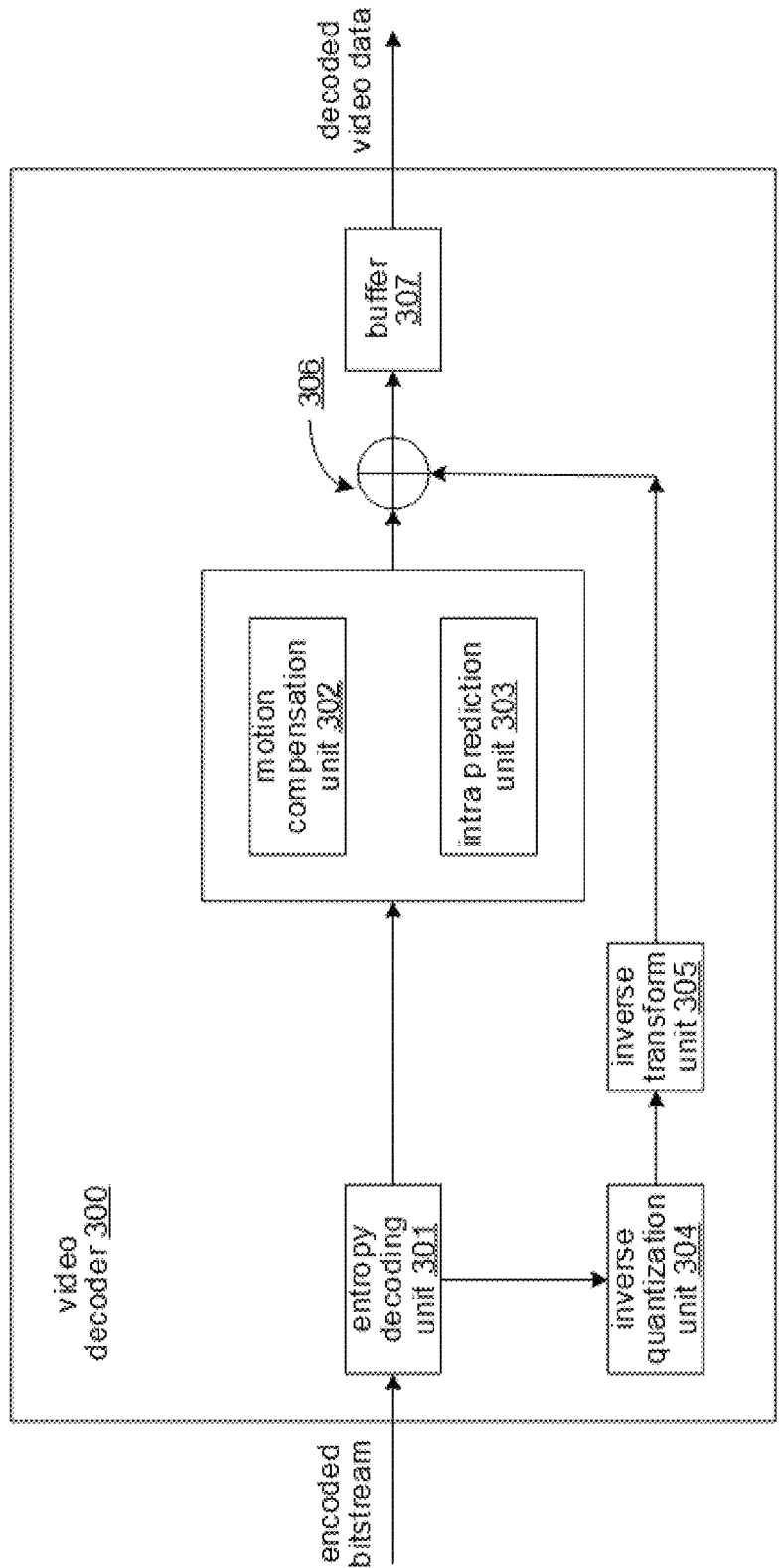
FIG. 11 is a block diagram that illustrates a decoder in accordance with some embodiments of the present disclosure.

FIG. 11 is a block diagram illustrating an example of video decoder 300 which may be video decoder 124 in the system 100 illustrated in FIG. 9.

The video decoder 300 may be configured to perform any or all of the embodiments of this disclosure. In the example of FIG. 11, the video decoder 300 includes a plurality of functional components. The embodiments described in this disclosure may be shared among the various components of the video decoder 300. In some examples, a processor may be configured to perform any or all of the embodiments described in this disclosure.

In the example of FIG. 11, video decoder 300 includes an entropy decoding unit 301, a motion compensation unit 302, an intra prediction unit 303, an inverse quantization unit 304, an inverse transformation unit 305, a reconstruction unit 306, and a buffer 307. Video decoder 300 may, in some examples, perform a decoding pass generally reciprocal to the encoding pass described with respect to video encoder 200 (e.g., FIG. 10).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transformation unit 305 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

Figure 12:
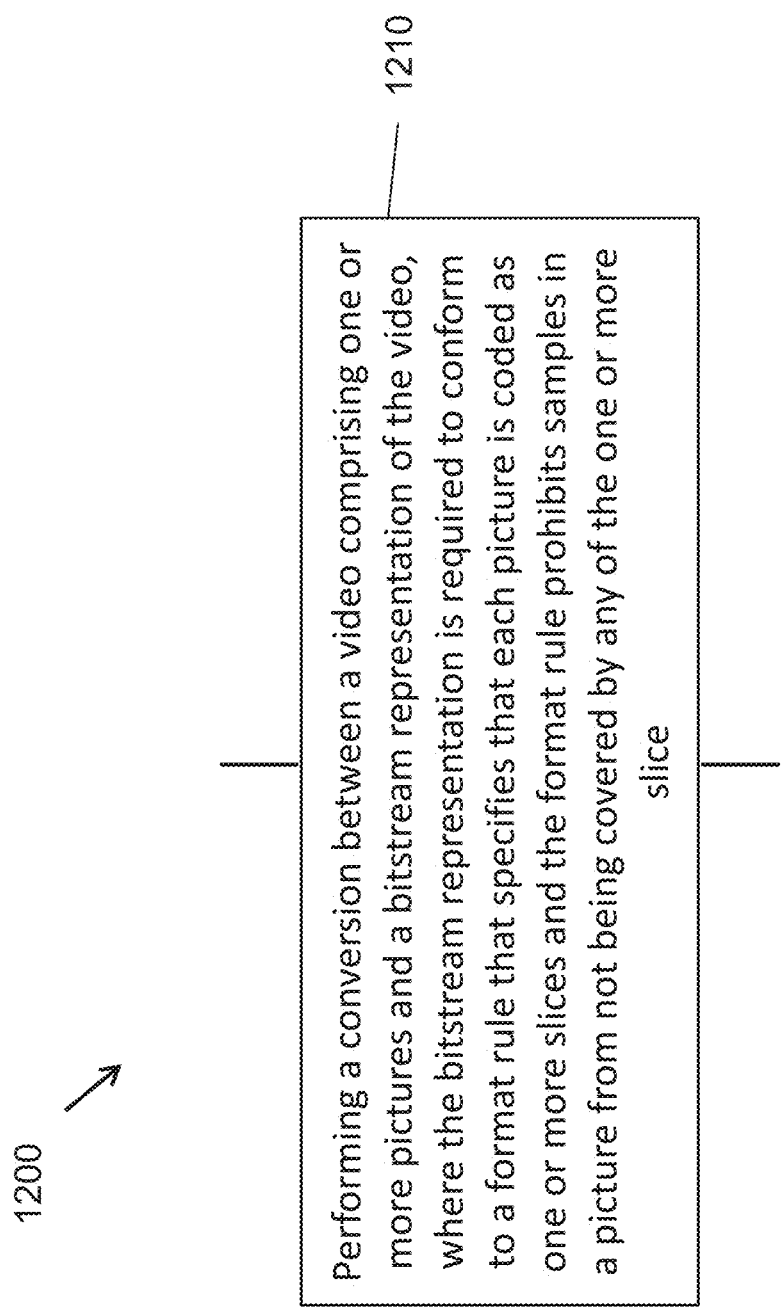
FIG. 12 is a flowchart representation of a method for video processing in accordance with the present disclosure.

FIG. 12 is a flowchart representation of a method for video processing in accordance with the present disclosure. The method 1200 includes, at operation 1210, performing a conversion between a video comprising one or more pictures and a bitstream representation of the video. The bitstream representation is required to conform to a format rule that specifies that each picture is coded as one or more slices. The format rule prohibits samples in a picture from not being covered by any of the one or more slices.

In some embodiments, the picture comprises multiple sub-pictures, and the format rule further specifies that multiple slices of a sub-picture of the picture cover an entirety of the sub-picture. In some embodiments, the bitstream representation includes a syntax element indicating that multiple slices have a rectangular shape. In some embodiments, a slice overlaps with at most one sub-picture of the picture. In some embodiments, a tile of the video overlaps with at most one sub-picture of the picture. In some embodiments, a brick of the video overlaps with at most one sub-picture of the picture.

Figure 13:
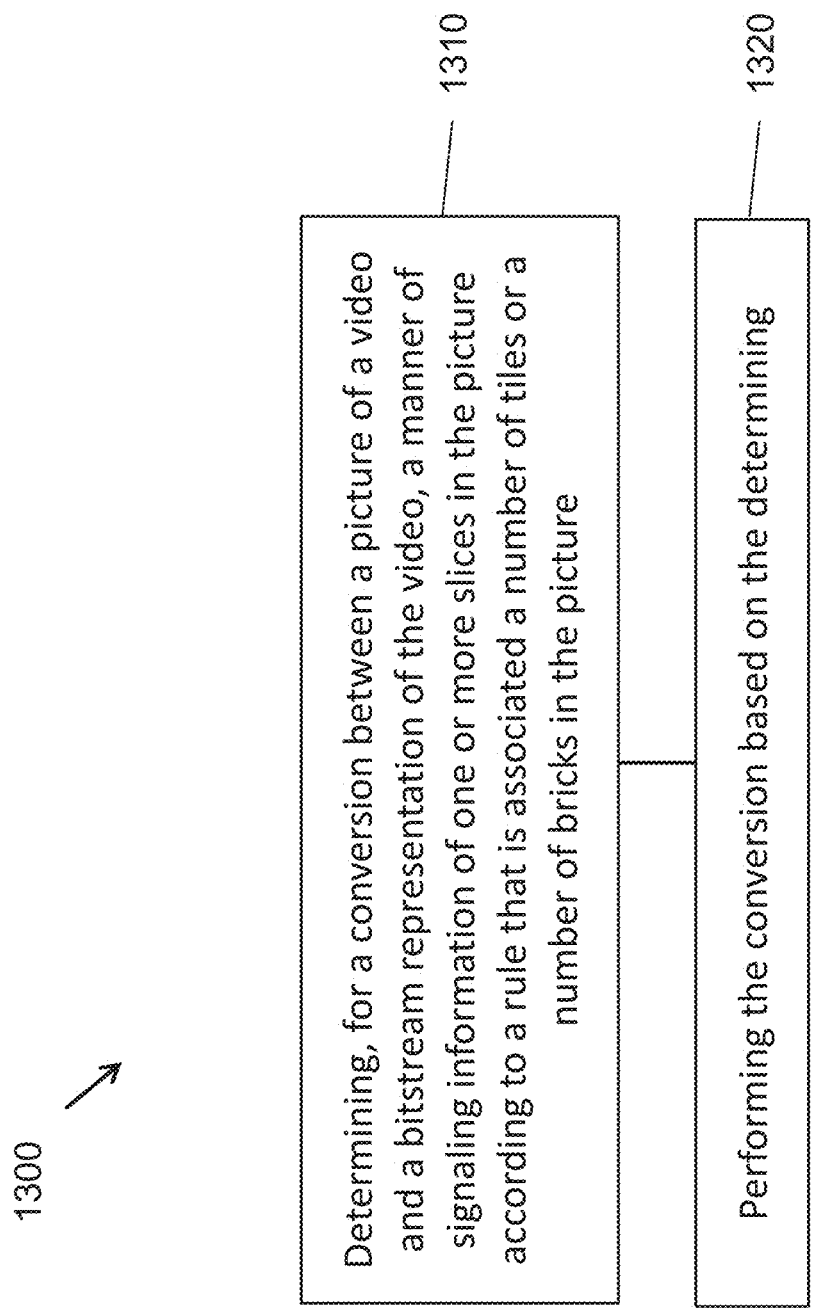
FIG. 13 is a flowchart representation of another method for video processing in accordance with the present disclosure.

FIG. 13 is a flowchart representation of a method for video processing in accordance with the present disclosure. The method 1300 includes, at operation 1310, determining, for a conversion between a picture of a video and a bitstream representation of the video, a manner of signalling information of one or more slices in the picture according to a rule that is associated a number of tiles or a number of bricks in the picture. The method 1300 includes, at operation 1320, performing the conversion based on the determining.

In some embodiments, the information of the one or more slices of the picture comprises at least a number of the one or more slices or a range of the one or more slices. In some embodiments, the rule specifies that, in case the number of bricks in the picture is 1, the information of the one or more slices in the picture is excluded in the bitstream representation. In some embodiments, the number of the one or more slices in the picture is deemed to be 1. In some embodiments, the slice covers an entirety of the picture. In some embodiments, a number of bricks per slice is deemed to be 1.

Figure 14:
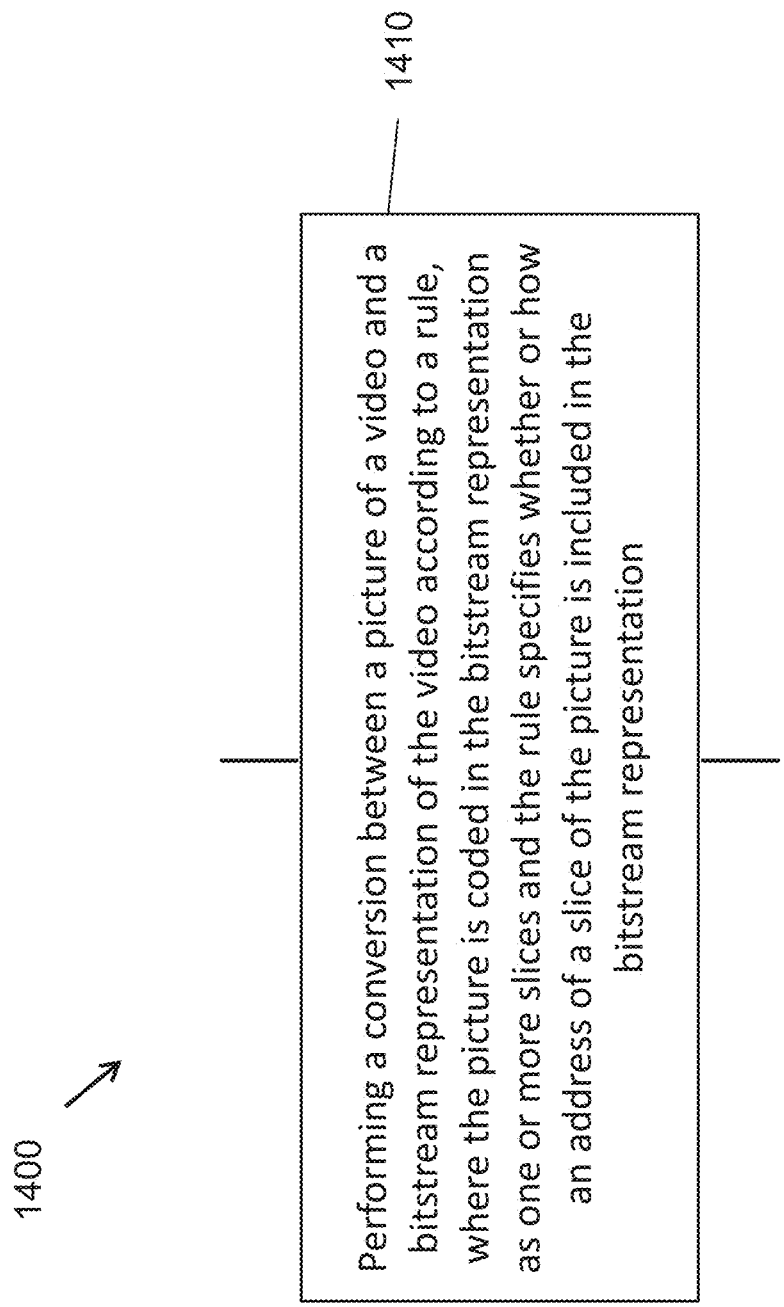
FIG. 14 is a flowchart representation of another method for video processing in accordance with the present disclosure.

FIG. 14 is a flowchart representation of a method for video processing in accordance with the present disclosure. The method 1400 includes, at operation 1410, performing a conversion between a picture of a video and a bitstream representation of the video according to a rule. The picture is coded in the bitstream representation as one or more slices. The rule specifies whether or how an address of a slice of the picture is included in the bitstream representation.

In some embodiments, the rule specifies that signalling of the address of the slice is independent from signalling of whether the slice has a rectangular shape. In some embodiments, the rule specifies that signalling of the address of the slice is dependent on a number of slices in the picture in case the slice as a rectangular shape. In some embodiments, whether to signal a number of bricks in the slice is at least in part based on the address of the slice. In some embodiments, whether to signal the number of bricks in the slice is further based on a number of bricks in the picture.

Figure 15:
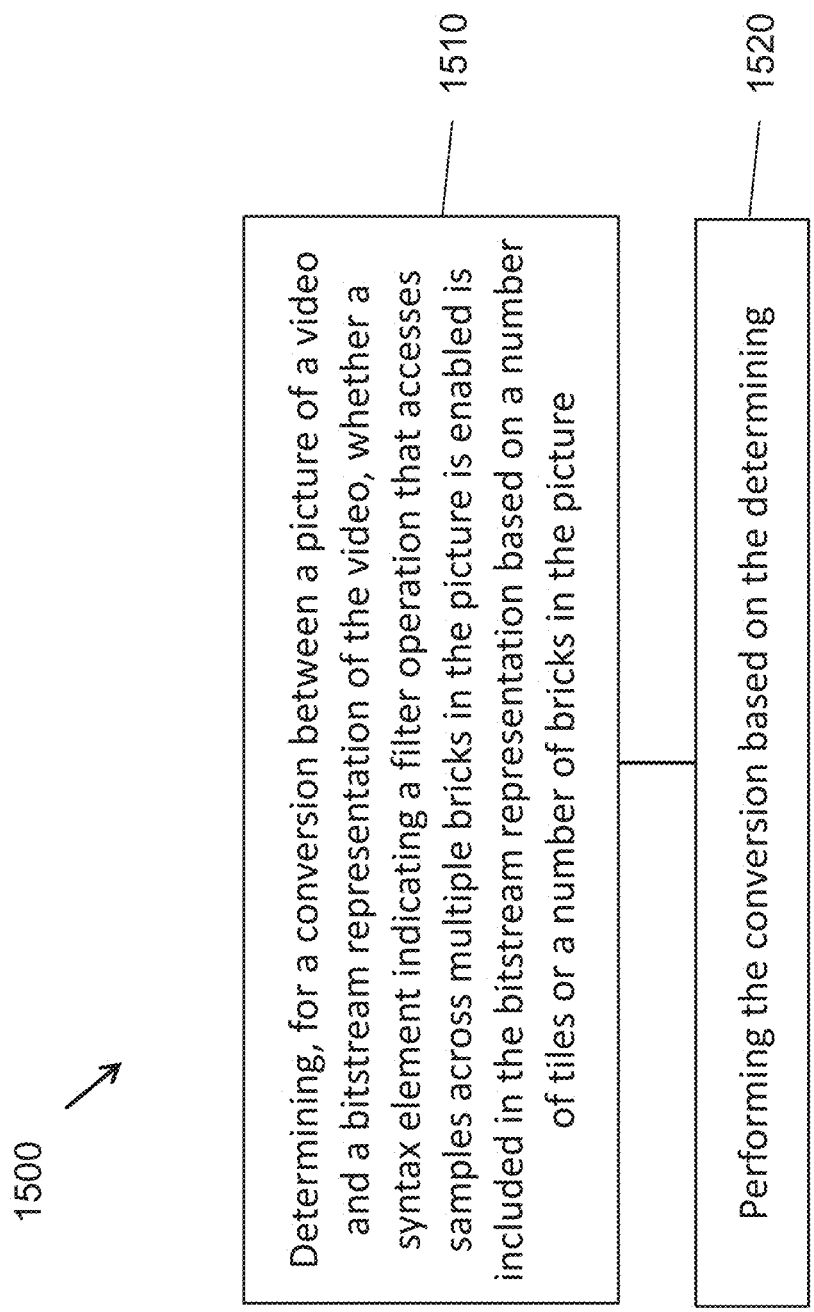
FIG. 15 is a flowchart representation of another method for video processing in accordance with the present disclosure.

FIG. 15 is a flowchart representation of a method for video processing in accordance with the present disclosure. The method 1500 includes, at operation 1510, determining, for a conversion between a picture of a video and a bitstream representation of the video, whether a syntax element indicating a filter operation that accesses samples across multiple bricks in the picture is enabled is included in the bitstream representation based on a number of tiles or a number of bricks in the picture. The method 1500 includes, at operation 1520, performing the conversion based on the determining. In some embodiments, the syntax element is excluded in the bitstream representation in case the number of bricks in the picture is less than 2.

Figure 16:
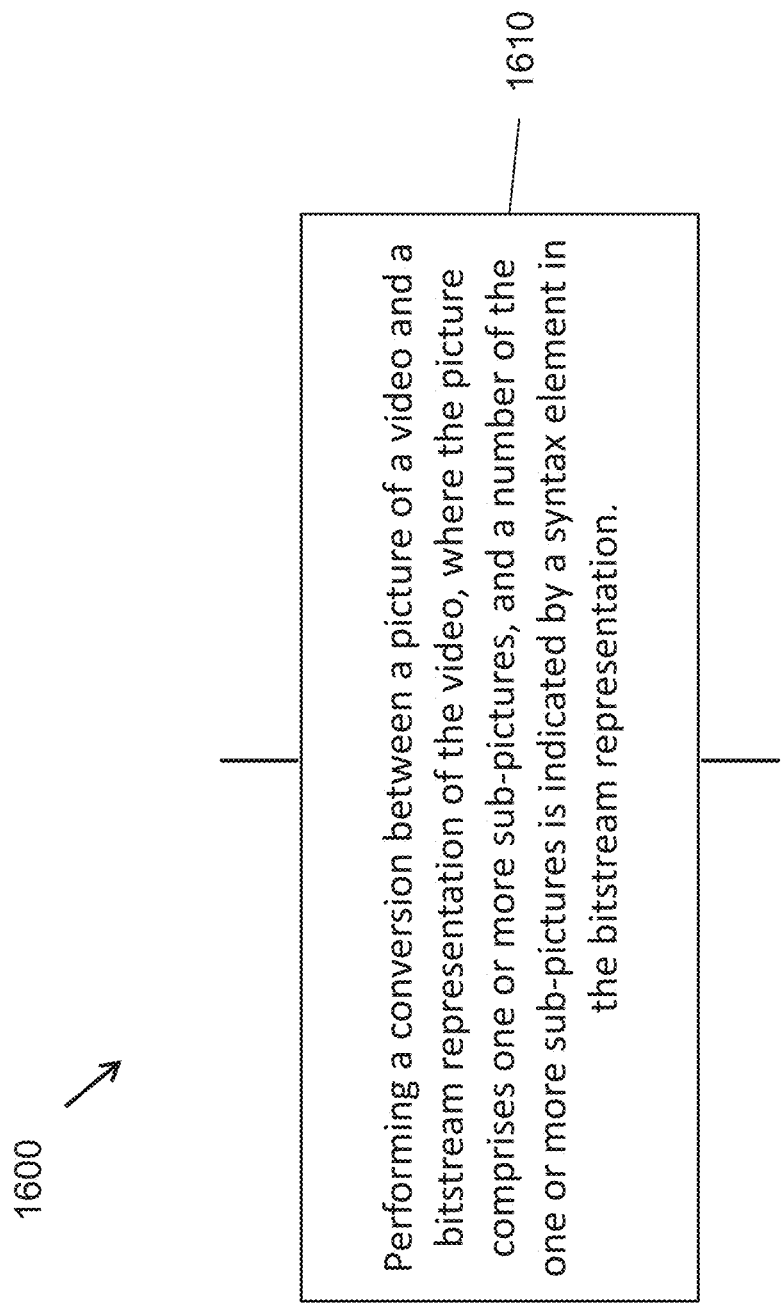
FIG. 16 is a flowchart representation of another method for video processing in accordance with the present disclosure.

FIG. 16 is a flowchart representation of a method for video processing in accordance with the present disclosure. The method 1600 includes, at operation 1610, performing a conversion between a picture of a video and a bitstream representation of the video. The picture comprises one or more sub-pictures, and a number of the one or more sub-pictures is indicated by a syntax element in the bitstream representation.

In some embodiments, the number of the multiple sub-pictures is represented as N, and the syntax element includes a value of (N-d), N and d being integers. In some embodiments, d is 0, 1, or 2. In some embodiments, the value of (N-d) is coded using a unary coding scheme or a truncated unary coding scheme. In some embodiments, the value of (N-d) is coded to have a fixed length using a fixed length coding scheme. In some embodiments, the fixed length is 8 bits. In some embodiments, the fixed length is represented as x-dx, x and dx being positive integers. x is equal to or smaller than a maximum value determined based on a conformance rule, and dx is 0, 1, or 2. In some embodiments, x-dx is signalled. In some embodiments, the fixed length is determined based on a number of basic unit blocks in the picture. In some embodiments, the fixed length is represented as x, the number of basic unit blocks is represented as M, and x=Ceil(log 2(M+d0))+d1, d0 and d1 being integers.

In some embodiments, a maximum value of (N-d) is predetermined. In some embodiments, a maximum value of (N-d) is determined based on a number of basic unit blocks in the picture. In some embodiments, the number of basic unit blocks in the picture is represented as M, M being an integer, and the maximum value of N-d is M-d. In some embodiments, a basic unit block comprises a slice. In some embodiments, a basic unit block comprises a coding tree unit. In some embodiments, at least one of d0 or d1 is −2, −1, 0, 1, or 2.

Figure 17:
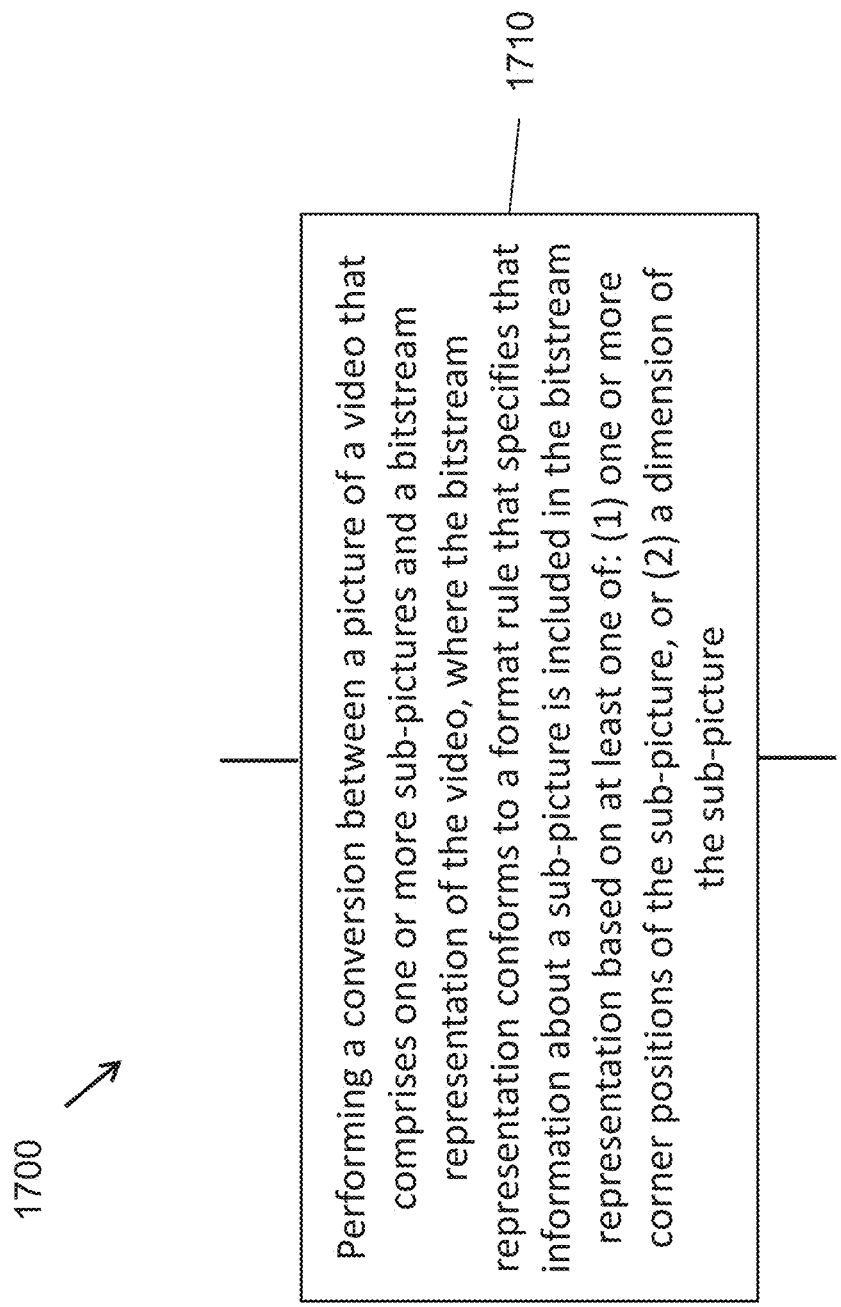
FIG. 17 is a flowchart representation of another method for video processing in accordance with the present disclosure.

FIG. 17 is a flowchart representation of a method for video processing in accordance with the present disclosure. The method 1700 includes, at operation 1710, performing a conversion between a picture of a video that comprises one or more sub-pictures and a bitstream representation of the video. The bitstream representation conforms to a format rule that specifies that information about a sub-picture is included in the bitstream representation based on at least one of: (1) one or more corner positions of the sub-picture, or (2) a dimension of the sub-picture.

In some embodiments, the format rule further specifies that the information about the sub-picture is positioned after information about a size of a coding tree block in the bitstream representation. In some embodiments, the one or more corner positions of the sub-picture are signalled in the bitstream representation using a granularity of a block in the sub-picture. In some embodiments, the block comprises a basic unit block or a coding tree block.

In some embodiments, an index of a block is used to indicate a corner position of the sub-picture. In some embodiments, the index comprises a column index or a row index. In some embodiments, the index of the block is represented as I, and a value of (I-d) is signalled in the bitstream representation, d being 0, 1, or 2. In some embodiments, d is determined based on an index of previously coded sub-picture and another integer d1, d1 being equal to −1, 0, or 1. In some embodiments, a sign of (I-d) is signalled in the bitstream representation.

In some embodiments, whether a position of the sub-picture is signalled in the bitstream representation is based on an index of the sub-picture. In some embodiments, the position of the sub-picture is omitted in the bitstream representation in case the sub-picture is a first sub-picture in the picture. In some embodiments, a top-left position of the sub-picture is determined to be (0, 0). In some embodiments, the position of the sub-picture is omitted in the bitstream representation in case the sub-picture is a last sub-picture in the picture. In some embodiments, a top-left position of the sub-picture is determined based on information about a sub-picture previously converted. In some embodiments, the information about the sub-picture comprises a top-left position and a dimension of the sub-picture. The information is coded using a truncated unary coding scheme, a truncated binary coding scheme, a unary coding scheme, a fixed length coding scheme, or a K-th EG coding scheme.

In some embodiments, a dimension of the sub-picture is signalled in the bitstream representation using a granularity of a block in the sub-picture. In some embodiments, the dimension comprises a width or a height of the sub-picture. In some embodiments, the dimension is represented as a number of columns or a number of rows of blocks in the sub-picture. In some embodiments, the number of columns or the number of rows of blocks is represented as I, and a value of (I-d) is signalled in the bitstream representation, d being 0, 1, or 2. In some embodiments, d is determined based on a dimension of a block of a previously coded sub-picture and another integer d1, d1 being equal to −1, 0, or 1. In some embodiments, a sign of (I-d) is signalled in the bitstream representation.

In some embodiments, the value of (I-d) is coded to have a fixed length using a fixed length coding scheme. In some embodiments, the fixed length is 8 bits. In some embodiments, the fixed length is represented as x-dx, x and dx being positive integers. x is equal to or smaller than a maximum value determined based on a conformance rule, and dx is 0, 1, or 2. In some embodiments, the fixed length is determined based on a number of basic unit blocks in the picture. In some embodiments, the fixed length is represented as x, the number of basic unit blocks is represented as M, and x=Ceil(log 2(M+d0))+d1, d0 and d1 being integers. In some embodiments, at least one of d0 or d1 is −2, −1, 0, 1, or 2. In some embodiments, (I-d) is signalled for all sub-pictures of the picture. In some embodiments, (I-d) is signalled for a subset of sub-pictures of the picture. In some embodiments, the value of (I-d) is omitted in the bitstream representation in case a number of sub-pictures is equal to 1. In some embodiments, the value of (I-d) is omitted in the bitstream representation in case the sub-picture is a first sub-picture of the picture. In some embodiments, the value of (I-d) is determined to be 0. In some embodiments, the value of (I-d) is omitted in the bitstream representation in case the sub-picture is a last sub-picture of the picture. In some embodiments, the value of (I-d) is determined based on information about a sub-picture previously converted.

In some embodiments, a single syntax element is conditionally included in the bitstream representation to indicate whether all sub-pictures of the picture are processed as a picture. In some embodiments, a single syntax element is conditionally included in the bitstream representation to indicate whether a loop filter is applicable across sub-pictures of the picture for all sub-pictures. In some embodiments, the single syntax element is omitted in the bitstream representation in case a number of sub-pictures of the picture is equal to 1.

Figure 18:
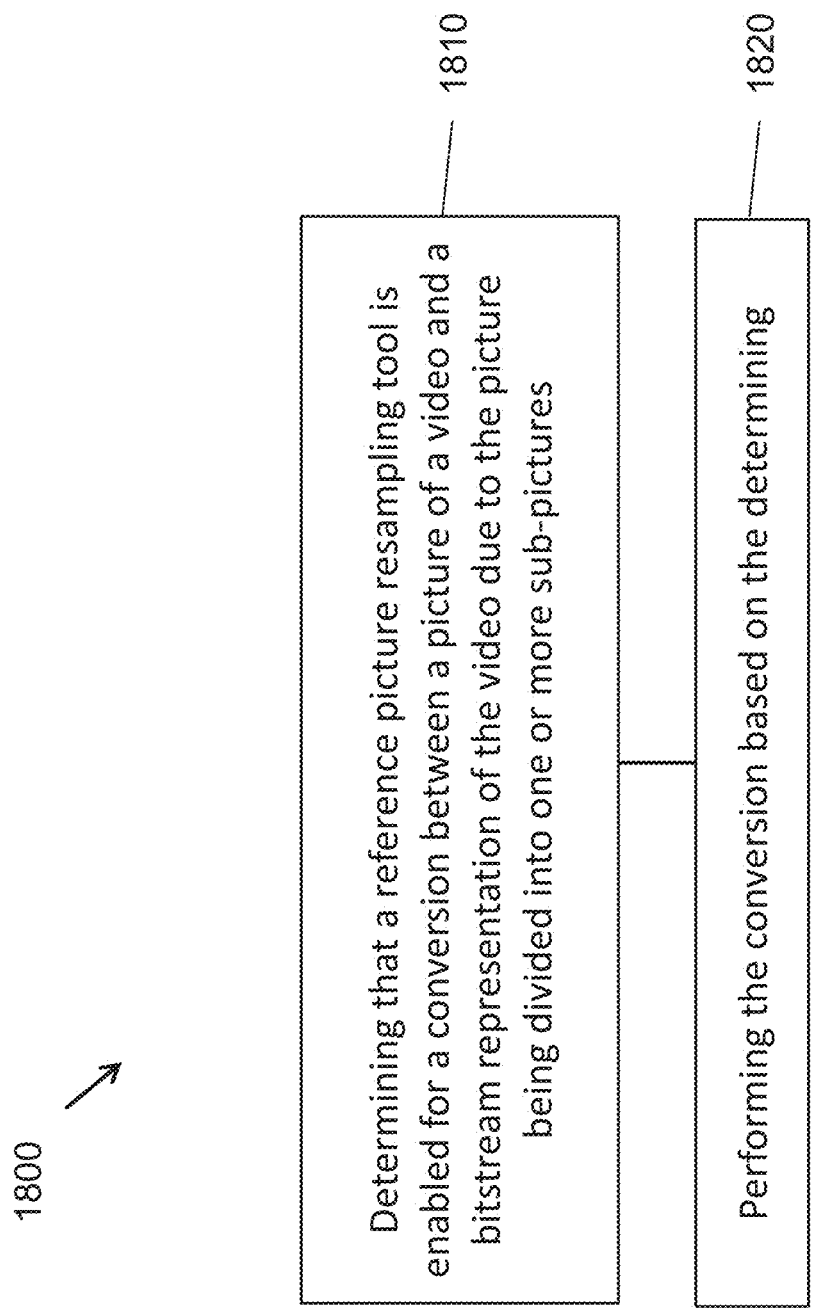
FIG. 18 is a flowchart representation of another method for video processing in accordance with the present disclosure.

FIG. 18 is a flowchart representation of a method for video processing in accordance with the present disclosure. The method 1800 includes, at operation 1810, determining that a reference picture resampling tool is enabled for a conversion between a picture of a video and a bitstream representation of the video due to the picture being divided into one or more sub-pictures. The method 1800 also includes, at operation 1820, performing the conversion based on the determining.

In some embodiments, a scaling ratio used in the reference picture resampling coding tool is determined based on a set of ratios. In some embodiments, the set of ratios comprises at least one of: {1:1, 1:2}, {1:1, 2:1}, {1:1, 1:2, 1:4}, {1:1, 1:2, 4:1}, {1:1, 2:1, 1:4}, {1:1, 2:1, 4:1}, {1:1, 1:2, 1:4, 1:8}, {1:1, 1:2, 1:4, 8:1}, {1:1, 1:2, 4:1, 1:8}, {1:1, 1:2, 4:1, 8:1}, {1:1, 2:1, 1:4, 1:8}, {1:1, 2:1, 1:4, 8:1}, {1:1, 2:1, 4:1, 1:8}, or {1:1, 2:1, 4:1, 8:1}. In some embodiments, a size of a coding tree block of the picture is different than a size of a coding tree block of a second picture in case a resolution of the picture is different than a resolution of the second picture. In some embodiments, a sub-picture of the picture has a dimension of SAW×SAH and a sub-picture of a second picture of the video has a dimension of SBW×SBH. Scaling ratios between the picture and the second picture are Rw and Rh along a horizontal direction and a vertical direction. SAW/SBW or SBW/SAW is equal to Rw, and SAH/SBH or SBH/SAH is equal to Rh.

Figure 19:
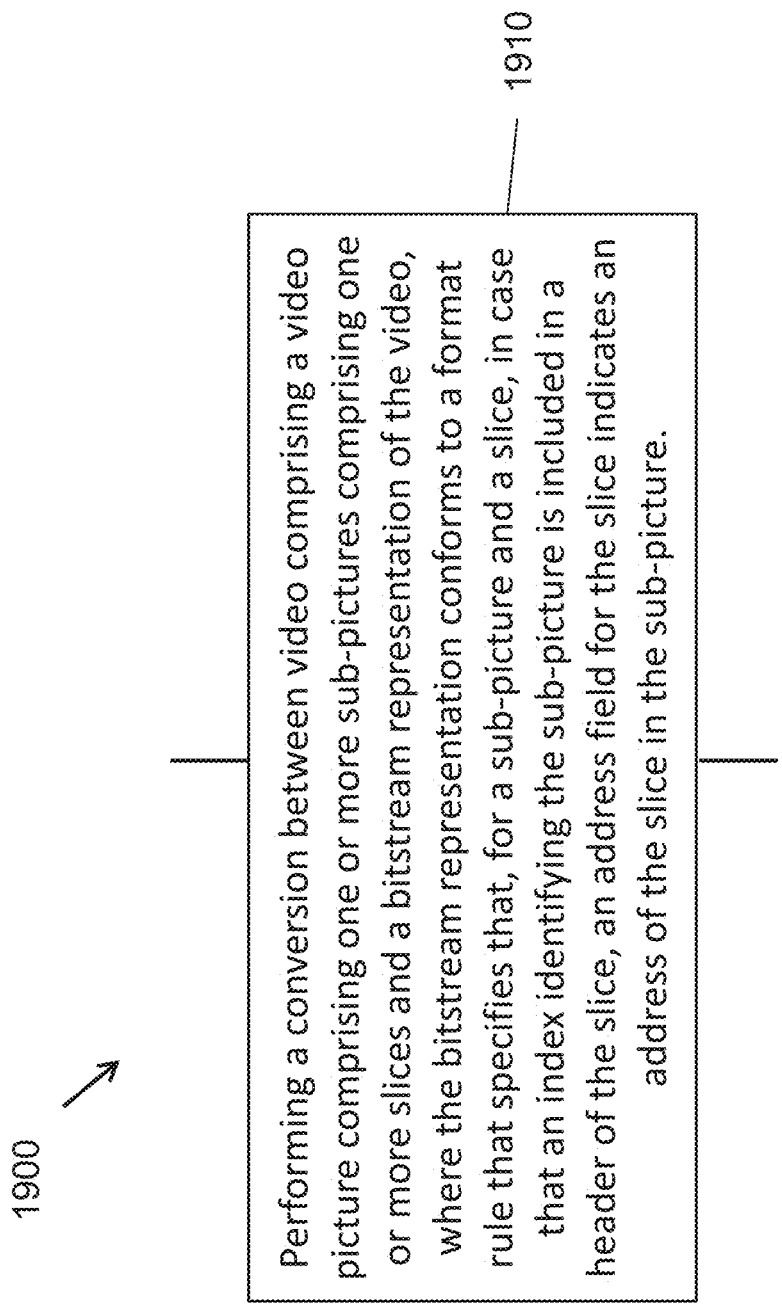
FIG. 19 is a flowchart representation of yet another method for video processing in accordance with the present disclosure.

FIG. 19 is a flowchart representation of a method for video processing in accordance with the present disclosure.

The method 1900 includes, at operation 1910, performing a conversion between video comprising a video picture comprising one or more sub-pictures comprising one or more slices and a bitstream representation of the video. The bitstream representation conforms to a format rule that specifies that, for a sub-picture and a slice, in case that an index identifying the sub-picture is included in a header of the slice, an address field for the slice indicates an address of the slice in the sub-picture.

In some embodiments, the conversion generates the video from the bitstream representation. In some embodiments, the conversion generates the bitstream representation from the video.

Some embodiments of the disclosed embodiments include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed embodiments include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field-programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electronically erasable programmable read-only memory (EEPROM), and flash memory devices; magnetic disks, e.g., internal hard disks or removable disks; magneto optical disks; and compact disc, read-only memory (CD-ROM) and digital versatile disc, read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of the present disclosure. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method of video processing, comprising:
   partitioning, for a conversion between a current video block of a picture of a video and a bitstream of the video, the picture into one or more slices and into one or more sub-pictures according to a requirement of bitstream conformance; and
   performing the conversion at least based on the partitioning,
   wherein the requirement of bitstream conformance specifies that a union of the one or more slices covers a whole picture, and a tile of the picture overlaps with at most one sub-picture of the picture; and
   wherein a first syntax element is included in the bitstream to indicate whether the one or more slices have a rectangular shape.

2. The method of claim 1,
   wherein the requirement of bitstream conformance further specifies that a union of the one or more sub-pictures that result from the partitioning of the picture covers the whole picture.

3. The method of claim 2, wherein a sub-picture of the one or more sub-pictures is partitioned into one or more slices, and
   wherein the requirement of bitstream conformance further specifies that a union of the one or more slices that result from the partitioning of the sub-picture covers a whole sub-picture.

4. The method of claim 2, wherein a slice of the picture overlaps with at most one sub-picture of the picture.

5. The method of claim 1, wherein the conversion includes encoding the current video block into the bitstream.

6. The method of claim 1, wherein the conversion includes decoding the current video block from the bitstream.

7. An apparatus for processing video data comprising a processor and a non-transitory memory with instructions thereon, wherein the instructions upon execution by the processor, cause the processor to:
   partition, for a conversion between a current video block of a picture of a video and a bitstream of the video, the picture into one or more slices and into one or more sub-pictures according to a requirement of bitstream conformance; and
   perform the conversion at least based on the partitioning,
   wherein the requirement of bitstream conformance specifies that a union of the one or more slices covers a whole picture, and a tile of the picture overlaps with at most one sub-picture of the picture; and
   wherein a first syntax element is included in the bitstream to indicate whether the one or more slices have a rectangular shape.

8. The apparatus of claim 7,
   wherein the requirement of bitstream conformance further specifies that a union of the one or more sub-pictures that result from the partitioning of the picture covers the whole picture.

9. The apparatus of claim 8, wherein a sub-picture of the one or more sub-pictures is partitioned into one or more slices, and
   wherein the requirement of bitstream conformance further specifies that a union of the one or more slices that result from the partitioning of the sub-picture covers a whole sub-picture.

10. The apparatus of claim 8, wherein a slice of the picture overlaps with at most one sub-picture of the picture.

11. A non-transitory computer-readable storage medium storing instructions that cause a processor to:
    partition, for a conversion between a current video block of a picture of a video and a bitstream of the video, the picture into one or more slices and into one or more sub-pictures according to a requirement of bitstream conformance; and
    perform the conversion at least based on the partitioning,
    wherein the requirement of bitstream conformance specifies that a union of the one or more slices covers a whole picture, and a tile of the picture overlaps with at most one sub-picture of the picture; and
    wherein a first syntax element is included in the bitstream to indicate whether the one or more slices have a rectangular shape.

12. The non-transitory computer-readable storage medium of claim 11,
    wherein the requirement of bitstream conformance further specifies that a union of the one or more sub-pictures that result from the partitioning of the picture covers the whole picture.

13. The non-transitory computer-readable storage medium of claim 12, wherein a sub-picture of the one or more sub-pictures is partitioned into one or more slices, and
    wherein the requirement of bitstream conformance further specifies that a union of the one or more slices that result from the partitioning of the sub-picture covers a whole sub-picture.

14. The non-transitory computer-readable storage medium of claim 12, wherein a slice of the picture overlaps with at most one sub-picture of the picture.

15. A non-transitory computer-readable recording medium storing a bitstream of a video which is generated by a method performed by a video processing apparatus, wherein the method comprises:
    partitioning, for a current video block of a picture of a video, the picture into one or more slices and into one or more sub-pictures according to a requirement of bitstream conformance; and
    generating the bitstream at least based on the partitioning, and
    wherein the requirement of bitstream conformance specifies that a union of the one or more slices covers a whole picture, and a tile of the picture overlaps with at most one sub-picture of the picture; and
    wherein a first syntax element is included in the bitstream to indicate whether the one or more slices have a rectangular shape.

16. The non-transitory computer-readable recording medium of claim 15, wherein the requirement of bitstream conformance further specifies that a union of the one or more sub-pictures that result from the partitioning of the picture covers the whole picture.

17. The non-transitory computer-readable recording medium of claim 16, wherein a sub-picture of the one or more sub-pictures is partitioned into one or more slices, and
wherein the requirement of bitstream conformance further specifies that a union of the one or more slices that result from the partitioning of the sub-picture covers a whole sub-picture.

18. The apparatus of claim 7, wherein the conversion includes encoding the current video block into the bitstream.

19. The apparatus of claim 7, wherein the conversion includes decoding the current video block from the bitstream.

20. The non-transitory computer-readable recording medium of claim 15, wherein a slice of the picture overlaps with at most one sub-picture of the picture.

* * * * *